(12) United States Patent
Sollie et al.

(10) Patent No.: US 11,932,474 B2
(45) Date of Patent: Mar. 19, 2024

(54) HINGED WRAP INSULATED CONTAINER

(71) Applicant: Pratt Retail Specialties, LLC, Brookhaven, GA (US)

(72) Inventors: Greg Sollie, Sharpsburg, GA (US); Jamie Waltermire, Peachtree City, GA (US); Shifeng Chen, Newport News, VA (US); Markel Graham, Acworth, GA (US)

(73) Assignee: Pratt Retail Specialties, LLC, Brookhaven, GA (US)

( * ) Notice: Subject to any disclaimer, the term of this patent is extended or adjusted under 35 U.S.C. 154(b) by 0 days.

(21) Appl. No.: 18/208,709

(22) Filed: Jun. 12, 2023

(65) Prior Publication Data
US 2023/0322468 A1 Oct. 12, 2023

Related U.S. Application Data

(62) Division of application No. 17/307,650, filed on May 4, 2021, now Pat. No. 11,718,464.
(Continued)

(51) Int. Cl.
*B31B 50/81* (2017.01)
*B31B 110/35* (2017.01)
(Continued)

(52) U.S. Cl.
CPC .......... *B65D 81/3823* (2013.01); *B31B 50/81* (2017.08); *B65D 5/58* (2013.01); *B31B 2110/35* (2017.08); *B31B 2120/407* (2017.08)

(58) Field of Classification Search
CPC .. B65D 81/3858; B65D 81/3853; B65D 5/58; B65D 81/051; B65D 81/38;
(Continued)

(56) References Cited

U.S. PATENT DOCUMENTS

| 265,985 A | 10/1882 | Seabury |
|---|---|---|
| 1,061,531 A | 5/1913 | Emmons |

(Continued)

FOREIGN PATENT DOCUMENTS

| AU | 2021204424 | 7/2023 |
|---|---|---|
| CA | 2019104 | 12/1991 |

(Continued)

OTHER PUBLICATIONS

US 10,562,676 B2, 02/2020, Waltermire et al. (withdrawn)
(Continued)

*Primary Examiner* — Christopher R Demeree
(74) *Attorney, Agent, or Firm* — Taylor English Duma LLP

(57) ABSTRACT

An insulation wrap includes an insulation batt defining a top end and a bottom end, the insulation batt defining an inner side and an outer side; a wrap liner blank including an inner portion extending across a first panel and a second panel of the wrap liner blank, the inner side of the insulation batt positioned facing the inner portion; a ledge portion extending across the first panel and the second panel of the wrap liner blank, the ledge portion hingedly coupled to the inner portion by an inner hinge, the top end of the insulation batt positioned facing the ledge portion; and an outer portion extending across the first panel and the second panel of the wrap liner blank, the outer portion hingedly coupled to the ledge portion by a ledge hinge.

5 Claims, 41 Drawing Sheets

Related U.S. Application Data

(60) Provisional application No. 63/020,346, filed on May 5, 2020.

(51) Int. Cl.
*B31B 120/40* (2017.01)
*B65D 5/58* (2006.01)
*B65D 81/38* (2006.01)

(58) Field of Classification Search
CPC ............ B65D 81/3823; B65D 81/3862; B65D 55/20; B65D 7/20; B65D 2230/02; Y02W 90/10; B31B 2120/501; B31B 50/26
USPC .............. 229/103.11, 167, 122.32, 199, 193; 206/594; 220/921, 592.25; 53/473
See application file for complete search history.

(56) References Cited

U.S. PATENT DOCUMENTS

| | | |
|---|---|---|
| 1,150,105 A | 8/1915 | Emmons |
| 1,527,167 A | 2/1925 | Birdseye |
| 1,677,565 A | 7/1928 | Oppenheim |
| 1,682,410 A | 8/1928 | Oppenheim |
| 1,747,980 A | 2/1930 | Kondolf |
| 1,753,813 A | 4/1930 | Washburn |
| 1,868,996 A | 7/1932 | Sharp |
| 1,896,393 A | 2/1933 | Devine |
| 1,899,892 A | 2/1933 | D'Este et al. |
| 1,930,680 A | 10/1933 | Hinton |
| 1,935,923 A | 11/1933 | Thoke |
| 1,937,263 A | 11/1933 | Bubb |
| 1,942,917 A | 1/1934 | D'Este et al. |
| 1,954,013 A | 4/1934 | Lilienfield |
| 2,018,519 A | 10/1935 | Hall |
| 2,070,747 A | 2/1937 | Ostrom |
| 2,116,513 A | 5/1938 | Frankenstein |
| 2,148,454 A | 2/1939 | Gerard |
| 2,165,327 A | 7/1939 | Zalkind |
| 2,289,060 A | 7/1942 | Merkle |
| 2,293,361 A | 8/1942 | Roberts |
| 2,326,817 A | 8/1943 | Zalkind |
| 2,360,806 A | 10/1944 | Van Rosen |
| 2,386,905 A | 10/1945 | Meitzen |
| 2,389,601 A | 11/1945 | De Witt |
| 2,485,643 A | 10/1949 | Norquist |
| 2,554,004 A | 5/1951 | Bergstein |
| 2,632,311 A | 3/1953 | Sullivan |
| 2,650,016 A | 8/1953 | McMillan |
| 2,753,102 A | 7/1956 | Paige |
| 2,867,035 A | 1/1959 | Patterson, Jr. |
| 2,899,103 A | 8/1959 | Ebert |
| 2,927,720 A | 3/1960 | Adams |
| 2,950,225 A | 8/1960 | Losse |
| 2,986,324 A | 5/1961 | Anderson, Jr. |
| 2,987,239 A | 6/1961 | Atwood |
| 3,003,680 A | 10/1961 | Wilcox, Jr. et al. |
| 3,029,008 A | 4/1962 | Membrino |
| 3,031,121 A | 4/1962 | Chase |
| 3,065,514 A | 11/1962 | Henning et al. |
| 3,065,895 A | 11/1962 | Lipschutz |
| 3,096,879 A | 7/1963 | Schumacher |
| 3,097,782 A | 7/1963 | Koropatkin et al. |
| 3,182,913 A | 5/1965 | Brian |
| 3,193,176 A | 7/1965 | Gullickson et al. |
| 3,194,471 A | 7/1965 | Murphy |
| 3,206,103 A | 9/1965 | Bixler |
| 3,222,843 A | 12/1965 | Schneider |
| 3,236,206 A | 2/1966 | Willinger |
| 3,282,411 A | 11/1966 | Jardine |
| 3,286,825 A | 11/1966 | Laas |
| 3,335,941 A | 8/1967 | Gatward |
| 3,349,984 A | 10/1967 | Halko, Jr. |
| 3,371,462 A | 3/1968 | Nordkvist et al. |
| 3,375,934 A | 4/1968 | Bates |
| 3,399,818 A | 9/1968 | Stegner |
| 3,420,363 A | 1/1969 | Blickensderfer |
| 3,435,736 A | 4/1969 | Reiche |
| 3,465,948 A | 9/1969 | Boyer |
| 3,503,550 A | 3/1970 | Main et al. |
| 3,551,945 A | 1/1971 | Eyberg et al. |
| 3,670,948 A | 6/1972 | Berg |
| 3,703,383 A | 11/1972 | Kuchenbecker |
| 3,734,336 A | 5/1973 | Rankow et al. |
| 3,736,221 A | 5/1973 | Evers et al. |
| 3,747,743 A | 7/1973 | Hoffman, Jr. |
| 3,749,299 A | 7/1973 | Ingle |
| 3,836,044 A | 9/1974 | Tilp et al. |
| 3,843,038 A | 10/1974 | Sax |
| 3,880,341 A | 4/1975 | Bamburg et al. |
| 3,883,065 A | 5/1975 | Presnick |
| 3,887,743 A | 6/1975 | Lane |
| 3,890,762 A | 6/1975 | Ernst et al. |
| 3,919,372 A | 11/1975 | Vogele |
| 3,945,561 A | 3/1976 | Strebelle |
| 3,976,605 A | 8/1976 | Matsunaga et al. |
| 3,980,005 A | 9/1976 | Buonaiuto |
| 4,030,227 A | 6/1977 | Oftedahl |
| 4,050,264 A | 9/1977 | Tanaka |
| 4,068,779 A | 1/1978 | Canfield |
| 4,091,852 A | 5/1978 | Jordan et al. |
| 4,146,660 A | 3/1979 | Hall et al. |
| 4,169,540 A | 10/1979 | Larsson et al. |
| 4,170,304 A | 10/1979 | Huke |
| 4,211,267 A | 7/1980 | Skovgaard |
| 4,213,310 A | 7/1980 | Buss |
| 4,335,844 A | 6/1982 | Egli |
| 4,342,416 A | 8/1982 | Philips |
| 4,351,165 A | 9/1982 | Gottsegen et al. |
| 4,380,314 A | 4/1983 | Langston, Jr. et al. |
| D270,041 S | 8/1983 | Vestal |
| 4,396,144 A | 8/1983 | Gutierrez et al. |
| 4,418,864 A | 12/1983 | Neilsen |
| 4,488,623 A | 12/1984 | Linnell, II et al. |
| 4,509,645 A | 4/1985 | Hotta |
| 4,536,145 A | 8/1985 | Sawyer et al. |
| 4,679,242 A | 7/1987 | Brockhaus |
| 4,682,708 A | 7/1987 | Pool |
| 4,711,390 A | 12/1987 | Andrews et al. |
| 4,797,010 A | 1/1989 | Coelho |
| 4,819,793 A | 4/1989 | Willard et al. |
| 4,828,133 A | 5/1989 | Hougendobler |
| 4,830,282 A | 5/1989 | Knight, Jr. |
| 4,889,252 A | 12/1989 | Rockom et al. |
| 4,930,903 A | 6/1990 | Mahoney |
| 4,989,780 A | 2/1991 | Foote et al. |
| 5,016,813 A | 5/1991 | Simons |
| 5,020,481 A | 6/1991 | Nelson |
| 5,062,527 A | 11/1991 | Westerman |
| 5,094,547 A | 3/1992 | Graham |
| 5,102,004 A | 4/1992 | Hollander et al. |
| 5,154,309 A | 10/1992 | Wischusen, III et al. |
| 5,158,371 A | 10/1992 | Moravek |
| 5,165,583 A | 11/1992 | Kouwenberg |
| 5,185,904 A | 2/1993 | Rogers et al. |
| 5,226,542 A | 7/1993 | Boecker et al. |
| 5,230,450 A | 7/1993 | Mahvi et al. |
| 5,263,339 A | 11/1993 | Evans |
| 5,358,757 A | 10/1994 | Robinette et al. |
| 5,372,429 A | 12/1994 | Beaver, Jr. et al. |
| 5,417,342 A | 5/1995 | Hutchison |
| 5,418,031 A | 5/1995 | English |
| 5,441,170 A | 8/1995 | Bane, III |
| 5,454,471 A | 10/1995 | Norvell |
| 5,460,324 A | 10/1995 | Vinther |
| 5,491,186 A | 2/1996 | Kean et al. |
| 5,493,874 A | 2/1996 | Landgrebe |
| 5,499,473 A | 3/1996 | Ramberg |
| 5,505,810 A | 4/1996 | Kirby et al. |
| 5,507,429 A | 4/1996 | Arlin |
| 5,511,667 A | 4/1996 | Carder |
| 5,512,345 A | 4/1996 | Tsutsumi et al. |
| 5,516,580 A | 5/1996 | Frenette et al. |
| 5,562,228 A | 10/1996 | Ericson |

(56) References Cited

U.S. PATENT DOCUMENTS

| | | |
|---|---|---|
| 5,573,119 A | 11/1996 | Luray |
| 5,596,880 A | 1/1997 | Welker et al. |
| 5,601,232 A | 2/1997 | Greenlee |
| 5,613,610 A | 3/1997 | Bradford |
| 5,615,795 A | 4/1997 | Tipps |
| 5,638,978 A | 6/1997 | Cadiente |
| 5,683,772 A | 11/1997 | Andersen et al. |
| 5,775,576 A | 7/1998 | Stone |
| 5,842,571 A | 12/1998 | Rausch |
| 5,906,290 A | 5/1999 | Haberkorn |
| 5,922,379 A | 7/1999 | Wang |
| 5,996,366 A | 12/1999 | Renard |
| 6,003,719 A | 12/1999 | Steward, III |
| 6,022,615 A | 2/2000 | Rettenbacher |
| D421,457 S | 3/2000 | Crofton |
| 6,041,958 A | 3/2000 | Tremelo |
| 6,048,099 A | 4/2000 | Muffett et al. |
| 6,050,410 A | 4/2000 | Quirion |
| 6,050,412 A | 4/2000 | Clough et al. |
| 6,090,027 A | 7/2000 | Brinkman |
| 6,138,902 A | 10/2000 | Welch |
| 6,164,526 A | 12/2000 | Dalvey |
| 6,168,040 B1 | 1/2001 | Sautner et al. |
| 6,200,404 B1 | 3/2001 | Andersen et al. |
| 6,220,473 B1 | 4/2001 | Lehman et al. |
| 6,223,551 B1 | 5/2001 | Mitchell |
| 6,238,091 B1 | 5/2001 | Mogil |
| 6,244,458 B1 | 6/2001 | Frysinger et al. |
| 6,247,328 B1 | 6/2001 | Mogil |
| 6,274,077 B1 | 8/2001 | Hur et al. |
| 6,295,830 B1 | 10/2001 | Newman |
| 6,295,860 B1 | 10/2001 | Sakairi et al. |
| 6,296,134 B1 | 10/2001 | Cardinale |
| 6,308,850 B1 | 10/2001 | Coom et al. |
| 6,325,281 B1 | 12/2001 | Grogan |
| 6,364,199 B1 | 4/2002 | Rose |
| 6,406,649 B1 | 6/2002 | Fisk |
| 6,443,309 B1 | 9/2002 | Becker |
| 6,453,682 B1 | 9/2002 | Jennings et al. |
| 6,478,268 B1 | 11/2002 | Bidwell et al. |
| 6,510,705 B1 | 1/2003 | Jackson |
| 6,582,124 B2 | 6/2003 | Mogil |
| 6,598,783 B2 | 7/2003 | Brinkman |
| 6,618,868 B2 | 9/2003 | Minnick |
| 6,641,758 B1 | 11/2003 | Arentsen et al. |
| 6,688,133 B1 | 2/2004 | Donefrio |
| 6,725,783 B2 | 4/2004 | Sekino |
| 6,726,017 B2 | 4/2004 | Maresh et al. |
| 6,736,309 B1 | 5/2004 | Westerman et al. |
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |
| 6,875,486 B2 | 4/2005 | Miller |
| 6,878,199 B2 | 4/2005 | Bowden et al. |
| 6,899,229 B2 | 5/2005 | Dennison et al. |
| 6,910,582 B2 | 6/2005 | Lantz |
| 6,913,389 B2 | 7/2005 | Kannankeril et al. |
| 6,971,539 B1 | 12/2005 | Abbe |
| 7,000,962 B2 | 2/2006 | Le |
| 7,019,271 B2 | 3/2006 | Wnek et al. |
| 7,041,369 B1 | 5/2006 | Mackey et al. |
| 7,070,841 B2 | 7/2006 | Benim et al. |
| 7,083,673 B2 | 8/2006 | Bowden et al. |
| 7,094,192 B2 | 8/2006 | Schoenberger et al. |
| 7,138,078 B2 | 11/2006 | Gotoh |
| 7,140,773 B2 | 11/2006 | Becker et al. |
| D534,797 S | 1/2007 | El-Afandi |
| D545,189 S | 6/2007 | El-Afandi |
| 7,225,632 B2 | 6/2007 | Derifield |
| 7,225,970 B2 | 6/2007 | Philips |
| 7,229,677 B2 | 6/2007 | Miller |
| D546,679 S | 7/2007 | El-Afandi |
| 7,255,261 B2 | 8/2007 | Mesly |
| 7,264,147 B1 | 9/2007 | Benson et al. |
| 7,270,358 B2 | 9/2007 | Hirsch |
| 7,392,931 B2 | 7/2008 | Issler |
| 7,452,316 B2 | 11/2008 | Cals et al. |
| D582,676 S | 12/2008 | Rothschild |
| 7,484,623 B2 | 2/2009 | Goodrich |
| 7,487,904 B2 | 2/2009 | McClure |
| 7,597,209 B2 | 10/2009 | Rothschild et al. |
| 7,607,563 B2 | 10/2009 | Hanna et al. |
| 7,659,316 B2 | 2/2010 | Kittle et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,841,512 B2 | 11/2010 | Westerman et al. |
| 7,845,508 B2 | 12/2010 | Rothschild et al. |
| 7,870,992 B2 | 1/2011 | Schille et al. |
| 7,908,870 B2 | 3/2011 | Williams |
| 7,909,806 B2 | 3/2011 | Goodman et al. |
| 7,943,765 B2 | 5/2011 | Muller et al. |
| 7,955,428 B2 | 6/2011 | Aoki et al. |
| 7,967,904 B2 | 6/2011 | Bowden et al. |
| 7,971,720 B2 | 7/2011 | Minkler |
| 8,003,032 B2 | 8/2011 | Al-Sabih et al. |
| 8,118,177 B2 | 2/2012 | Drapela et al. |
| 8,153,783 B2 | 4/2012 | Muller et al. |
| 8,209,995 B2 | 7/2012 | Kieling et al. |
| 8,210,353 B2 | 7/2012 | Epicureo |
| 8,277,718 B2 | 10/2012 | Aoki et al. |
| 8,343,024 B1 | 1/2013 | Contanzo, Jr. et al. |
| 8,365,943 B2 | 2/2013 | Bentley |
| 8,389,110 B2 | 3/2013 | Liu |
| 8,465,404 B2 | 6/2013 | Hadley |
| 8,567,662 B2 | 10/2013 | Costanzo, Jr. |
| 8,579,183 B2 | 11/2013 | Belfort et al. |
| 8,596,520 B2 | 12/2013 | Scott |
| 8,613,202 B2 | 12/2013 | Williams |
| 8,651,593 B2 | 2/2014 | Bezich et al. |
| 8,763,811 B2 | 7/2014 | Lantz |
| 8,763,886 B2 | 7/2014 | Hall |
| D710,692 S | 8/2014 | Genender |
| 8,795,470 B2 | 8/2014 | Henderson et al. |
| 8,875,885 B2 | 11/2014 | Padden et al. |
| 8,875,983 B2 | 11/2014 | Lenhard et al. |
| 8,919,082 B1 | 12/2014 | Cataldo |
| 8,960,528 B2 | 2/2015 | Sadlier |
| 9,139,319 B2 | 9/2015 | Crespo et al. |
| 9,272,475 B2 | 3/2016 | Ranade et al. |
| 9,290,313 B2 | 3/2016 | De Lesseux et al. |
| 9,322,136 B2 | 4/2016 | Ostendorf et al. |
| D758,182 S | 6/2016 | Sponselee |
| 9,394,633 B2 | 7/2016 | Shimotsu et al. |
| D764,903 S | 8/2016 | Sanfilippo et al. |
| 9,408,445 B2 | 8/2016 | Mogil et al. |
| 9,410,032 B2 | 8/2016 | Kim et al. |
| 9,429,350 B2 | 8/2016 | Chapman, Jr. |
| 9,499,294 B1 | 11/2016 | Contanzo, Jr. |
| 9,550,618 B1 | 1/2017 | Jobe |
| 9,580,846 B2 | 2/2017 | Tseitlin et al. |
| 9,605,382 B2 | 3/2017 | Virtanen |
| 9,611,067 B2 | 4/2017 | Collison |
| 9,635,916 B2 | 5/2017 | Bezich et al. |
| 9,688,454 B2 | 6/2017 | Ranade |
| 9,701,437 B2 | 7/2017 | Bugas et al. |
| 9,738,420 B2 | 8/2017 | Miller |
| 9,738,432 B1 | 8/2017 | Petrucci et al. |
| 9,834,366 B2 | 12/2017 | Giuliani |
| 9,908,680 B2 | 3/2018 | Shi et al. |
| 9,908,684 B2 | 3/2018 | Collison |
| 9,920,517 B2 | 3/2018 | Sollie et al. |
| 9,950,830 B2 | 4/2018 | De Lesseux et al. |
| 9,981,797 B2 | 5/2018 | Aksan et al. |
| 10,046,901 B1 | 8/2018 | Jobe |
| 10,065,786 B2 | 9/2018 | Kuhn |
| 10,094,126 B2 | 10/2018 | Collison et al. |
| 10,112,756 B2 | 10/2018 | Menzel, Jr. |
| 10,226,909 B2 | 3/2019 | Frem et al. |
| 10,266,332 B2 | 4/2019 | Aksan et al. |
| 10,273,073 B2 | 4/2019 | Collison |
| 10,357,936 B1 | 7/2019 | Vincent et al. |

(56) References Cited

U.S. PATENT DOCUMENTS

| | | |
|---|---|---|
| 10,392,156 B2 | 8/2019 | McDonald et al. |
| 10,400,105 B2 | 9/2019 | Stevens |
| 10,435,194 B2 | 10/2019 | Sollie et al. |
| 10,442,600 B2 | 10/2019 | Waltermire et al. |
| 10,449,694 B2 | 10/2019 | Ojala et al. |
| 10,507,968 B2 | 12/2019 | Sollie et al. |
| 10,550,523 B2 | 2/2020 | Shih |
| 10,551,110 B2 | 2/2020 | Waltermire et al. |
| 10,583,977 B2 | 3/2020 | Collison et al. |
| 10,604,304 B2 | 3/2020 | Waltermire et al. |
| D881,690 S | 4/2020 | Smalley |
| 10,661,941 B2 | 5/2020 | Genender et al. |
| 10,662,301 B2 | 5/2020 | Krause et al. |
| 10,676,263 B2 | 6/2020 | Menzel, Jr. |
| 10,745,542 B2 | 8/2020 | Bastioli et al. |
| 10,800,595 B2 | 10/2020 | Waltermire et al. |
| 10,843,840 B2 | 11/2020 | Sollie et al. |
| 10,858,141 B2 | 12/2020 | Sollie et al. |
| 10,875,979 B2 | 12/2020 | Ge et al. |
| 10,882,681 B2 | 1/2021 | Waltermire et al. |
| 10,882,682 B2 | 1/2021 | Collison et al. |
| 10,882,683 B2 | 1/2021 | Collison et al. |
| 10,882,684 B2 | 1/2021 | Sollie et al. |
| 10,926,939 B2 | 2/2021 | Collison et al. |
| 10,941,977 B2 | 3/2021 | Waltermire et al. |
| 10,947,025 B2 | 3/2021 | Sollie et al. |
| 10,954,057 B2 | 3/2021 | Waltermire et al. |
| 10,954,058 B2 | 3/2021 | Sollie et al. |
| 11,027,875 B2 | 6/2021 | Sollie et al. |
| 11,059,652 B2 | 7/2021 | Sollie et al. |
| 11,066,228 B2 | 7/2021 | Sollie et al. |
| 11,117,731 B2 | 9/2021 | Waltermire et al. |
| 11,124,354 B2 | 9/2021 | Waltermire et al. |
| D934,064 S | 10/2021 | Satnick |
| 11,137,198 B2 | 10/2021 | Waltermire et al. |
| 11,148,870 B2 | 10/2021 | Collison et al. |
| 11,203,458 B2 | 12/2021 | Sollie et al. |
| 11,214,427 B2 | 1/2022 | Collison et al. |
| 11,215,393 B2 | 1/2022 | Waltermire et al. |
| 11,230,404 B2 | 1/2022 | Sollie et al. |
| 11,247,806 B2 | 2/2022 | Sollie et al. |
| 11,247,827 B2 | 2/2022 | Jobe |
| 11,255,596 B2 | 2/2022 | Waltermire et al. |
| 11,261,017 B2 | 3/2022 | Waltermire et al. |
| 11,267,641 B2 | 3/2022 | Collison et al. |
| 11,286,099 B2 | 3/2022 | Sollie et al. |
| 11,312,563 B2 | 4/2022 | Smith |
| 11,325,772 B2 | 5/2022 | Sollie et al. |
| D955,876 S | 6/2022 | Sill et al. |
| D957,246 S | 7/2022 | Culler et al. |
| D957,936 S | 7/2022 | Lincoln |
| D968,950 S | 11/2022 | Sollie et al. |
| 11,485,566 B2 | 11/2022 | Waltermire et al. |
| 11,524,832 B2 | 12/2022 | Sollie et al. |
| 11,542,092 B2 | 1/2023 | Sollie et al. |
| 11,565,871 B2 | 1/2023 | Waltermire et al. |
| 11,618,608 B2 | 4/2023 | Sollie et al. |
| 11,623,783 B2 | 4/2023 | Sollie et al. |
| 11,628,978 B2 | 4/2023 | Waltermire et al. |
| 11,634,265 B2 | 4/2023 | Collison et al. |
| 11,679,925 B2 | 6/2023 | Sollie et al. |
| 11,692,762 B2 | 7/2023 | Waltermire et al. |
| 11,697,542 B2 | 7/2023 | Sollie et al. |
| 11,713,180 B2 | 8/2023 | Sollie et al. |
| 11,718,464 B2 | 8/2023 | Sollie et al. |
| 11,724,851 B2 | 8/2023 | Sollie et al. |
| 11,780,635 B2 | 10/2023 | Sollie et al. |
| 11,780,636 B2 | 10/2023 | Sollie et al. |
| 11,780,666 B2 | 10/2023 | Collison et al. |
| 11,858,717 B2 * | 1/2024 | Waltermire .......... B65D 5/0065 |
| 2001/0010312 A1 | 8/2001 | Mogil |
| 2002/0020188 A1 | 2/2002 | Sharon et al. |
| 2002/0064318 A1 | 5/2002 | Malone et al. |
| 2002/0134698 A1 | 9/2002 | Rhodes et al. |
| 2002/0162767 A1 | 11/2002 | Ohtsubo |
| 2003/0099833 A1 | 5/2003 | Erb, Jr. et al. |
| 2003/0145561 A1 | 8/2003 | Cals et al. |
| 2004/0004111 A1 | 1/2004 | Cardinale |
| 2004/0031842 A1 | 2/2004 | Westerman et al. |
| 2004/0079794 A1 | 4/2004 | Mayer |
| 2004/0164132 A1 | 8/2004 | Kuester |
| 2005/0109655 A1 | 5/2005 | Vershum et al. |
| 2005/0117817 A1 | 6/2005 | Mogil et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0062990 A1 | 3/2006 | Gotoh |
| 2006/0078720 A1 | 4/2006 | Toas et al. |
| 2006/0096978 A1 | 5/2006 | Lafferty et al. |
| 2006/0193541 A1 | 8/2006 | Norcom |
| 2006/0235099 A1 | 10/2006 | Kamite et al. |
| 2006/0243784 A1 | 11/2006 | Glaser et al. |
| 2006/0255507 A1 | 11/2006 | Bowden et al. |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0122584 A1 | 5/2007 | Song et al. |
| 2007/0151685 A1 | 7/2007 | Horsfield et al. |
| 2007/0193298 A1 | 8/2007 | Derifield |
| 2007/0209307 A1 | 9/2007 | Andersen |
| 2007/0257040 A1 | 11/2007 | Price, Jr. et al. |
| 2008/0095959 A1 | 4/2008 | Warner et al. |
| 2008/0135564 A1 | 6/2008 | Romero |
| 2008/0173703 A1 | 7/2008 | Westerman et al. |
| 2008/0190940 A1 | 8/2008 | Scott |
| 2008/0203090 A1 | 8/2008 | Dickinson |
| 2008/0268220 A1 | 10/2008 | Olliges |
| 2008/0289302 A1 | 11/2008 | Vulpitta |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0078708 A1 | 3/2009 | Williams |
| 2009/0114311 A1 | 5/2009 | McDowell |
| 2009/0193765 A1 | 8/2009 | Lantz |
| 2009/0214142 A1 | 8/2009 | Bossel et al. |
| 2009/0275531 A1 | 11/2009 | Muller et al. |
| 2009/0283578 A1 | 11/2009 | Miller |
| 2009/0288791 A1 | 11/2009 | Hammer et al. |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0109196 A1 | 5/2010 | Al-Sabih et al. |
| 2010/0139878 A1 | 6/2010 | Clemente |
| 2010/0140124 A1 | 6/2010 | Hafner |
| 2010/0151164 A1 | 6/2010 | Grant et al. |
| 2010/0168260 A1 | 7/2010 | Frenzel et al. |
| 2010/0219232 A1 | 9/2010 | Smith |
| 2010/0258574 A1 | 10/2010 | Bentley |
| 2010/0270317 A1 | 10/2010 | Kieling et al. |
| 2010/0282827 A1 | 11/2010 | Padovani |
| 2010/0284634 A1 | 11/2010 | Hadley |
| 2010/0291822 A1 | 11/2010 | Netravali |
| 2010/0314397 A1 | 12/2010 | Williams et al. |
| 2010/0314437 A1 | 12/2010 | Dowd |
| 2011/0042388 A1 | 2/2011 | Tristancho Tello |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0240515 A1 | 10/2011 | Ridgeway |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 | 3/2012 | Bezich et al. |
| 2012/0097067 A1 | 4/2012 | Fascio |
| 2012/0145568 A1 | 6/2012 | Collison et al. |
| 2012/0178856 A1 | 7/2012 | Gobl et al. |
| 2012/0243808 A1 | 9/2012 | De Lesseux et al. |
| 2012/0248101 A1 | 10/2012 | Tumber et al. |

(56) References Cited

U.S. PATENT DOCUMENTS

| | | |
|---|---|---|
| 2012/0251818 A1 | 10/2012 | Axrup et al. |
| 2012/0279896 A1 | 11/2012 | Lantz |
| 2012/0309246 A1 | 12/2012 | Tseitlin et al. |
| 2012/0328807 A1 | 12/2012 | Grimes |
| 2013/0017349 A1 | 1/2013 | Heiskanen et al. |
| 2013/0026215 A1 | 1/2013 | Lenhard et al. |
| 2013/0112694 A1 | 5/2013 | Bentley |
| 2013/0112695 A1 | 5/2013 | Hall |
| 2013/0140317 A1 | 6/2013 | Roskoss |
| 2013/0203879 A1 | 8/2013 | Rensen et al. |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0272163 A1 | 9/2014 | Tilton |
| 2014/0274633 A1 | 9/2014 | Tilton |
| 2014/0300026 A1 | 10/2014 | Taccolini |
| 2014/0319018 A1 | 10/2014 | Collison |
| 2014/0367393 A1 | 12/2014 | Ranade |
| 2015/0110423 A1 | 4/2015 | Fox et al. |
| 2015/0111011 A1 | 4/2015 | Hoekstra et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0255009 A1 | 9/2015 | Akhter et al. |
| 2015/0259126 A1 | 9/2015 | McGoff et al. |
| 2015/0284131 A1 | 10/2015 | Genender et al. |
| 2015/0345853 A1 | 12/2015 | Oeyen |
| 2015/0367981 A1 | 12/2015 | Moore |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0264294 A1 | 9/2016 | Bacon |
| 2016/0304267 A1 | 10/2016 | Aksan |
| 2016/0312010 A1 | 10/2016 | Alavi |
| 2016/0312941 A1 | 10/2016 | Alavi et al. |
| 2016/0318648 A1 | 11/2016 | Kuninobu |
| 2016/0325915 A1 | 11/2016 | Aksan |
| 2017/0015080 A1 | 1/2017 | Collison et al. |
| 2017/0021961 A1 | 1/2017 | Humphrey et al. |
| 2017/0043937 A1 | 2/2017 | Lantz |
| 2017/0121052 A1 | 5/2017 | Morimoto |
| 2017/0144792 A1 | 5/2017 | Block |
| 2017/0198959 A1 | 7/2017 | Morris |
| 2017/0225870 A1 | 8/2017 | Collison |
| 2017/0233134 A9 | 8/2017 | Grajales et al. |
| 2017/0233165 A1 | 8/2017 | Kuhn |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0361973 A1 | 12/2017 | Padilla |
| 2017/0369226 A1 | 12/2017 | Chase et al. |
| 2017/0369667 A1 | 12/2017 | Ruckdaschel et al. |
| 2018/0002451 A1 | 1/2018 | Ge et al. |
| 2018/0050857 A1 | 2/2018 | Collison |
| 2018/0051460 A1 | 2/2018 | Sollie et al. |
| 2018/0086539 A1 | 3/2018 | Aksan et al. |
| 2018/0148245 A1 | 5/2018 | Aggarwal et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0319569 A1 | 11/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0009946 A1 | 1/2019 | Nixon et al. |
| 2019/0032991 A1 | 1/2019 | Waltermire et al. |
| 2019/0040221 A1 | 2/2019 | Hitzler et al. |
| 2019/0047775 A1 | 2/2019 | Waltermire et al. |
| 2019/0071550 A1 | 3/2019 | Ge et al. |
| 2019/0085155 A1 | 3/2019 | Niles |
| 2019/0144155 A1 | 5/2019 | Geng et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367208 A1 | 12/2019 | Jobe |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0047976 A1 | 2/2020 | Collison et al. |
| 2020/0048422 A1 | 2/2020 | Doug et al. |
| 2020/0071056 A1 | 3/2020 | Henderson et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148409 A1 | 5/2020 | Sollie et al. |
| 2020/0148410 A1 | 5/2020 | Sollie et al. |
| 2020/0148452 A1 | 5/2020 | Sollie et al. |
| 2020/0148453 A1 | 5/2020 | Sollie et al. |
| 2020/0214314 A1 | 7/2020 | Bakker et al. |
| 2020/0283188 A1 | 9/2020 | Sollie et al. |
| 2020/0308359 A1 | 10/2020 | Glenn et al. |
| 2020/0318292 A1 | 10/2020 | Alden et al. |
| 2020/0346816 A1 | 11/2020 | Sollie et al. |
| 2020/0346841 A1 | 11/2020 | Sollie et al. |
| 2021/0039869 A1 | 2/2021 | Waltermire et al. |
| 2021/0039870 A1 | 2/2021 | Sollie et al. |
| 2021/0039871 A1 | 2/2021 | Sollie et al. |
| 2021/0070527 A1 | 3/2021 | Sollie et al. |
| 2021/0070529 A1 | 3/2021 | Sollie et al. |
| 2021/0070530 A1 | 3/2021 | Sollie et al. |
| 2021/0078755 A1 | 3/2021 | Sollie et al. |
| 2021/0101734 A1 | 4/2021 | Collison et al. |
| 2021/0101735 A1 | 4/2021 | Collison et al. |
| 2021/0101736 A1 | 4/2021 | Waltermire et al. |
| 2021/0101737 A1 | 4/2021 | Waltermire et al. |
| 2021/0102746 A1 | 4/2021 | Waltermire et al. |
| 2021/0155365 A1 | 5/2021 | Sollie et al. |
| 2021/0155367 A1 | 5/2021 | Sollie et al. |
| 2021/0163210 A1 | 6/2021 | Waltermire et al. |
| 2021/0179313 A1 | 6/2021 | Sollie et al. |
| 2021/0179337 A1 | 6/2021 | Sollie et al. |
| 2021/0347553 A1 | 11/2021 | Sollie et al. |
| 2022/0017260 A1 | 1/2022 | Sollie et al. |
| 2022/0024634 A1 | 1/2022 | Sollie et al. |
| 2022/0024635 A1 | 1/2022 | Sollie et al. |
| 2022/0026140 A1 | 1/2022 | Waltermire et al. |
| 2022/0026141 A1 | 1/2022 | Waltermire et al. |
| 2022/0033167 A1 | 2/2022 | Collison et al. |
| 2022/0081152 A1 | 3/2022 | Sollie et al. |
| 2022/0081186 A1 | 3/2022 | Waltermire et al. |
| 2022/0177216 A1 | 6/2022 | Sollie et al. |
| 2022/0185533 A1 | 6/2022 | Chen et al. |
| 2022/0242607 A1 | 8/2022 | Sollie et al. |
| 2022/0251783 A1 | 8/2022 | Anagnostopoulos et al. |
| 2022/0288870 A1 | 9/2022 | Collison et al. |
| 2022/0297918 A1 | 9/2022 | Collison et al. |
| 2022/0388755 A1 | 12/2022 | Waltermire et al. |
| 2022/0411167 A1 | 12/2022 | Sollie et al. |
| 2023/0125191 A1 | 4/2023 | Waltermire et al. |
| 2023/0159213 A1 | 5/2023 | Sollie et al. |
| 2023/0159214 A1 | 5/2023 | Sollie et al. |

(56) References Cited

U.S. PATENT DOCUMENTS

| | | | |
|---|---|---|---|
| 2023/0182990 A1 | 6/2023 | Sollie et al. |
| 2023/0227210 A1 | 7/2023 | Waltermire et al. |
| 2023/0257157 A1 | 8/2023 | Sollie et al. |
| 2023/0280087 A1 | 9/2023 | Waltermire et al. |
| 2023/0322466 A1 | 10/2023 | Sollie et al. |
| 2023/0322467 A1 | 10/2023 | Sollie et al. |
| 2023/0382627 A1 | 11/2023 | Collison et al. |

FOREIGN PATENT DOCUMENTS

| | | | | |
|---|---|---|---|---|
| CA | 2097735 A1 * | 12/1994 | ......... | B65D 81/3853 |
| CA | 2145953 | 10/1996 | | |
| CA | 2149939 | 11/1996 | | |
| CN | 1073993 | 7/1993 | | |
| CN | 11503962 | 6/2004 | | |
| CN | 102206361 | 10/2011 | | |
| CN | 102264961 | 11/2011 | | |
| CN | 206494316 | 9/2017 | | |
| CN | 108001787 | 5/2018 | | |
| CN | 110204794 | 9/2019 | | |
| CN | 117071332 A | 11/2023 | | |
| DE | 1897846 | 7/1964 | | |
| DE | 102011016500 | 10/2012 | | |
| DE | 202017103230 | 7/2017 | | |
| DE | 202017003908 | 10/2017 | | |
| DE | 202018101998 | 7/2019 | | |
| DE | 202019003407 | 11/2019 | | |
| EP | 0133539 | 2/1985 | | |
| EP | 0537058 | 4/1993 | | |
| EP | 2781652 | 12/2015 | | |
| EP | 2990196 | 3/2016 | | |
| EP | 3144248 | 3/2017 | | |
| EP | 3348493 | 7/2018 | | |
| EP | 3538708 | 1/2022 | | |
| EP | 4071298 B1 | 1/2024 | | |
| FR | 1241878 | 9/1960 | | |
| FR | 2705317 | 11/1994 | | |
| FR | 2820718 | 8/2002 | | |
| FR | 2821786 | 9/2002 | | |
| FR | 3016352 | 7/2015 | | |
| GB | 217683 | 6/1924 | | |
| GB | 235673 | 6/1925 | | |
| GB | 528289 | 1/1940 | | |
| GB | 713640 | 8/1954 | | |
| GB | 713640 A * | 8/1954 | ........... | B65D 5/5014 |
| GB | 1204058 | 9/1970 | | |
| GB | 1305212 | 1/1973 | | |
| GB | 1372054 | 10/1974 | | |
| GB | 2029461 | 3/1980 | | |
| GB | 2400096 | 5/2006 | | |
| GB | 2516490 | 1/2015 | | |
| GB | 2528289 | 1/2016 | | |
| GB | 2534912 A * | 8/2016 | ............. | B65D 81/38 |
| JP | 01254557 | 10/1989 | | |
| JP | H0632386 | 2/1994 | | |
| JP | H06135487 | 5/1994 | | |
| JP | 2001009949 | 1/2001 | | |
| JP | 2005139582 | 6/2005 | | |
| JP | 2005247329 | 9/2005 | | |
| JP | 2006158584 | 6/2006 | | |
| JP | 4069255 | 4/2008 | | |
| JP | 2012126440 | 7/2012 | | |
| JP | 2017079632 | 5/2017 | | |
| KR | 101730461 | 4/2017 | | |
| WO | 8807476 | 10/1988 | | |
| WO | 9726192 | 7/1997 | | |
| WO | 9932374 | 7/1999 | | |
| WO | 2001070592 | 9/2001 | | |
| WO | 2009026256 | 2/2009 | | |
| WO | 2014147425 | 9/2014 | | |
| WO | 2016187435 A2 | 5/2016 | | |
| WO | 2016187435 A3 | 11/2016 | | |
| WO | 2017207974 | 12/2017 | | |
| WO | 2018089365 | 5/2018 | | |
| WO | 2018093586 | 5/2018 | | |
| WO | 2018227047 | 12/2018 | | |
| WO | 2019113453 | 6/2019 | | |
| WO | 2019125904 | 6/2019 | | |
| WO | 2019125906 | 6/2019 | | |
| WO | 2019226199 | 11/2019 | | |
| WO | 2020011587 | 1/2020 | | |
| WO | 2020101939 | 5/2020 | | |
| WO | 2020102023 | 5/2020 | | |
| WO | 2020122921 | 6/2020 | | |
| WO | 2020222943 | 11/2020 | | |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
US 11,072,486 B2, 07/2021, Waltermire et al. (withdrawn)
US 11,079,168 B2, 08/2021, Waltermire et al. (withdrawn)
US 11,084,644 B2, 08/2021, Waltermire et al. (withdrawn)
US 11,167,877 B2, 11/2021, Sollie et al. (withdrawn)
US 11,167,878 B2, 11/2021, Sollie et al. (withdrawn)
US 11,247,836 B2, 02/2022, Sollie et al. (withdrawn)
US 11,292,656 B2, 04/2022, Sollie et al. (withdrawn)
US D959,977 S, 08/2022, Sollie et al. (withdrawn)
US 11,479,403 B2, 10/2022, Sollie et al. (withdrawn)
US 11,498,745 B2, 11/2022, Sollie et al. (withdrawn)
US 11,591,131 B2, 02/2023, Sollie et al. (withdrawn)
US 11,591,132 B2, 02/2023, Sollie et al. (withdrawn)
US 11,603,253 B2, 03/2023, Collison et al. (withdrawn)
US 11,613,421 B2, 03/2023, Sollie et al. (withdrawn)
Collison, Alan B.; Applicant Interview Summary for U.S. Appl. No. 16/658,756, filed Oct. 21, 2019, dated Jun. 29, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Non-Final Office Action for U.S. Appl. No. 16/658,756, filed Oct. 21, 2019, dated Feb. 4, 2020, 14 pgs.
Collison, Alan B.; Notice of Allowance for U.S. Appl. No. 16/658,756, filed Oct. 21, 2019, dated Oct. 23, 2020, 10 pgs.
MP Global Products LLC: European Search Report for serial No. 17868605.1, dated Mar. 16, 2020, 7 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020, 3 pgs.
MP Global Products, LLC; Office Action for Chinese patent application No. 201780081689.7, dated Nov. 2, 2020, 17 pgs.
Collison, Alan B.; Non-Final Office Action for U.S. Appl. No. 17/181,377, filed Feb. 22, 2021, dated Jul. 1, 2021, 22 pgs.
Collison, Alan B.; Notice of Allowance for U.S. Appl. No. 17/181,377, filed Feb. 22, 2021, dated Oct. 21, 2021, 6 pgs.
Collison, Alan B.; Restriction Requirement for U.S. Appl. No. 17/181,377, filed Feb. 22, 2021, dated Apr. 22, 2021, 6 pgs.
MP Global Products LLC; Office Action for Chinese Patent Application No. 201780081689.7, dated May 14, 2021, 17 pgs.
MP Global Products, LLC; Decision on Rejection for Chinese patent application No. 201780081689.7, dated Sep. 23, 2021, 15 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Applicant-Initiated Interview Summary for U.S. Appl. No. 16/414,309, filed May 16, 2019, dated Oct. 15, 2020, 3 pgs.
Collison, Alan B.; Certificate of Correction for U.S. Appl. No. 16/414,309, filed May 16, 2019, dated Mar. 9, 2021, 1 pg.
Collison, Alan B.; Final Office Action for U.S. Appl. No. 16/414,309, filed May 16, 2019, dated Oct. 8, 2020, 15 pgs.
Collison, Alan B.; Non-Final Office Action for U.S. Appl. No. 16/414,309, filed May 16, 2019, dated Jul. 17, 2020, 77 pgs.
Collison, Alan B.; Notice of Allowance for U.S. Appl. No. 16/414,309, filed May 16, 2019, dated Oct. 21, 2020, 6 pgs.

(56) References Cited

OTHER PUBLICATIONS

Collison, Alan B.; Requirement for Restriction/Election for U.S. Appl. No. 16/414,309, filed May 16, 2019, dated Jun. 16, 2020, 5 pgs.
Collison, Alan B.; Applicant-Initiated Interview Summary for U.S. Appl. No. 17/123,673, filed Dec. 16, 2020, dated Jun. 24, 2021, 2 pgs.
Collison, Alan B.; Certificate of Correction for U.S. Appl. No. 11/214,427, filed Dec. 16, 2020, dated Mar. 29, 2022, 1 pg.
Collison, Alan B.; Non-Final Office Action for U.S. Appl. No. 17/123,673, filed Dec. 16, 2020, dated Mar. 23, 2021, 86 pgs.
Collison, Alan B.; Notice of Allowance for U.S. Appl. No. 17/123,673, filed Dec. 16, 2020, dated Jul. 1, 2021, 12 pgs.
Collison, Alan B.; Applicant-Initiated Interview Summary for U.S. Appl. No. 16/414,310, filed May 16, 2019, dated Jul. 30, 2020, 3 pgs.
Collison, Alan B.; Non-Final Office Action for U.S. Appl. No. 16/414,310, filed May 16, 2019, dated Jul. 8, 2020, 84 pgs.
Collison, Alan B.; Notice of Allowance for U.S. Appl. No. 16/414,310, filed May 16, 2019, dated Nov. 13, 2020, 15 pgs.
Collison, Alan; Final Office Action for U.S. Appl. No. 16/414,310, filed May 16, 2019, dated Oct. 13, 2020, 30 pgs.
Collison, Alan B.; Applicant-Initiated Interview Summary for U.S. Appl. No. 17/123,676, filed Dec. 16, 2020, dated May 4, 2021, 4 pgs.
Collison, Alan B.; Certificate of Correction for U.S. Appl. No. 17/123,676, filed Dec. 16, 2020, dated Jan. 4, 2021, 1 pg.
Collison, Alan B.; Non-Final Office Action for U.S. Appl. No. 17/123,676, filed Dec. 16, 2020, dated Feb. 3, 2021, 23 pgs.
Collison, Alan B.; Notice of Allowance for U.S. Appl. No. 17/123,676, filed Dec. 16, 2020, dated May 13, 2021, 93 pgs.
Collison, Alan B.; Applicant-Initiated Interview Summary for U.S. Appl. No. 17/502,599, filed Oct. 15, 2021, dated Oct. 27, 2022, 2 pgs.
Collison, Alan B.; Certificate of Correction for U.S. Appl. No. 17/502,599, filed Oct. 15, 2021, dated Jun. 6, 2023, 1 pg.
Collison, Alan B.; Non-Final Office Action for U.S. Appl. No. 17/502,599, filed Oct. 15, 2021, dated Nov. 30, 2021, 6 pgs.
Collison, Alan B.; Non-Final Office Action for U.S. Appl. No. 17/502,599, filed Oct. 15, 2021, dated Sep. 12, 2022, 12 pgs.
Collison, Alan B.; Notice of Allowance for U.S. Appl. No. 17/502,599, filed Oct. 15, 2021, dated Jan. 23, 2023, 12 pgs.
Collison, Alan B.; Notice of Allowance for U.S. Appl. No. 17/502,599, filed Oct. 15, 2021, dated Mar. 9, 2022, 94 pgs.
Collison, Alan B.; Applicant-Initiated Interview Summary for U.S. Appl. No. 17/834,999, filed Jun. 8, 2022, dated Oct. 27, 2022, 2 pgs.
Collison, Alan B.; Non-Final Office Action for U.S. Appl. No. 17/834,999, filed Jun. 8, 2022, dated Jan. 27, 2023, 28 pgs.
Collison, Alan B.; Non-Final Office Action for U.S. Appl. No. 17/834,999, filed Jun. 8, 2022, dated Sep. 12, 2022, 104 pgs.
Collison, Alan B.; Notice of Allowance for U.S. Appl. No. 17/834,999, filed Jun. 8, 2022, dated May 18, 2023, 14 pgs.
Collison, Alan B.; Advisory Action for U.S. Appl. No. 17/688,356, filed Mar. 7, 2022, dated Apr. 26, 2023, 7 pgs.
Collison, Alan B.; Applicant-Initiated Interview Summary for U.S. Appl. No. 17/688,356, filed Mar. 7, 2022, dated Dec. 28, 2022, 3 pgs.
Collison, Alan B.; Applicant-Initiated Interview Summary for U.S. Appl. No. 17/688,356, filed Mar. 7, 2022, dated Apr. 6, 2023, 3 pgs.
Collison, Alan B.; Final Office Action for U.S. Appl. No. 17/688,356, filed Mar. 7, 2022, dated Feb. 1, 2023, 21 pgs.
Collison, Alan B.; Non-Final Office Action for U.S. Appl. No. 17/688,356, filed Mar. 7, 2022, dated Oct. 24, 2022, 41 pgs.
Collison, Alan B.; Restriction Requirement for U.S. Appl. No. 17/688,356, filed Mar. 7, 2022, dated Jun. 20, 2022, 9 pgs.
Sollie, Greg; Applicant Initiated Interview Summary for U.S. Appl. No. 15/988,550, filed May 24, 2018, dated Dec. 27, 2019, 3 pgs.
Sollie, Greg; Applicant-Initiated Interview Summary for U.S. Appl. No. 15/988,550, filed May 24, 2018, dated Dec. 24, 2020, 2 pgs.

Sollie, Greg; International Preliminary Report on Patentability for PCT Application No. PCT/US18/65459, filed Dec. 13, 2018, dated Jul. 2, 2020, 11 pgs.
Sollie, Greg; International Search Report and Written Opinion for PCT Application No. PCT/US18/65459, filed Dec. 13, 2018, dated May 1, 2019, 15 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US18/65461, filed Dec. 13, 2018, dated Mar. 21, 2019, 13 pgs.
MP Global Products, LLC; First Examination Report for Australian patent application No. 2017359035, filed Nov. 7, 2017, dated Nov. 27, 2020, 3 pgs.
MP Global Products, LLC; Office Action for Canadian patent application No. 3,043,192, filed Nov. 7, 2017, dated Oct. 25, 2021, 11 pgs.
MP Global Products, LLC; Office Action for Canadian patent application No. 3,043,192, filed Nov. 7, 2017, dated Nov. 8, 2022, 3 pgs.
MP Global Products, LLC; Office Action for Canadian patent application No. 3,043,192, filed Nov. 7, 2017, dated Apr. 8, 2022, 9 pgs.
MP Global Products LLC: European Office Action for application No. 17868605.1, dated Dec. 3, 2020, 4 pgs.
MP Global Products LLC: European Office Action for application No. 17868605.1, dated Apr. 13, 2021, 3 pgs.
MP Global Products LLC: European Office Action Response for application No. 17868605.1, filed Jan. 19, 2021, 15 pgs.
MP Global Products LLC: European Search Report Response for serial No. 17868605.1, filed Oct. 2, 2020, 15 pgs.
Collison, Alan B.; Examination Report for Australian patent application No. 2021204424, filed Nov. 7, 2017, dated Dec. 6, 2022, 2 pgs.
Collison, Alan B.; Examination Report for Australian patent application No. 2021204424, filed Nov. 7, 2017, dated Aug. 25, 2022, 8 pgs.
Collison, Alan B.; Office Action for Chinese patent application No. 2021107289972, filed Nov. 7, 2017, dated Apr. 15, 2023, 7 pgs.
Collison, Alan. B.; Extended European Search Report for application No. 21160713.0, filed Nov. 7, 2017, dated May 10, 2021, 7 pgs.
MP Global Products, LLC; Extended European Search Report for application No. 22152100.8, dated Jun. 2, 2022, 7 pgs.
Collison, Alan B.; Extended European Search Report for application No. 22173063.3, filed Nov. 7, 2017, dated Sep. 9, 2022, 7 pgs.
MP Global Products, L.L.C.; Examination Report for Australian patent application No. 2021245201, filed Nov. 7, 2017, dated Feb. 21, 2023, 3 pgs.
Sollie, Greg; International Preliminary Report on Patentability for PCT/US18/65463, filed Dec. 13, 2018, dated Dec. 3, 2020, 9 pgs.
Sollie, Greg; International Search Report and Written Opinion for PCT/US18/65463, filed Dec. 13, 2018, dated Mar. 25, 2019, 11 pgs.
Sollie, Greg; International Preliminary Report on Patentability for PCT Application No. PCT/US20/24820, filed Mar. 26, 2020, dated Nov. 11, 2021, 13 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Preliminary Report on Patentability for PCT Application No. PCT/US19/60486, filed Nov. 18, 2019, dated May 27, 2021, 9 pgs.
Sollie, Greg; International Search Report and Written Opinion for PCT Application No. PCT/US19/60486, filed Nov. 18, 2019, dated Jan. 13, 2020, 10 pgs.
Sollie, Greg; International Preliminary Report on Patentability for PCT Application No. PCT/US19/59764, filed Nov. 5, 2019, dated May 27, 2021, 9 pgs.
Sollie, Greg; International Search Report and Written Opinion for PCT Application No. PCT/US19/59764, filed Nov. 5, 2019, dated Jul. 1, 2020, 13 pgs.
Sollie, Greg; Invitation to Pay Additional Fees for PCT/US19/59764, filed Nov. 5, 2019, dated Jan. 2, 2020, 2 pgs.

(56) References Cited

OTHER PUBLICATIONS

Amazon. ECOOPTS Cling Wrap Plastic Food Wrap with Slide Cutter. First available Dec. 21, 2020. Visited Sep. 2, 2022. https://www.amazon.com/ECOOPTS-Cling-Plastic-Cutter-121 N %C3%971 000FT/dp/B08R3L7K4W/ (Year: 2020).
Sollie, Greg; Notice of Allowance for Design U.S. Appl. No. 29/745,881, filed Aug. 10, 2020, dated May 9, 2022, 139 pgs.
Sollie, Greg; Notice of Allowance for Design U.S. Appl. No. 29/745,881, filed Aug. 10, 2020, dated Sep. 13, 2022, 12 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials—Fiber-Based Materials", Sustainable Packaging Solution, 2009.
Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, dated Feb. 19, 2018, 15 pgs.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Periwrap; Article entitled: "Insulated Solutions", located at <https://www.peri-wrap.com/insulation/>, accessed on Dec. 3, 2018, 9 pgs.
Salazar Packaging; Article entitle: "Custom Packaging and Design", located at <https://salazarpackaging.com/custom-packaging-and-design/>, accessed on Sep. 28, 2017, 2 pgs.
Singh, et al; Article entitled: "Performance Comparison of Thermal Insulated Packaging Boxes, Bags and Refrigerants for Single-parcel Shipments", published Mar. 13, 2007, 19 pgs.
Tera-Pak; Article entitled: "Insulated Shipping Containers", located at <http://www.tera-pak.com/>, accessed on Mar. 20, 2017, 3 pgs.
UN Packaging; Article entitled: "CooLiner® Insulated Shipping Bags", available at <http://www.chem-tran.com/packaging/supplies/cooliner-insulated-shipping-bags.php>, accessed on Aug. 30, 2017, 2 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Sollie, Greg; Final Office Action for U.S. Appl. No. 16/951,465, filed Nov. 18, 2020, dated Aug. 18, 2022, 20 pgs.
Sollie, Greg; Non-Final Office Action for U.S. Appl. No. 17/493,449, filed Oct. 4, 2021, dated Jul. 14, 2022, 110 pgs.
Benezet, et al.; Article entitled: "Mechanical and physical properties of expanded starch, reinforced by natural fibres", Industrial Corps and Products 37 (2012) 435-440, available online Oct. 4, 2011, 6 pgs.
Collison, Alan B.; Office Action for Mexico patent application No. MX/a/2019/005376, dated Mar. 1, 2022, 5 pgs.
Collison, Alan B.; Office Action for Chinese patent application No. 2021107289972, filed Nov. 7, 2017, dated May 7, 2022, 20 pgs.
Waltermire, Jamie; Final Office Action for U.S. Appl. No. 17/127,060, filed Dec. 18, 2020, dated Oct. 19, 2023, 44 pgs.
Waltermire, Jamie; Notice of Allowance for U.S. Appl. No. 17/127,102, filed Dec. 18, 2020, dated Oct. 20, 2023, 10 pgs.

Waltermire, Jamie; Final Office Action for U.S. Appl. No. 17/497,054, filed Oct. 8, 2021, dated Nov. 28, 2023, 26 pgs.
Collison, Alan B.; Final Office Action for U.S. Appl. No. 17/688,356, filed Mar. 7, 2022, dated Nov. 21, 2023, 29 pgs.
Sollie, Greg; Final Office Action for U.S. Appl. No. 17/536,878, filed Nov. 29, 2021, dated Oct. 20, 2023, 29 pgs.
Sollie, Greg; Requirement for Restriction/Election for U.S. Appl. No. 18/140,641, filed Apr. 28, 2023, dated Nov. 8, 2023, 5 pgs.
Anagnostopoulos, John; Final Office Action for U.S. Appl. No. 17/666,206, filed Feb. 7, 2022, dated Oct. 2, 2023, 32 pgs.
paperweb.com, 2006, downloaded online Sep. 26, 2023 from archive.org (Year: 2006), 1 pg.
Sollie, Greg; Examination Report for Australian application No. 2018260918, filed Nov. 8, 2018, dated Oct. 13, 2023, 5 pgs.
Sollie, Greg; Examination Report for Australian application No. 2018260918, filed Nov. 8, 2018, dated Dec. 2, 2023, 5 pgs.
Sollie, Greg; Examination Report for Australian patent application No. 2018260919, filed Nov. 8, 2018, dated Oct. 16, 2023, 4 pgs.
Sollie, Greg; Examination Report for Australian patent application No. 2018260919, filed Nov. 8, 2018, dated Dec. 5, 2023, 4 pgs.
Jun. 21, 2023 Waltermire, Jamie; Non-Final Office Action for U.S. Appl. No. 17/127,060, filed Dec. 18, 2020, dated Jun. 21, 2023, 159 pgs.
Jul. 6, 2023 Waltermire, Jamie; Final Office Action for U.S. Appl. No. 17/127,102, filed Dec. 18, 2020, dated Jul. 6, 2023, 35 pgs.
Mar. 8, 2020 Moo-Tun, et al., Article entitled: "Assessing the effect of PLA, cellulose microfibers and CaCO3 on the properties of starch-based foams using a factorial design", Polymer Testing 86 (2020) 106482, available on Mar. 8, 2020, 10 pgs.
Aug. 15, 2007 Salgado, et al.; Article entitled: "Biodegradable foams based on cassava starch, sunflower proteins and cellulose fibers obtained by a baking process", Journal of Food Engineering 85 (2008) 435-443, available online Aug. 15, 2007, 9 pgs.
Jan. 2010 Schmidt, et al.; Article entitled: "Characterization of Foams Obtained from Cassava Starch, Cellulose Fibres and Dolomitic Limestone by a Thermopressing Process", Brazilian Archives of Biology and Technology vol. 53, n. 1, pp. 88-192, Jan.-Feb. 2010, 8 pgs.
2011 Avella, et al.; Article entitled: "Biodegradable PVOH-based foams for packaging applications", Journal of Cellular Plastics 2011, 47:271, 12 pgs.
Oct. 4, 2011 Benezet, et al.; Article entitled: "Mechanical and physical properties of expanded starch, reinforced by natural fibres", Industrial Corps and Products 37 (2012) 435-440, available online Oct. 4, 2011, 6 pgs.
Mar. 1, 2022 Collison, Alan B.; Office Action for Mexico patent application No. MX/a/2019/005376, dated Mar. 1, 2022, 5 pgs.
Waltermire, Jamie; Certificate of Correction for U.S. Appl. No. 15/482,186, filed Apr. 7, 2017, dated Dec. 29, 2020, 1 pg.
Waltermire, Jamie; Non-Final Office Action for U.S. Appl. No. 15/482, 186, filed Apr. 7, 2017, dated Aug. 20, 2019, 81 pgs.
Waltermire, Jamie; Notice of Allowance for U.S. Appl. No. 15/482,186, filed Apr. 7, 2017, dated Mar. 5, 2020, 29 pgs.
Waltermire, Jamie; Requirement for Restriction/Election for U.S. Appl. No. 15/482,186, filed Apr. 7, 2017, dated Apr. 17, 2019, 7 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Final Office Action for U.S. Appl. No. 16/526,511, filed Jul. 30, 2019, dated May 19, 2020, 39 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/526,511, filed Jul. 30, 2019, dated Jul. 10, 2020, 23 pgs.
Waltermire, Jamie; Notice of Allowance for U.S. Appl. No. 16/526,511, filed Jul. 30, 2019, dated Sep. 14, 2020, 18 pgs.
Carlson, Dave; Article entitled: "FBA Updates Voluntary Standard for Recyclable Wax Alternatives", dated Aug. 14, 2013, Fiber Box Association (Year: 2013), 2 pgs.
Waltermire, Jamie; Final Office Action for U.S. Appl. No. 17/079,437, filed Oct. 24, 2020, dated Feb. 24, 2022, 24 pgs.
Waltermire, Jamie; Non-Final Office Action for U.S. Appl. No. 17/079,437, filed Oct. 24, 2020, dated Sep. 20, 2021, 108 pgs.

(56) References Cited

OTHER PUBLICATIONS

Waltermire, Jamie; Notice of Allowance for U.S. Appl. No. 17/079,437, filed Oct. 24, 2020, dated Jun. 2, 2022, 21 pgs.
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/482,200, filed Apr. 7, 2017, dated Jun. 11, 2018, 36 pgs.
Waltermire, Jamie; Notice of Allowance for U.S. Appl. No. 15/482,200, filed Apr. 7, 2017, dated May 14, 2019, 25 pgs.
Waltermire, Jamie; Applicant-Initiated Interview Summary for U.S. Appl. No. 16/530,045, filed Aug. 2, 2019, dated Jun. 15, 2020, 3 pgs.
Waltermire, Jamie; Certificate of Correction for U.S. Appl. No. 16/530,045, filed Aug. 2, 2019, dated Mar. 28, 2023, 1 pg.
Waltermire, Jamie; Final Office Action for U.S. Appl. No. 16/530,045, filed Aug. 2, 2019, dated Nov. 24, 2020, 40 pgs.
Waltermire, Jamie; Final Office Action for U.S. Appl. No. 16/530,045, filed Aug. 2, 2019, dated Jun. 9, 2022, 20 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Non-Final Office Action for U.S. Appl. No. 16/530,045, filed Aug. 2, 2019, dated Feb. 10, 2022, 82 pgs.
Waltermire, Jamie; Non-Final Office Action for U.S. Appl. No. 16/530,045, filed Aug. 2, 2019, dated May 27, 2020, 38 pgs.
Waltermire, Jamie; Notice of Allowance for U.S. Appl. No. 16/530,045, filed Aug. 2, 2019, dated Oct. 5, 2022, 14 pgs.
Waltermire, Jamie; Non-Final Office Action for U.S. Appl. No. 16/164,933, filed Oct. 19, 2018, dated Nov. 18, 2020, 104 pgs.
Waltermire, Jamie; Notice of Allowance for U.S. Appl. No. 16/164,933, filed Oct. 19, 2018, dated May 14, 2021, 24 pgs.
Waltermire, Jamie; Notice of Allowance for U.S. Appl. No. 16/164,933, filed Oct. 19, 2018, dated Aug. 9, 2021, 10 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Final Office Action for U.S. Appl. No. 15/590,345, filed May 9, 2017, dated Mar. 19, 2019, 42 pgs.
Waltermire, Jamie; Non-Final Office Action for U.S. Appl. No. 15/590,345, filed May 9, 2017, dated Aug. 24, 2018, 41 pgs.
Waltermire, Jamie; Notice of Allowance for U.S. Appl. No. 15/590,345, filed May 9, 2017, dated Oct. 1, 2019, 28 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Non-Final Office Action for U.S. Appl. No. 16/721,995, filed Dec. 20, 2019, dated Dec. 27, 2021, 133 pgs.
Waltermire, Jamie; Non-Final Office Action for U.S. Appl. No. 16/721,995, filed Dec. 20, 2019, dated Jul. 5, 2022, 28 pgs.
Waltermire, Jamie; Notice of Allowance for U.S. Appl. No. 16/721,995, filed Dec. 20, 2019, dated Dec. 5, 2022, 22 pgs.
Waltermire, Jamie; Requirement for Restriction/Election for U.S. Appl. No. 16/721,995, filed Dec. 20, 2019, dated Aug. 13, 2021, 6 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Certificate of Correction for U.S. Appl. No. 15/590,349, filed May 9, 2017, dated Jun. 1, 2021, 1 pg.
Waltermire, Jamie; Corrected Notice of Allowance for U.S. Appl. No. 15/590,349, filed May 9, 2017, dated Nov. 2, 2020, 9 pgs.
Waltermire, Jamie; Corrected Notice of Allowance for U.S. Appl. No. 15/590,349, filed May 9, 2017, dated Dec. 22, 2020, 9 pgs.
Waltermire, Jamie; Corrected Notice of Allowance for U.S. Appl. No. 15/590,349, filed May 9, 2017, dated Feb. 5, 2021, 9 pgs.
Waltermire, Jamie; Final Office Action for U.S. Appl. No. 15/590,349, filed May 9, 2017, dated Jan. 6, 2020, 26 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/590,349, filed May 9, 2017, dated Nov. 5, 2018, 41 pgs.
Waltermire, Jamie; Non-Final Office Action for U.S. Appl. No. 15/590,349, filed May 9, 2017, dated Jun. 12, 2020, 30 pgs.
Waltermire, Jamie; Non-Final Office Action for U.S. Appl. No. 15/590,349, filed May 9, 2017, dated Sep. 5, 2019, 25 pgs.
Waltermire, Jamie; Notice of Allowance for U.S. Appl. No. 15/590,349, filed May 9, 2017, dated Oct. 20, 2020, 20 pgs.
Waltermire, Jamie; Requirement for Restriction/Election for U.S. Appl. No. 15/590,349, filed May 9, 2017, dated Aug. 30, 2018, 10 pgs.
Waltermire, Jamie; Certificate of Correction for U.S. Appl. No. 16/293,716, filed Mar. 6, 2019, dated Aug. 30, 2022, 1 pg.
Waltermire, Jamie; Non-Final Office Action for U.S. Appl. No. 17/891,565, filed Aug. 19, 2022, dated Sep. 6, 2023, 115 pgs.
Waltermire, Jamie; Requirement for Restriction/Election for U.S. Appl. No. 17/173,293, filed Feb. 11, 2021, dated Aug. 30, 2023, 6 pgs.
Waltermire, Jamie; Notice of Allowance for U.S. Appl. No. 17/127,050, filed Dec. 18, 2020, dated Aug. 7, 2023, 14 pgs.
Waltermire, Jamie; Non-Final Office Action for U.S. Appl. No. 17/497,054, filed Oct. 8, 2021, dated Aug. 3, 2023, 24 pgs.
Waltermire, Jamie; Certificate of Correction for U.S. Appl. No. 17/497,057, filed Oct. 8, 2021, dated Sep. 5, 2023, 1 pg.
Sollie, Greg; Certificate of Correction for U.S. Appl. No. 16/951,465, filed Nov. 18, 2020, dated Aug. 1, 2023, 1 pg.
Collison, Alan B.; Advisory Action for U.S. Appl. No. 17/688,356, filed Mar. 7, 2022, dated Jul. 25, 2023, 6 pgs.
Collison, Alan B.; Non-Final Office Action for U.S. Appl. No. 17/688,356, filed Mar. 7, 2022, dated Jul. 31, 2023, 18 pgs.
Solie, Greg; Certificate of Correction for U.S. Appl. No. 16/280,595, filed Feb. 20, 2019, dated Sep. 12, 2023, 2 pgs.
Sollie, Greg; Notice of Allowance for U.S. Appl. No. 17/679,772, filed Feb. 24, 2022, dated Aug. 30, 2023, 12 pgs.
Sollie, Greg; Final Office Action for U.S. Appl. No. 17/901,558, filed Sep. 1, 2022, dated Aug. 21, 2023, 25 pgs.
Sollie, Greg; Certificate of Correction for U.S. Appl. No. 17/493,449, filed Oct. 4, 2021, dated Aug. 15, 2023, 1 pg.
Sollie, Greg; Notice of Allowance for U.S. Appl. No. 18/094,806, filed Jan. 9, 2023, dated Jul. 21, 2023, 12 pgs.
Sollie, Greg; Certificate of Correction for U.S. Appl. No. 17/493,474, filed Oct. 4, 2021, dated Aug. 1, 2023, 3 pgs.
Sollie, Greg; Notice of Allowance for U.S. Appl. No. 18/095,310, filed Jan. 10, 2023, dated Jul. 28, 2023, 19 pgs.
Any Custom Box. Perforated Dispenser Boxes. Publication date unavailable. Visited May 2, 2022. https://anycustombox.com/folding-cartons/perforated-dispenser-boxes/, 9 pgs.
Massage Warehouse. Cando® Low Powder 100 Yard Perforated Dispenser. Publication date unavailable. Visited May 2, 2022. https://www.massagewarehouse.com/products/cando-perf-low-powder-1 DO-yd-dispenser/, 2 pgs.
Premier Storage. Oil & Fuel Absorbent Pads. Publication date unavailable. Visited May 2, 2022. https://www.premier-storage.co.uk/oil-and-fuel-absorbent-pads-bonded-and-perforated-double-weight.html, 1 pg.
Waltermire, Kamie; Non-Final Office Action for U.S. Appl. No. 17/127,102, filed Dec. 28, 2020, dated Jan. 12, 2023, 19 pgs.
Waltermire, Jamie; Final Office Action for U.S. Appl. No. 16/689,433, filed Nov. 20, 2019, dated Aug. 5, 2021, 23 pgs.
Waltermire, Jamie; Non-Final Office Action for U.S. Appl. No. 16/689,433, filed Nov. 20, 2019, dated Feb. 23, 2021, 88 pgs.
Waltermire, Jamie; Notice of Allowance for U.S. Appl. No. 16/689,433, filed Nov. 20, 2019, dated Oct. 15, 2021, 14 pgs.
Waltermire, Jamie; Requirement for Restriction/Election for U.S. Appl. No. 16/689,433, filed Nov. 20, 2019, dated Oct. 16, 2020, 6 pgs.
Waltermire, Jamie; Final Office Action for U.S. Appl. No. 17/497,054, filed Oct. 8, 2021, dated Apr. 24, 2023, 33 pgs.
Waltermire, Jamie; Non-Final Office Action for U.S. Appl. No. 17/497,054, filed Oct. 8, 2021, dated Nov. 15, 2022, 131 pgs.
Waltermire, Jamie; Requirement for Restriction/Election for U.S. Appl. No. 17/497,054, filed Oct. 8, 2021, dated Oct. 6, 2022, 8 pgs.
Waltermire, Jamie; Non-Final Office Action for U.S. Appl. No. 17/497,057, filed Oct. 8, 2021, dated Oct. 19, 2022, 115 pgs.

(56) References Cited

OTHER PUBLICATIONS

Waltermire, Jamie; Notice of Allowance for U.S. Appl. No. 17/497,057, filed Oct. 8, 2021, dated Feb. 16, 2023, 25 pgs.
Waltermire, Jamie; Requirement for Restriction/Election for U.S. Appl. No. 17/497,057, filed Oct. 8, 2021, dated Sep. 15, 2022, 8 pgs.
Sollie, Greg; Non-Final Office Action for U.S. Appl. No. 15/845,545, filed Dec. 18, 2017, dated Mar. 5, 2019, 41 pgs.
Sollie, Greg; Notice of Allowance for U.S. Appl. No. 15/845,545, filed Dec. 18, 2017, dated Jun. 19, 2019, 20 pgs.
Sollie, Greg; Final Office Action for U.S. Appl. No. 16/552,277, filed Aug. 27, 2019, dated Aug. 7, 2020, 19 pgs.
Sollie, Greg; Non-Final Office Action for U.S. Appl. No. 16/552,277, filed Aug. 27, 2019, dated Jun. 3, 2020, 68 pgs.
Sollie, Greg; Notice of Allowance for U.S. Appl. No. 16/552,277, filed Aug. 27, 2019, dated Aug. 31, 2020, 6 pgs.
Sollie, Greg; Restriction Requirement for U.S. Appl. No. 16/552,277, filed Aug. 27, 2019, dated Apr. 20, 2020, pgs.
Sollie, Greg; Non-Final Office Action for U.S. Appl. No. 16/951,454, filed Nov. 18, 2020, dated Aug. 4, 2022, 165 pgs.
Sollie, Greg; Notice of Allowance for U.S. Appl. No. 16/951,454, filed Nov. 18, 2020, dated Nov. 15, 2022, 13 pgs.
Sollie, Greg; Notice of Allowance for U.S. Appl. No. 16/951,454, filed Nov. 18, 2020, dated May 2, 2023, 6 pgs.
Sollie, Greg; Restriction Requirement for U.S. Appl. No. 16/951,454, filed Nov. 18, 2020, dated Jun. 14, 2022, 14 pgs.
Sollie, Greg; Applicant-Initiated Interview Summary for U.S. Appl. No. 16/951,465, filed Nov. 18, 2020, dated Oct. 5, 2022, 2 pgs.
Sollie, Greg; Non-Final Office Action for U.S. Appl. No. 16/951,465, filed Nov. 18, 2020, dated Dec. 13, 2022, 17 pgs.
Sollie, Greg; Non-Final Office Action for U.S. Appl. No. 16/951,465, filed Nov. 18, 2020, dated May 13, 2022, 123 pgs.
Sollie, Greg; Notice of Allowance for U.S. Appl. No. 16/951,465, filed Nov. 18, 2020, dated Feb. 28, 2023, 12 pgs.
Sollie, Greg; Certificate of Correction for U.S. Appl. No. 15/845,540, filed Dec. 18, 2017, dated Jun. 1, 2021, 1 pg.
Sollie, Greg; Final Office Action for U.S. Appl. No. 15/845,540, filed Dec. 18, 2017, dated Oct. 30, 2019, 56 pgs.
Sollie, Greg; Final Office Action for U.S. Appl. No. 15/845,540, filed Dec. 18, 2017, dated Sep. 2, 2020, 28 pgs.
Sollie, Greg; Non-Final Office Action for U.S. Appl. No. 15/845,540, filed Dec. 18, 2017, dated Feb. 19, 2020, 32 pgs.
Sollie, Greg; Non-Final Office Action for U.S. Appl. No. 15/845,540, filed Dec. 18, 2017, dated Apr. 2, 2019, 50 pgs.
Sollie, Greg; Notice of Allowance for U.S. Appl. No. 15/845,540, filed Dec. 18, 2017, dated Sep. 17, 2020, 5 pgs.
Sollie, Greg; Certificate of Correction for U.S. Appl. No. 17/100,819, filed Nov. 21, 2020, dated Feb. 28, 2023, 2 pgs.
Sollie, Greg; Final Office Action for U.S. Appl. No. 17/100,819, filed Nov. 21, 2020, dated Apr. 13, 2022, 39 pgs.
Sollie, Greg; Non-Final Office Action for U.S. Appl. No. 17/100,819, filed Nov. 21, 2020, dated Sep. 29, 2021, 107 pgs.
Sollie, Greg; Notice of Allowance for U.S. Appl. No. 17/100,819, filed Nov. 21, 2020, dated Sep. 7, 2022, 15 pgs.
"Green Cell Foam Shipping Coolers", located at <https://www.greencellfoam.com/shipping-coolers>, accessed on Oct. 18, 2019, 4 pgs.
Collison, Alan B.; Applicant Interview Summary for U.S. Appl. No. 15/677,738, filed Aug. 15, 2017, dated Dec. 5, 2018, 4 pgs.
Collison, Alan B.; Applicant Interview Summary for U.S. Appl. No. 15/677,738, filed Aug. 15, 2017, dated Apr. 22, 2019, 4 pgs.
Collison, Alan B.; Corrected Notice of Allowance for U.S. Appl. No. 15/677,738, filed Aug. 15, 2017, dated Jul. 15, 2019, 7 pgs.
Collison, Alan B.; Final Office ACtion for U.S. Appl. No. 15/677,738, filed Aug. 15, 2017, dated Feb. 28, 2019, 14 pgs.
Collison, Alan B.; Non-Final Office Action for U.S. Appl. No. 15/677,738, filed Aug. 15, 2017, dated Oct. 23, 2018, 11 pgs.
Collison, Alan B.; Notice of Allowance for U.S. Appl. No. 15/677,738, filed Aug. 15, 2017, dated Oct. 29, 2019, 14 pgs.
Collison, Alan B.; Notice of Allowance for U.S. Appl. No. 15/677,738, filed Aug. 15, 2017, dated Jun. 19, 2019, 10 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
Collison, Alan B.; Supplemental Notice of Allowance for U.S. Appl. No. 15/677,738, filed Aug. 15, 2017, dated Dec. 10, 2019, 4 pgs.
CooLiner® Insulated Shipping Bags, available at <http://www/chem-tran.com/packaging/supplies/cooliner-insulated-shipping-bags.php>, accessed on Oct. 18, 2019, 4 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf.
Collison, Alan B.; Advisory Action for U.S. Appl. No. 16/658,756, filed Oct. 21, 2019, dated Sep. 25, 2020, 4 pgs.
Collison, Alan B.; Applicant Interview Summary for U.S. Appl. No. 16/658,756, filed Oct. 21, 2019, dated May 6, 2020, 3 pgs.
Waltermire, Jamie; Final Office Action for U.S. Appl. No. 16/293,716, filed Mar. 6, 2019, dated Oct. 29, 2020, 19 pgs.
Waltermire, Jamie; Final Office Action for U.S. Appl. No. 16/293,716, filed Mar. 6, 2019, dated Sep. 10, 2020, 24 pgs.
Waltermire, Jamie; Non-Final Office Action for U.S. Appl. No. 16/293,716, filed Mar. 6, 2019, dated Feb. 5, 2021, 18 pgs.
Waltermire, Jamie; Non-Final Office Action for U.S. Appl. No. 16/293,716, filed Mar. 6, 2019, dated May 5, 2020, 70 pgs.
Waltermire, Jamie; Non-Final Office Action for U.S. Appl. No. 16/293,716, filed Mar. 6, 2019, dated Jul. 26, 2021, 26 pgs.
Waltermire, Jamie; Notice of Allowance for U.S. Appl. No. 16/293,716, filed Mar. 6, 2019, dated Nov. 3, 2021, 20 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Certificate of Correction for U.S. Appl. No. 16/526,555, filed Jul. 30, 2019, dated Nov. 16, 2021, 1 pg.
Waltermire, Jamie; Final Office Action for U.S. Appl. No. 16/526,555, filed Jul. 30, 2019, dated Mar. 8, 2021, 25 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Notice of Allowance for U.S. Appl. No. 16/526,555, filed Jul. 30, 2019, dated May 21, 2021, 32 pgs.
Waltermire, Jamie; Requirement for Restriction/Election for U.S. Appl. No. 16/526,555, filed Jul. 30, 2019, dated Jan. 17, 2020, 7 pgs.
Waltermire, Jamie; Supplemental Notice of Allowance for U.S. Appl. No. 16/526,555, filed Jul. 30, 2019, dated Jun. 8, 2021, 13 pgs.
Waltermire, Jamie; Supplemental Notice of Allowance for U.S. Appl. No. 16/526,555, filed Jul. 30, 2019, dated Aug. 11, 2021, 8 pgs.
Waltermire, Jamie; Final Office Action for U.S. Appl. No. 17/127,050, filed Dec. 18, 2020, dated Apr. 26, 2023, 32 pgs.
Waltermire, Jamie; Non-Final Office Action for U.S. Appl. No. 17/127,050, filed Dec. 18, 2020, dated Dec. 2, 2022, 22 pgs.
Waltermire, Jamie; Non-Final Office Action for U.S. Appl. No. 17/127,050, filed Dec. 18, 2020, dated Jun. 17, 2022, 147 pgs.
Waltermire, Jamie; Requirement for Restriction/Election for U.S. Appl. No. 17/127,050, filed Dec. 18, 2020, dated Apr. 14, 2022, 5 pgs.
Waltermire, Jamie; Non-Final Office Action for U.S. Appl. No. 17/127,060, filed Dec. 18, 2020, dated Jun. 21, 2023, 159 pgs.
Waltermire, Jamie; Final Office Action for U.S. Appl. No. 15/663,905, filed Jul. 31, 2017, dated Aug. 22, 2019, 23 pgs.
Waltermire, Jamie; Non-Final Office Action for U.S. Appl. No. 15/663,905, filed Jul. 31, 2017, dated Jun. 25, 2019, 66 pgs.
Waltermire, Jamie; Notice of Allowance for U.S. Appl. No. 15/663,905, filed Jul. 31, 2017, dated Nov. 4, 2019, 18 pgs.
Waltermire, Jamie; Requirement for Restriction/Election for U.S. Appl. No. 15/663,905, filed Jul. 31, 2017, dated Mar. 21, 2019, 8 pgs.

(56) References Cited

OTHER PUBLICATIONS

Waltermire, Jamie; Advisory Action for U.S. Appl. No. 16/381,678, filed Apr. 11, 2019, dated Feb. 26, 2020, 3 pgs.
Waltermire, Jamie; Corrected Notice of Allowance for U.S. Appl. No. 16/381,678, filed Apr. 11, 2019, dated Aug. 9, 2021, 8 pgs.
Waltermire, Jamie; Examiner-Initiated Interview Summary for U.S. Appl. No. 16/381,678, filed Apr. 11, 2019, dated Aug. 30, 2021, 2 pgs.
Waltermire, Jamie; Final Office Action for U.S. Appl. No. 16/381,678, filed Apr. 11, 2019, dated Oct. 19, 2020, 24 pgs.
Waltermire, Jamie; Final Office Action for U.S. Appl. No. 16/381,678, filed Apr. 11, 2019, dated Dec. 30, 2019, 17 pgs.
Waltermire, Jamie; Final Office Action for U.S. Appl. No. 16/381,678, filed Apr. 11, 2019, dated Jun. 16, 2020, 8 pgs.
Waltermire, Jamie; Final Office Action for U.S. Appl. No. 16/381,678, filed Apr. 11, 2019, dated Aug. 20, 2020, 21 pgs.
Waltermire, Jamie; Non-Final Office Action for U.S. Appl. No. 16/381,678, filed Apr. 11, 2019, dated Mar. 5, 2021, 36 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Non-Final Office Action for U.S. Appl. No. 16/381,678, filed Apr. 11, 2019, dated Sep. 9, 2019, 50 pgs.
Waltermire, Jamie; Notice of Allowance for U.S. Appl. No. 16/381,678, filed Apr. 11, 2019, dated Jun. 3, 2021, 14 pgs.
Waltermire, Jamie; Notice of Allowance for U.S. Appl. No. 16/381,678, filed Apr. 11, 2019, dated Jul. 30, 2020, 15 pgs.
Waltermire, Jamie; Final Office Action for U.S. Appl. No. 16/561,203, filed Sep. 5, 2019, dated Sep. 10, 2020, 25 pgs.
Waltermire, Jamie; Non-Final Office Action for U.S. Appl. No. 16/561,203, filed Sep. 5, 2019, dated May 6, 2020, 59 pgs.
Waltermire, Jamie; Notice of Allowance for U.S. Appl. No. 16/561,203, filed Sep. 5, 2019, dated Nov. 3, 2020, 14 pgs.
Waltermire, Jamie; Requirement for Restriction/Election for U.S. Appl. No. 16/561,203, filed Sep. 5, 2019, dated Feb. 26, 2020, 5 pgs.
Waltermire, Jamie; Final Office Action for U.S. Appl. No. 16/689,407, filed Nov. 20, 2019, dated Apr. 23, 2021, 18 pgs.
Waltermire, Jamie; Non-Final Office Action for U.S. Appl. No. 16/689,407, filed Nov. 20, 2019, dated Jan. 8, 2021, 92 pgs.
Waltermire, Jamie; Notice of Allowance for U.S. Appl. No. 16/689,407, filed Nov. 20, 2019, dated Jul. 19, 2021, 12 pgs.
Waltermire, Jamie; Requirement for Restriction/Election for U.S. Appl. No. 16/689,407, filed Nov. 20, 2019, dated Oct. 29, 2020, 6 pgs.
Waltermire, Jamie; Advisory Action for U.S. Appl. No. 17/127,102, filed Dec. 18, 2020, dated Dec. 7, 2022, 4 pgs.
Waltermire, Jamie; Applicant-Initiated Interview Summary for U.S. Appl. No. 17/127,102, filed Dec. 18, 2020, dated Oct. 31, 2022, 2 pgs.
Waltermire, Jamie; Final Office Action for U.S. Appl. No. 17/127,102, filed Dec. 18, 2020, dated Oct. 5, 2022, 31 pgs.
Waltermire, Jamie; Final Office Action for U.S. Appl. No. 17/127,102, filed Dec. 18, 2020, dated Jul. 6, 2023, 35 pgs.
Waltermire, Jamie; Non-Final Office Action for U.S. Appl. No. 17/127,102, filed Dec. 18, 2020, dated Jun. 27, 2022, 128 pgs.
Waltermire, Jamie; Requirement for Restriction/Election for U.S. Appl. No. 17/127,102, filed Dec. 18, 2020, dated Apr. 14, 2022, 6 pgs.
Sollie, Greg; Final Office Action for U.S. Appl. No. 15/988,550, filed May 24, 2018, dated Aug. 14, 2019, 19 pgs.
Sollie, Greg; Final Office Action for U.S. Appl. No. 15/988,550, filed May 24, 2018, dated Aug. 27, 2020, 27 pgs.
Sollie, Greg; Non-Final Office Action for U.S. Appl. No. 15/988,550, filed May 24, 2018, dated Oct. 9, 2019, 17 pgs.
Sollie, Greg; Non-Final Office Action for U.S. Appl. No. 15/988,550, filed May 24, 2018, dated Mar. 11, 2020, 35 pgs.
Sollie, Greg; Non-Final Office Action for U.S. Appl. No. 15/988,550, filed May 24, 2018, dated May 29, 2019, 48 pgs.
Sollie, Greg; Notice of Allowance for U.S. Appl. No. 15/988,550, filed May 24, 2018, dated Apr. 13, 2021, 21 pgs.
Sollie, Greg; Advisory Action for U.S. Appl. No. 16/280,595, filed Feb. 20, 2019, dated Jul. 6, 2020, 3 pgs.
Sollie, Greg; Applicant-Initiated Interview Summary for U.S. Appl. No. 16/280,595, filed Feb. 20, 2019 dated May 6, 2020, 3 pgs.
Sollie, Greg; Final Office Action for U.S. Appl. No. 16/280,595, filed Feb. 20, 2019, dated Oct. 3, 2019, 19 pgs.
Sollie, Greg; Final Office Action for U.S. Appl. No. 16/280,595, filed Feb. 20, 2019, dated Dec. 30, 2020, 25 pgs.
Sollie, Greg; Final Office Action for U.S. Appl. No. 16/280,595, filed Feb. 20, 2019, dated Mar. 24, 2020, 20 pgs.
Sollie, Greg; Final Office Action for U.S. Appl. No. 16/280,595, filed Feb. 20, 2019, dated May 31, 2022, 27 pgs.
Sollie, Greg; Final Office Action for U.S. Appl. No. 16/280,595, filed Feb. 20, 2019, dated Aug. 16, 2021, 21 pgs.
Sollie, Greg; Non-Final Office Action for U.S. Appl. No. 16/280,595, filed Feb. 20, 2019, dated Dec. 19, 2019, 23 pgs.
Sollie, Greg; Non-Final Office Action for U.S. Appl. No. 16/280,595, filed Feb. 20, 2019, dated Dec. 8, 2021, 17 pgs.
Sollie, Greg; Non-Final Office Action for U.S. Appl. No. 16/280,595, filed Feb. 20, 2019, dated Apr. 9, 2021, 20 pgs.
Sollie, Greg; Non-Final Office Action for U.S. Appl. No. 16/280,595, filed Feb. 20, 2019, dated May 29, 2019, 60 pgs.
Sollie, Greg; Non-Final Office Action for U.S. Appl. No. 16/280,595, filed Feb. 20, 2019, dated Aug. 28, 2020, 26 pgs.
Sollie, Greg; Non-Final Office Action for U.S. Appl. No. 16/280,595, filed 2/20/20219, dated Sep. 16, 2022, 14 pgs.
Sollie, Greg; Notice of Allowance for U.S. Appl. No. 16/280,595, filed Feb. 20, 2019, dated Mar. 31, 2023, 27 pgs.
Sollie, Greg; Advisory Action for U.S. Appl. No. 16/530,052, filed Aug. 2, 2019, dated Mar. 9, 2022, 4 pgs.
Sollie, Greg; Advisory Action for U.S. Appl. No. 16/530,052, filed Aug. 2, 2019, dated Jun. 29, 2021, 15 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Final Office Action for U.S. Appl. No. 16/530,052, filed Aug. 2, 2019, dated Dec. 27, 2019, 49 pgs.
Sollie, Greg; Final Office Action for U.S. Appl. No. 16/530,052, filed Aug. 2, 2019, dated Dec. 8, 2021, 17 pgs.
Sollie, Greg; Final Office Action for U.S. Appl. No. 16/530,052, filed Aug. 2, 2019, dated Apr. 20, 2021, 27 pgs.
Sollie, Greg; Final Office Action for U.S. Appl. No. 16/530,052, filed Aug. 2, 2019, dated Aug. 28, 2020, 29 pgs.
Sollie, Greg; Non-Final Ofice Action for U.S. Appl. No. 16/530,052, filed Aug. 2, 2019, dated Oct. 2, 2019, 12 pgs.
Sollie, Greg; Non-Final Office Action for U.S. Appl. No. 16/530,052, filed Aug. 2, 2019, dated Dec. 18, 2020, 17 pgs.
Sollie, Greg; Non-Final Office Action for U.S. Appl. No. 16/530,052, filed Aug. 2, 2019, dated Mar. 3, 2020, 24 pgs.
Sollie, Greg; Non-Final Office Action for U.S. Appl. No. 16/530,052, filed Aug. 2, 2019, dated Aug. 13, 2021, 22 pgs.
Cellulose Material Solutions, LLC; Brochure for Infinity Care Thermal Liner, accessed on Oct. 22, 2018, 2 pgs.
Sollie, Greg; Applicant-Initiated Interview Summary for U.S. Appl. No. 16/401,603, filed May 2, 2019, dated May 15, 2020, 3 pgs.
Sollie, Greg; Final Office Action for U.S. Appl. No. 16/401,603, filed May 2, 2019, dated Jun. 30, 2020, 13 pgs.
Sollie, Greg; Non-Final Office Action for U.S. Appl. No. 16/401,603, filed May 2, 2019, dated Mar. 10, 2020, 67 pgs.
Sollie, Greg; Notice of Allowance for U.S. Appl. No. 16/401,603, filed May 2, 2019, dated Aug. 31, 2020, 14 pgs.
Sollie, Greg; Requirement for Restriction/Election for U.S. Appl. No. 16/401,603, filed May 2, 2019, dated Feb. 18, 2020, 6 pgs.
Sollie, Greg; Non-Final Office Action for U.S. Appl. No. 17/078,884, filed Oct. 23, 2020, dated Aug. 12, 2021, 105 pgs.
Sollie, Greg; Notice of Allowance for U.S. Appl. No. 17/078,884, filed Oct. 23, 2020, dated Nov. 22, 2021, 12 pgs.
Sollie, Greg; Applicant-Initiated Interview Summary for U.S. Appl. No. 17/078,891, filed Oct. 23, 2020, dated Oct. 25, 2021, 2 pgs.
Sollie, Greg; Non-Final Office Action for U.S. Appl. No. 17/078,891, filed Oct. 23, 2020, dated Aug. 23, 2021, 104 pgs.
Sollie, Greg; Notice of Allowance for U.S. Appl. No. 17/078,891, filed Oct. 23, 2020, dated Dec. 1, 2021, 12 pgs.

(56) References Cited

OTHER PUBLICATIONS

Sollie, Greg; Non-Final Office Action for U.S. Appl. No. 17/679,772, filed Feb. 24, 2022, dated Oct. 17, 2022, 108 pgs.
Sollie, Greg; Non-Final Office Action for U.S. Appl. No. 17/679,772, filed Feb. 24, 2022, dated May 2, 2023, 29 pgs.
Sollie, Greg; Non-Final Office Action for U.S. Appl. No. 16/401,607, filed May 2, 2019, dated Aug. 19, 2020, 88 pgs.
Sollie, Greg; Notice of Allowance for U.S. Appl. No. 16/401,607, filed May 2, 2019, dated Dec. 4, 2020, 12 pgs.
Uline; Article entitled: Corrugated Corner Protectors—4×4", accessed on Oct. 25, 2018, 1 pg.
Sollie, Greg; Certificate of Correction for U.S. Appl. No. 17/187,239, filed Feb. 26, 2021, dated Apr. 26, 2022, 1 pg.
Sollie, Greg; Non-Final Office Action for U.S. Appl. No. 17/187,239, filed Feb. 26, 2021, dated Sep. 21, 2021, 99 pgs.
Sollie, Greg; Notice of Allowance for U.S. Appl. No. 17/187,239, filed Feb. 26, 2021, dated Oct. 13, 2021, 5 pgs.
Sollie, Greg; Non-Final Office Action for U.S. Appl. No. 17/536,878, filed Nov. 29, 2021, dated Apr. 12, 2023, 140 pgs.
DHL Express; Brochure for Dry Ice Shipping Guidelines, accessed on Oct. 26, 2018, 12 pgs.
Sollie, Greg; Corrected Notice of Allowance for U.S. Appl. No. 16/382,710, filed Apr. 12, 2019, dated Sep. 24, 2020, 9 pgs.
Sollie, Greg; Final Office Action for U.S. Appl. No. 16/382,710, filed Apr. 12, 2019, dated Apr. 6, 2020, 33 pgs.
Sollie, Greg; Non-Final Office Action for U.S. Appl. No. 16/382,710, filed Apr. 12, 2019, dated Oct. 10, 2019, 49 pgs.
Sollie, Greg; Notice of Allowance for U.S. Appl. No. 16/382,710, filed Apr. 12, 2019, dated Oct. 21, 2020, 5 pgs.
Sollie, Greg; Notice of Allowance for U.S. Appl. No. 16/382,710, filed Apr. 12, 2019, dated Jun. 3, 2020, 12 pgs.
Sollie, Greg; Requirement for Restriction/Election for U.S. Appl. No. 16/382,710, filed Apr. 12, 2019, dated Jul. 15, 2019, 6 pgs.
Sollie, Greg; Certificate of Correction for U.S. Appl. No. 16/879,811, filed May 21, 2020, dated Feb. 8, 2022, 1 pg.
Sollie, Greg; Non-Final Office Action for U.S. Appl. No. 16/879,811, filed May 21, 2020, dated Jun. 22, 2021, 93 pgs.
Sollie, Greg; Notice of Allowance for U.S. Appl. No. 16/879,811, filed May 21, 2020, dated Jul. 7, 2021, 5 pgs.
Sollie, Greg; Requirement for Restriction/Election for U.S. Appl. No. 16/879,811, filed May 21, 2020, dated Apr. 15, 2021, 6 pgs.
Sollie, Greg; Non-Final Office Action for U.S. Appl. No. 17/492,285, filed Oct. 1, 2021, dated Jul. 11, 2022, 109 pgs.
Sollie, Greg; Notice of Allowance for U.S. Appl. No. 17/492,285, filed Oct. 1, 2021, dated Feb. 8, 2023, 25 pgs.
Sollie, Greg; Certificate of Correction for U.S. Appl. No. 16/567,192, filed Sep. 11, 2019, dated Feb. 16, 2021, 1 pg.
Sollie, Greg; Corrected Notice of Allowance for U.S. Appl. No. 16/567,192, filed Sep. 11, 2019, dated Oct. 20, 2020, 8 pgs.
Sollie, Greg; Final Office Action for U.S. Appl. No. 16/567,192, filed Sep. 11, 2019, dated Jun. 8, 2020, 20 pgs.
Sollie, Greg; Non-Final Office Action for U.S. Appl. No. 16/567,192, filed Sep. 11, 2019, dated Dec. 10, 2019, 49 pgs.
Sollie, Greg; Notice of Allowance for U.S. Appl. No. 16/567,192, filed Sep. 11, 2019, dated Aug. 7, 2020, 14 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Sollie, Greg; Final Office Action for U.S. Appl. No. 16/408,981, filed May 10, 2019, dated Dec. 29, 2020, 22 pgs.
Sollie, Greg; Final Office Action for U.S. Appl. No. 16/408,981, filed May 10, 2019, dated Feb. 24, 2020, 29 pgs.
Sollie, Greg; Non-Final Office Action for U.S. Appl. No. 16/408,981, filed May 10, 2019, dated Aug. 20, 2019, 60 pgs.
Sollie, Greg; Non-Final Office Action for U.S. Appl. No. 16/408,981, filed May 10, 2019, dated Sep. 16, 2020, 40 pgs.
Sollie, Greg; Notice of Allowance for U.S. Appl. No. 16/408,981, filed May 10, 2019, dated Feb. 23, 2021, 6 pgs.
Sollie, Greg; Certificate of Correction for U.S. Appl. No. 17/185,616, filed Feb. 25, 2021, dated Feb. 28, 2023, 2 pgs.
Sollie, Greg; Final Office Action for U.S. Appl. No. 17/185,616, filed Feb. 25, 2021, dated Jan. 28, 2022, 37 pgs.
Sollie, Greg; Non-Final Office Action for U.S. Appl. No. 17/185,616, filed Feb. 25, 2021, dated Sep. 15, 2021, 103 pgs.
Sollie, Greg; Notice of Allowance for U.S. Appl. No. 17/185,616, filed Feb. 25, 2021, dated Jun. 17, 2022, 18 pgs.
Sollie, Greg; Non-Final Office Action for U.S. Appl. No. 17/901,558, filed Sep. 1, 2022, dated Feb. 15, 2023, 128 pgs.
Sollie, Greg; Non-Final Office Action for U.S. Appl. No. 16/886,040, filed May 28, 2020, dated Mar. 30, 2021, 89 pgs.
Sollie, Greg; Notice of Allowance for U.S. Appl. No. 16/886,040, filed May 28, 2020, dated Nov. 18, 2021, 10 pgs.
Sollie, Greg; Notice of Allowance for U.S. Appl. No. 16/886,040, filed May 28, 2020, dated Jul. 7, 2021, 12 pgs.
Sollie, Greg; Requirement for Restriction/Election for U.S. Appl. No. 16/886,040, filed May 28, 2020, dated Dec. 23, 2020, 6 pgs.
Sollie, Greg; Notice of Allowance for U.S. Appl. No. 17/493,449, filed Oct. 4, 2021, dated Oct. 13, 2022, 10 pgs.
Sollie, Greg; Non-Final Office Action for U.S. Appl. No. 18/094,806, filed Jan. 9, 2023, dated Apr. 21, 2023, 118 pgs.
Sollie, Greg; Non-Final Office Action for U.S. Appl. No. 17/493,474, filed Oct. 4, 2021, dated Jul. 11, 2022, 112 pgs.
Sollie, Greg; Notice of Allowance for U.S. Appl. No. 17/493,474, filed Oct. 4, 2021, dated Oct. 13, 2022, 15 pgs.
Sollie, Greg; Non-Final Office Action for U.S. Appl. No. 18/095,310, filed Jan. 10, 2023, dated Apr. 24, 2023, 118 pgs.
Sollie, Greg; Non-Final Office Action for U.S. Appl. No. 17/307,650, filed May 4, 2021, dated Nov. 30, 2022, 139 pgs.
Sollie, Greg; Notice of Allowance for U.S. Appl. No. 17/307,650, filed May 4, 2021, dated Mar. 9, 2023, 15 pgs.
Sollie, Greg; Requirement for Restriction/Election for U.S. Appl. No. 17/307,650, filed May 4, 2021, dated Oct. 28, 2022, 6 pgs.
Anagnostopoulos, John; Non-Final Office Action for U.S. Appl. No. 17/666,206, filed Feb. 7, 2022, dated Apr. 19, 2023, 139 pgs.
Avella, et al.; Article entitled: "Biodegradable PVOH-based foams for packaging applications", Journal of Cellular Plastics 2011, 47:271, 12 pgs.
Moo-Tun, et al.; Article entitled: "Assessing the effect of PLA, cellulose microfibers and CaCO3 on the properties of starch-based foams using a factorial design", Polymer Testing 86 (2020) 106482, available on Mar. 8, 2020, 10 pgs.
Salgado, et al.; Article entitled: "Biodegradable foams based on cassava starch, sunflower proteins and cellulose fibers obtained by a baking process", Journal of Food Engineering 85 (2008) 435-443, available online Aug. 15, 2007, 9 pgs.
Schmidt, et al.; Article entitled: "Characterization of Foams Obtained from Cassava Starch, Cellulose Fibres and Dolomitic Limestone by a Thermopressing Process", Brazilian Archives of Biology and Technology vol. 53, n. 1, pp. 88-192, Jan.-Feb. 2010, 8 pgs.
Waltermire, Jamie; International Preliminary Report on Patentability for PCT Application No. PCT/US18/65464, filed Dec. 13, 2018, dated Jun. 24, 2021, 8 pgs.
Waltermire, Jamie; International Search Report and Written Opinion for PCT Application No. PCT/US18/65464, filed Dec. 13, 2018, dated Mar. 11, 2019, 9 pgs.
Waltermire, Jamie; Final Office Action for U.S. Appl. No. 17/891,565, filed Aug. 19, 2022, dated Jan. 17, 2024, 77 pgs.
Waltermire, Jamie; Non-Final Office Action for U.S. Appl. No. 17/173,293, filed Feb. 11, 2021, dated Dec. 22, 2023, 168 pgs.
Waltermire, Jamie; Advisory Action for U.S. Appl. No. 17/127,060, filed Dec. 18, 2020, dated Dec. 21, 2023, 8 pgs.
Waltermire, Jamie; Advisory Action for U.S. Appl. No. 17/497,054, filed Oct. 8, 2021, dated Jan. 30, 2024, 11 pgs.
Sollie, Greg; Advisory Action for U.S. Appl. No. 17/536,878, filed Nov. 29, 2021, dated Jan. 12, 2024, 8 pgs.
Sollie, Greg; Non-Final Office Action for U.S. Appl. No. 18/140,641, filed Apr. 28, 2023, dated Dec. 27, 2023, 147 pgs.
Sollie, Greg; Advisory Action for U.S. Appl. No. 17/901,558, filed Sep. 1, 2022, dated Dec. 12, 2023, 3 pgs.
Sollie, Greg; Requirement for Restriction/Election for U.S. Appl. No. 18/208,704, filed Jun. 12, 2023, dated Jan. 9, 2024, 6 pgs.

(56) References Cited

OTHER PUBLICATIONS

Sollie, Greg; Notice of Allowance for U.S. Appl. No. 18/208,708, filed Jun. 12, 2023, dated Jan. 17, 2024, 142 pgs.
Anagnostopoulos, John; Advisory Action for U.S. Appl. No. 17/666,206, filed Feb. 7, 2022, dated Dec. 22, 2023, 4 pgs.

* cited by examiner

HINGED WRAP INSULATED CONTAINER

CROSS-REFERENCE TO RELATED APPLICATIONS

This application is a divisional of U.S. application Ser. No. 17/307,650, filed on May 4, 2021, which claims the benefit of U.S. Provisional Application No. 63/020,346, filed on May 5, 2020, which are each hereby incorporated by reference in their entirety.

JOINT RESEARCH AGREEMENT

The subject matter disclosed was developed and the claimed invention was made by, or on behalf of, one or more parties to a joint research agreement between MP Global Products LLC of Norfolk, NE and Pratt Retail Specialties, LLC of Conyers, GA, that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to a hinged insulation wrap of an insulated container.

BACKGROUND

Packaging and shipping temperature sensitive contents can pose challenges. The contents can spoil, destabilize, freeze, melt, or evaporate during storage or shipping if the temperature of the contents is not maintained or the packaging is not protected from hot or cold environmental conditions. In applications such as hot food delivery, customers can be dissatisfied if the contents have cooled to ambient temperature upon delivery. Contents such as food, pharmaceuticals, electronics, or other temperature sensitive items can be damaged if exposed to temperature extremes. Many insulated packages are bulky and difficult to store prior to use. Additionally, many insulated packages are specialized to ship or carry hot goods, chilled goods, or frozen goods, and shippers must maintain large stocks of specialized packaging for each application. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an insulation wrap comprising an insulation batt defining a top end and a bottom end, the insulation batt defining an inner side and an outer side; a wrap liner blank comprising an inner portion extending across a first panel and a second panel of the wrap liner blank, the inner side of the insulation batt positioned facing the inner portion; a ledge portion extending across the first panel and the second panel of the wrap liner blank, the ledge portion hingedly coupled to the inner portion by an inner hinge, the top end of the insulation batt positioned facing the ledge portion; and an outer portion extending across the first panel and the second panel of the wrap liner blank, the outer portion hingedly coupled to the ledge portion by a ledge hinge, the outer side of the insulation batt facing the outer portion, the outer portion defining an outer hinge between the first panel and the second panel, the first panel being foldable relative to the second panel about the outer hinge from an unfolded configuration to a folded configuration wherein the inner portion at least partially defines an insulated cavity within the wrap liner blank.

Also disclosed is a wrap liner blank comprising a first outer portion and a second outer portion extending across a first panel and a second panel of the wrap liner blank, the first outer portion and the second outer portion defining an outer hinge, the first panel hingedly coupled to the second panel by the outer hinge; a first ledge portion and a second ledge portion extending across the first panel and the second panel, the first ledge portion and the second ledge portion defined between the first outer portion and the second outer portion, the first ledge portion hingedly coupled to the first outer portion by a first ledge hinge, the second ledge portion hingedly coupled to the second outer portion by a second ledge hinge; and an inner portion extending across the first panel and the second panel, the inner portion defined between the first ledge portion and the second ledge portion, the inner portion hingedly coupled to the first ledge portion by a first inner hinge, the inner portion hingedly coupled to the second ledge portion by a second inner hinge.

Also disclosed is a method of assembling a packaging assembly comprising an insulation wrap and a box, the method comprising folding a first panel of an insulation wrap relative to a second panel of the insulation wrap about an outer hinge of the insulation wrap, the insulation wrap comprising an insulation batt and a wrap liner blank, the insulation batt at least partially captured in a first channel and a second channel, the first channel defined between a first outer portion of the wrap liner blank and an inner portion of the wrap liner blank, the first outer portion hingedly coupled to a first ledge portion of the wrap liner blank, the first ledge portion hingedly coupled to the inner portion, the second channel defined between a second outer portion of the wrap liner blank and the inner portion, the second outer portion hingedly coupled to a second ledge portion of the wrap liner blank, the second ledge portion hingedly coupled to the inner portion opposite from the first ledge portion, the first outer portion and the second outer portion at least partially defining an outer surface of the insulation wrap, the inner portion at least partially defining an inner surface of the insulation wrap; and inserting the insulation wrap into a cavity defined by a box, the outer surface positioned at least partially in facing engagement with the box, the inner surface at least partially defining an insulated cavity.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
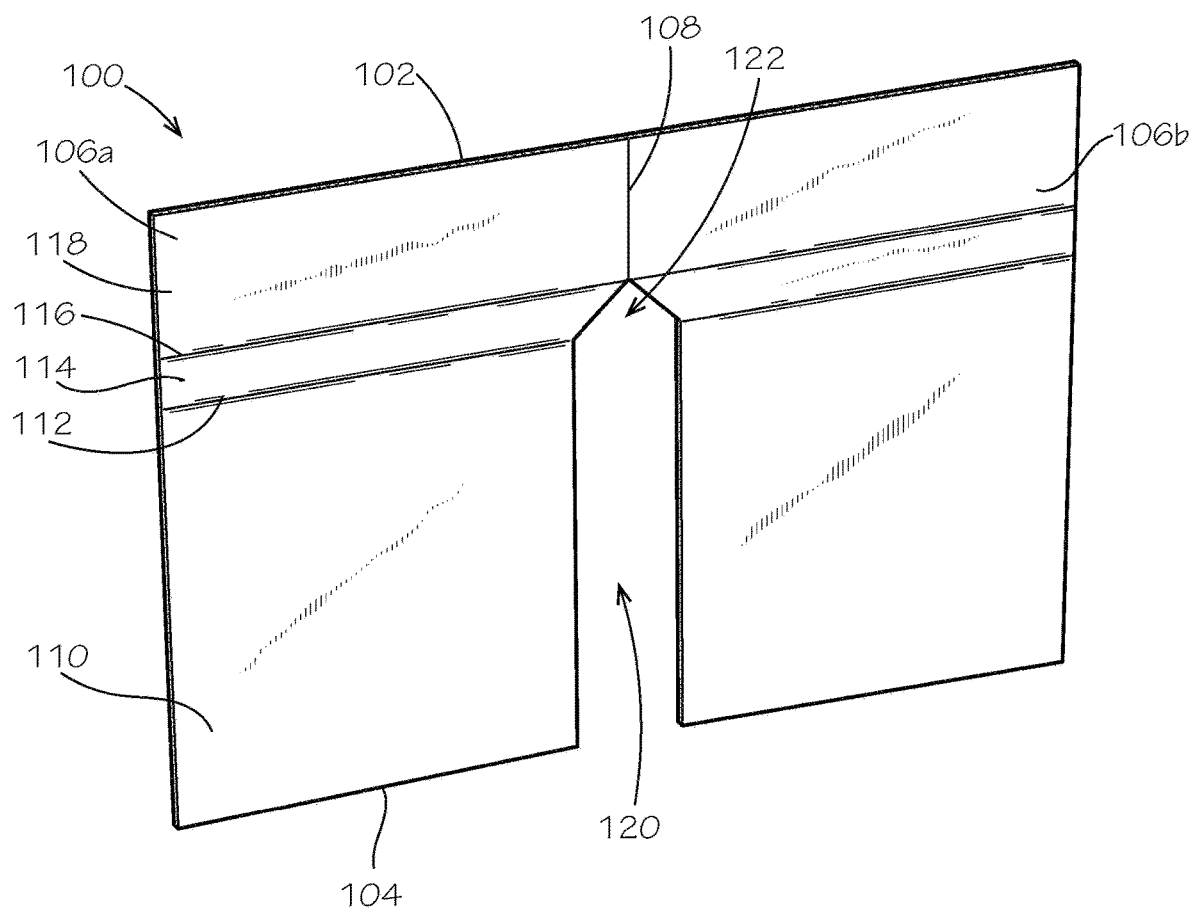
FIG. 1 is a perspective view of a wrap liner blank in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a packaging assembly and associated methods, systems, devices, and various apparatus. The packaging assembly can comprise a box, an insulation wrap, and at least one plug. It would be understood by one of skill in the art that the disclosed packaging assembly is described in but a few exemplary embodiments among many. No particular terminology or description should be considered limiting on the disclosure or the scope of any claims issuing therefrom.

FIG. 1 is a perspective view of a wrap liner blank 100 in accordance with one aspect of the present disclosure. In the present aspect, the wrap liner blank 100 can comprise two panels 106a,b; however, in other aspects, such as the wrap liner blank 600 shown in FIG. 6, the wrap liner blank can comprise more than two panels.

The wrap liner blank 100 can define a top end 102 and a bottom end 104, with the top end 102 disposed opposite from the bottom end 104. The wrap liner blank 100 can comprise an inner portion 110, a ledge portion 114, and an outer portion 118, each of which can extend across both panels 106a,b. The inner portion 110 can be hingedly coupled to the ledge portion 114 by an inner hinge 112, and the outer portion 118 can be hingedly coupled to the ledge portion 114 by a ledge hinge 116.

The wrap liner blank 100 can define an inner clearance notch 120, which can separate the inner portion 110 defined by panel 106a from the inner portion 110 defined by the adjacent panel 106b. The wrap liner blank 100 can define a ledge clearance notch 122, which can separate the ledge portion 114 defined by panel 106a from the ledge portion 114 defined by the adjacent panel 106b. The wrap liner blank 100 can define an outer hinge 108, which can hingedly couple the outer portion 118 defined by panel 106a to the outer portion 118 defined by the adjacent panel 106b.

Figure 2:
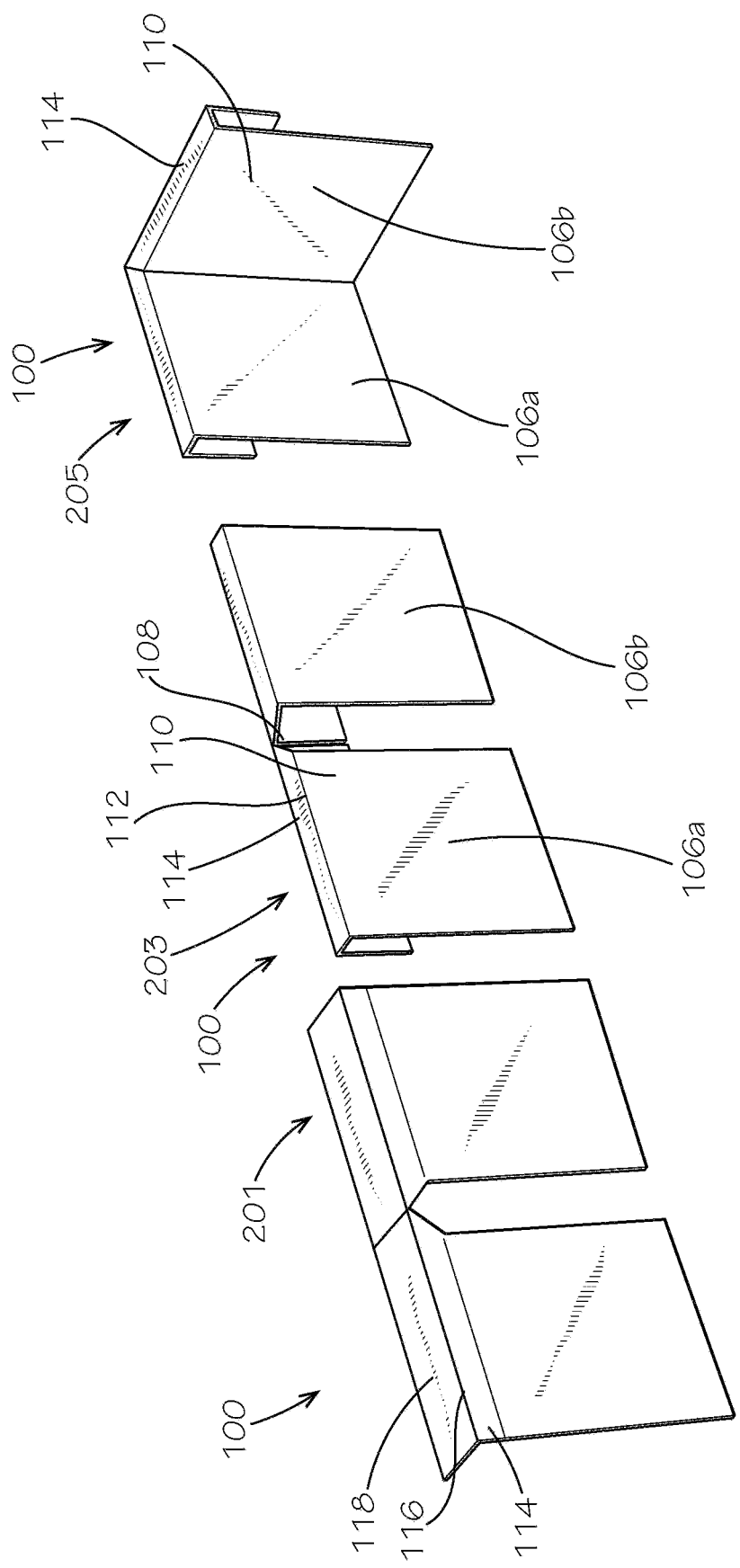
FIG. 2 is a perspective view of the wrap liner blank of FIG. 1 demonstrating steps to place the wrap liner blank in an assembled configuration and a folded configuration.

FIG. 2 is a perspective view showing steps 201,203,205 to place the wrap liner blank in an assembled configuration and then to place the wrap liner blank 100 in the assembled and folded configuration. The steps 201,203,205 can be similar for assembling and folding an insulation wrap 601 (shown in FIG. 6) from the wrap liner 600 (shown in FIG. 6) and an insulation batt 690 (show in FIG. 6), in accordance with another aspect of the disclosure. Here in FIG. 2, the wrap liner blank 100 is shown alone without an insulation batt to provide an unobstructed view.

In step 201, the outer portion 118 of the wrap liner blank 100 can be folded relative to the ledge portion 114 about the ledge hinge 116 to place the wrap liner blank 100 in a partially assembled configuration. In step 203, the ledge portion 114 can be folded relative to the inner portion 110 about the inner hinge 112 to place the wrap liner blank 100 in an assembled configuration. As shown in step 203, the wrap liner blank 100 can be in the assembled configuration and in an unfolded configuration.

In other aspects, steps 201,203 can be performed in reverse order. For example, the wrap liner blank 100 can first be folded about the inner hinge 112 in accordance with step 203 to place the wrap liner blank 100 in the partially assembled configuration, and the wrap liner blank 100 can then be folded about the outer hinge 116 to place the wrap liner blank 100 in the assembled configuration. In the partially assembled configuration, the panels 106a,b of the wrap liner blank 100 are only folded about one of the inner hinge 112 and the outer hinge 116. In the assembled configuration, the panels 106a,b, of the wrap liner blank 100 can be folded about both the inner hinge 112 and the outer hinge 116. In the assembled configuration, the outer portion 118 can be substantially parallel to the inner portion 110, and the ledge portion 114 can be substantially perpendicular to both the inner portion 110 and the outer portion 118.

In step 205, the panels 106a,b can be folded relative to one another about the outer hinge 108 from the assembled and unfolded configuration to an assembled and folded configuration. In the unfolded configuration, the inner portion 110 and outer portion 118 of adjacent panels 106a,b of the assembled wrap liner blank 100 can be substantially parallel and coplanar to one another, respectively. In the folded configuration, the inner portion 110 and outer portion 118 of adjacent panels 106a,b, can be substantially perpendicular to one another. In the folded configuration, adjacent panels 106a,b can be positioned so that the ledge portion 114 defined by panel 106a contacts the ledge portion 114 defined by panel 106b and that the inner portion 110 defined by panel 106a contacts the inner portion 110 defined by panel 106b.

In the aspect shown, the wrap liner blank 100 can be configured to be positioned with a second wrap liner blank 100 (not shown) to form a square or rectangular cross-sectional shape when both wrap liner blanks 100 are in the assembled and folded configuration. In other aspects, the wrap liner blank 100 can have four panels 106, and the wrap liner blank 100 can define a square or rectangular in cross-sectional shape in the assembled and folded configuration, as demonstrated by the wrap liner 600 in FIG. 6. The steps 203,205,207 shown in FIG. 2 can apply for wrap liner blanks comprising more than two panels 106a,b. For example, the steps can be the same for insulation wrap 601 in FIG. 6.

Figure 3:
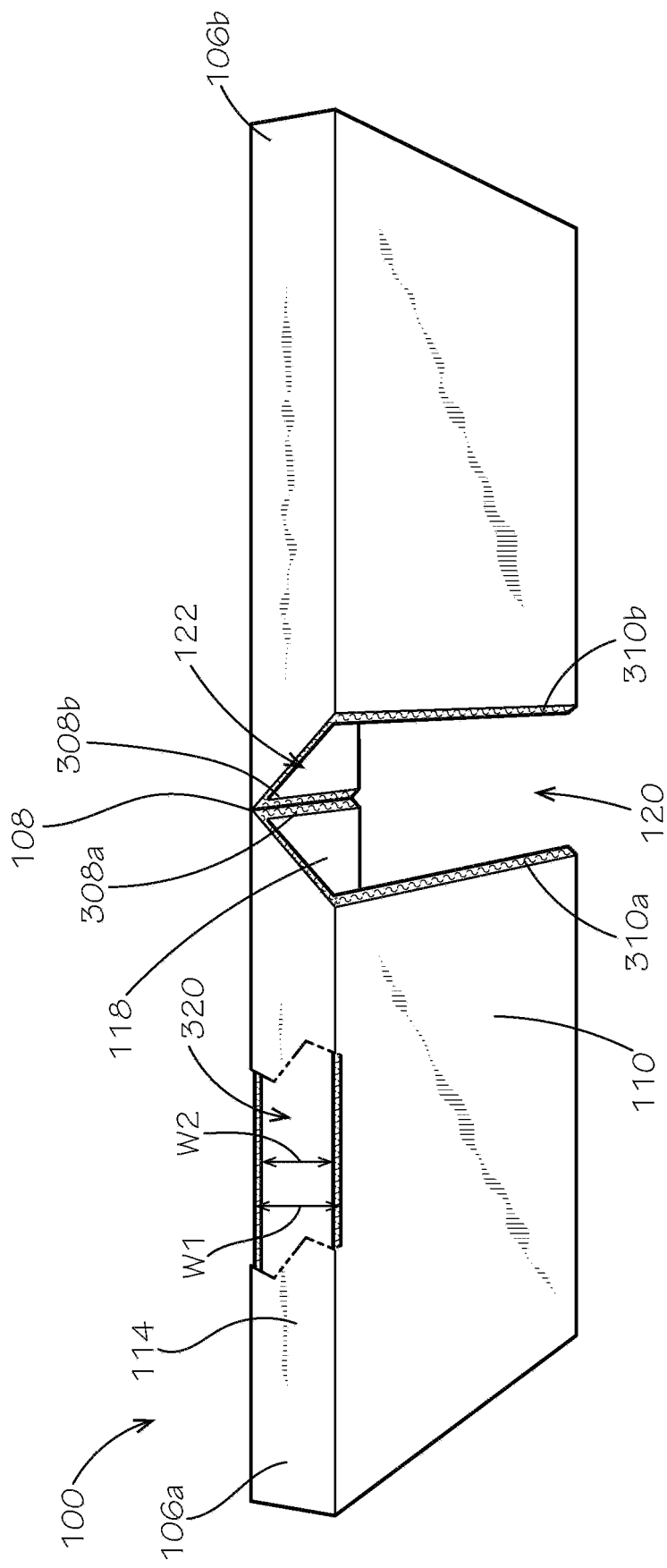
FIG. 3 is a front perspective view of the wrap liner blank of FIG. 1 in an assembled and unfolded configuration.

FIG. 3 is a front perspective view of the wrap liner blank 100 in the assembled and unfolded configuration. The inner portion 110 of the panels 106a,b can define relieved edges 310a,b adjacent to the inner clearance notch 120. The relieved edges 310a,b can be beveled, chamfered, or mitered, for example and without limitation, so that adjacent relieved edges 310a,b can mate with one another when positioned together in the assembled and folded configuration shown in FIG. 4. The outer portion 118 of the panels 106a,b can define relieved edges 308a,b adjacent to the outer hinge 108. The relieved edges 308a,b can be beveled, chamfered, or mitered (for example and without limitation), so that adjacent relieved edges 308a,b can mate with one another and minimized deformation when adjacent panels 106a,b are folded about the outer hinge 108 to the assembled and folded configuration.

As demonstrated by a cutaway of the ledge portion 114, a channel 320 can be defined between the inner portion 110 and the outer portion 118. The ledge portion 114 can define a width W1, and the channel 320 can define a width W2. The width W2 can be slightly smaller than the width W1. As similarly discussed below with respect to FIG. 8, the channel 320 can be configured to receive an insulation batt. In the various aspects, the width W2 can range from less than one inch to greater than two inches, and the channel 320 can be configured to receive insulation batts with a thickness of less than one inch to greater than two inches.

Figure 4:
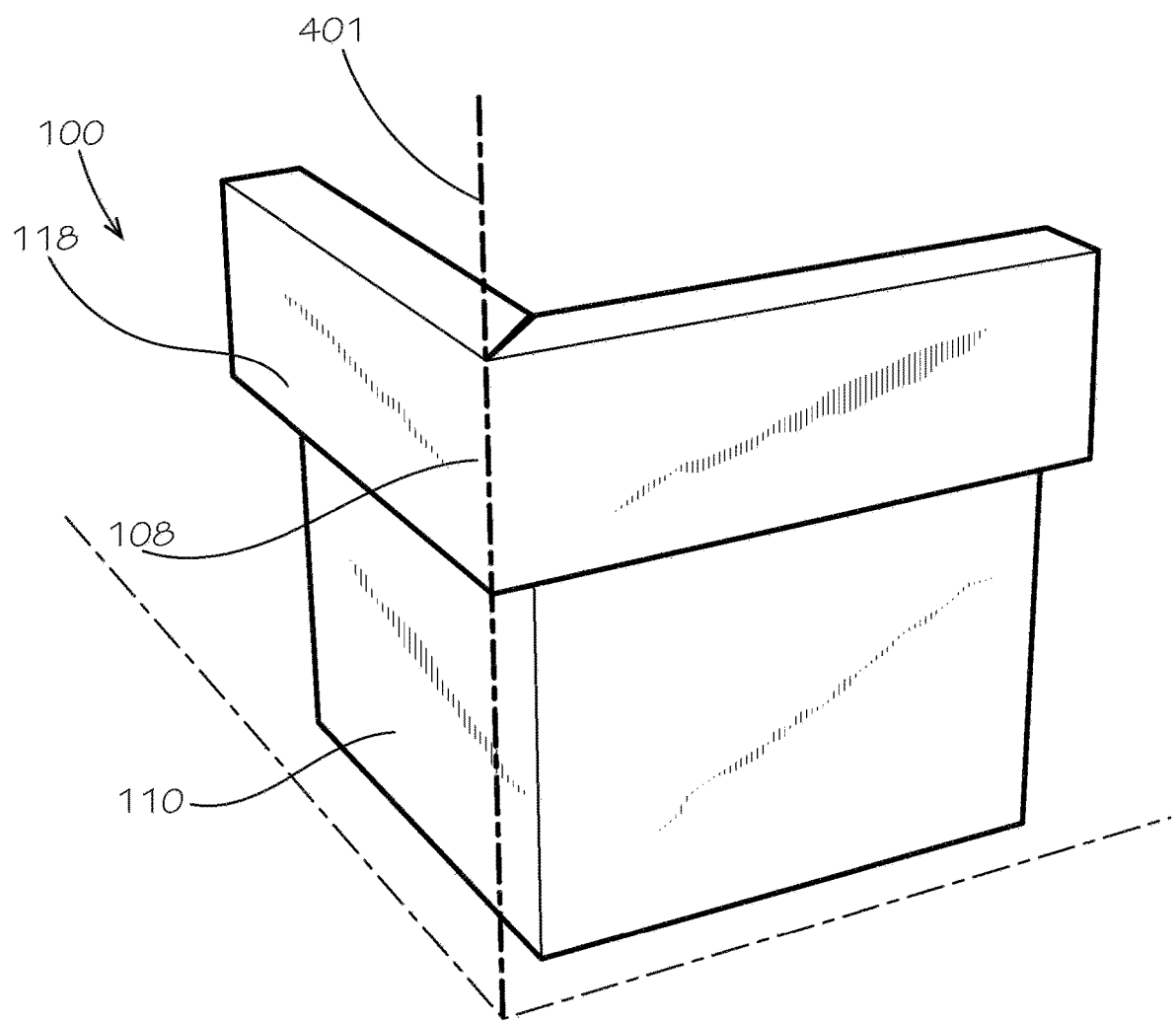
FIG. 4 is a rear perspective view of the wrap liner blank of FIG. 1 in an assembled and folded configuration.

FIG. 4 is a rear perspective view of the wrap liner blank 100 of FIG. 1 in the assembled and folded configuration. As shown, the outer hinge 108 can define an outer hinge axis 401, which can extend through the outer portion 118 but not the inner portion 110.

Figure 5:
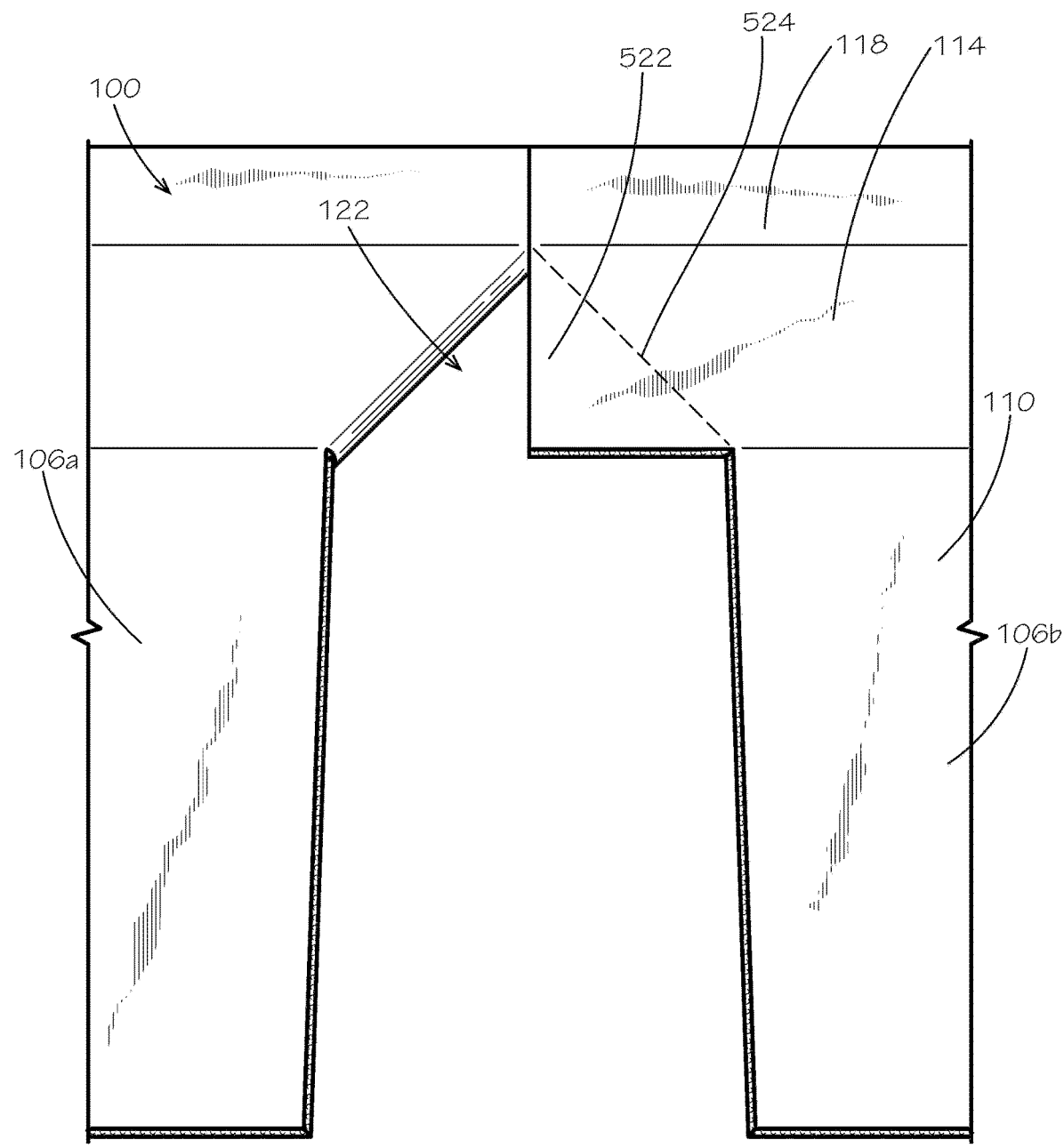
FIG. 5 is a detailed view of a ledge clearance notch of another aspect of the wrap liner blank in accordance with another aspect of the present disclosure.

FIG. 5 is a detailed view of the ledge clearance notch 122 of another aspect of the wrap liner blank 100 in accordance with another aspect of the present disclosure. As shown by panel 106b, in some aspects, the ledge clearance notch 122 can be formed by folding a tab 522 of the ledge portion 114 about a clearance notch hinge 524. The clearance notch hinge 524 can extend across the ledge portion 114 from the inner portion 110 to the outer portion 118. Panel 106a can also define a clearance notch hinge (not shown) and a tab (not shown). In some aspects, the ledge portion 114 can be cut, rather than folded, to form the ledge clearance notch 122. In the present aspect, the ledge clearance notch 122 can define the shape of a triangle, such as an isoceles triangle for example and without limitation. In other aspects, the ledge clearance notch can define a different shape, such as a trapezoid or any other suitable shape.

Figure 6:
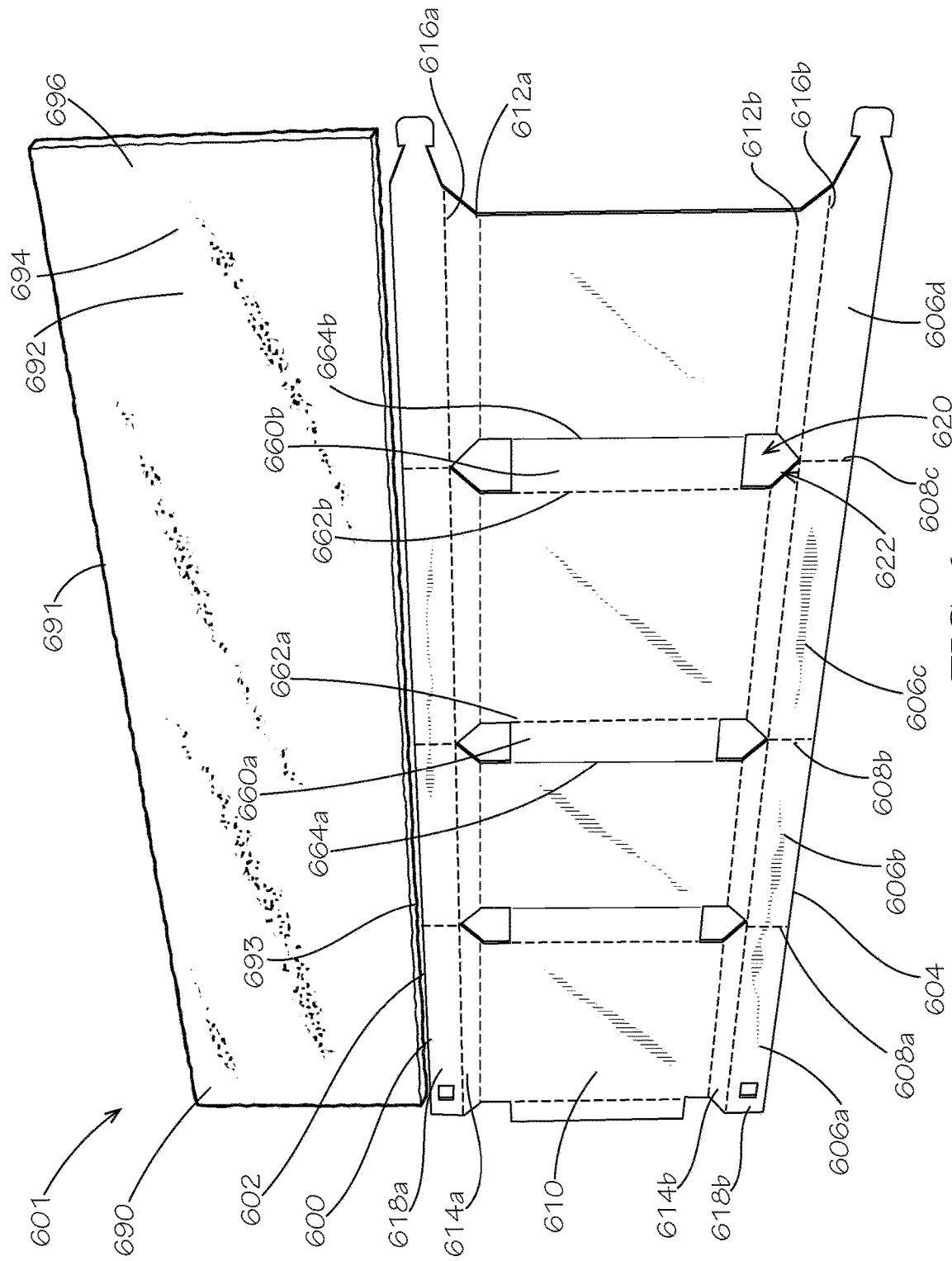
FIG. 6 is a top perspective view of an insulation wrap, in an unassembled configuration, comprising an insulation batt and another aspect of the wrap liner blank in accordance with another aspect of the present disclosure.
Figure 7:
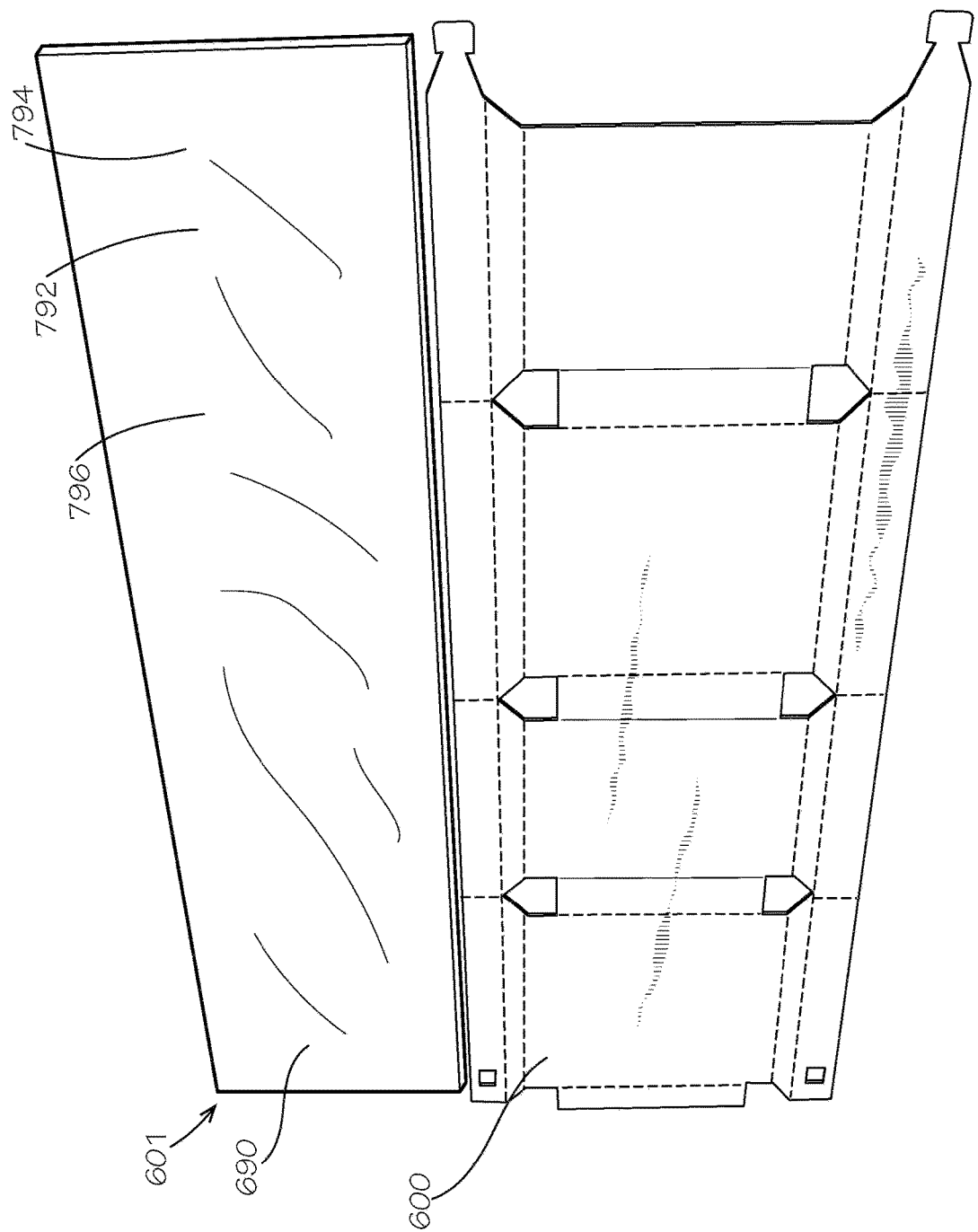
FIG. 7 is a top perspective view of the insulation wrap of FIG. 6 in the unassembled configuration.

FIG. 6 and FIG. 7 are top perspective views of the insulation wrap 601 in an unassembled configuration, in accordance with another aspect of the present disclosure. The insulation wrap 601 can comprise the wrap liner blank 600 and the insulation batt 690.

As shown in FIG. 6, the wrap liner blank 600 can comprise four panels 606a,b,c,d. The wrap liner blank 600 can define a top end 602 and a bottom end 604, with the top end 602 disposed opposite from the bottom end 604. The wrap liner blank 600 can comprise an inner portion 610, a first ledge portion 614a, a second ledge portion 614b, a first outer portion 618a, and a second outer portion 618b. The inner portion 610 can be hingedly coupled to the ledge portions 614a,b by a pair of inner hinges 612a,b, respectively. The outer portions 618a,b can be hingedly coupled to the ledge portions 614a,b by a pair of ledge hinges 616a,b, respectively. The hinges 612a,b,616a,b can extend across each of the panels 606a,b,c,d.

The wrap liner blank 600 can define outer hinges 608a,b,c, which can hingedly couple adjacent panels 606a,b,c,d together at the outer portions 618a,b. The outer hinges 608a,b,c can extend through both outer portions 618a,b. The wrap liner blank 600 can define ledge clearance notches 622, which can separate the ledge portions 614a,b defined by adjacent panels 606a,b,c,d, as demonstrated for second ledge portion 614b between adjacent panels 606c,d. The wrap liner blank 600 can define inner clearance notches 620, which can separate the inner portions 610 defined by adjacent panels 606a,b,c,d, as demonstrated between adjacent panels 606c,d. In the present aspect, the wrap liner blank 600 can comprise inner side flaps, such as inner side flaps 660a,b shown hingedly coupled to panel 606c by side hinges 662a,b.

The inner side flaps 660a,b can extend across all or part of the inner clearance notches 620. In the present aspect, inner side flaps 660a,b form a gap with the ledge portions 614a,b. This gap provides clearance for an insulated panel portion 1630 (show in FIG. 16) of a pair of plugs 1601 (shown in FIGS. 16 and 23). In the present aspects, the inner side flaps 660a,b can extend to the adjacent panels 606b,d, and the inner side flaps 660a,b can be separated from the adjacent panels 606b,d by clearance cuts 664a,b. In the present aspect, panels 606a,c can comprise side flaps while panels 606b,d do not comprise side flaps. In some aspects, side flaps 660b,d can comprise side flaps while panels 606a,c do not comprise side flaps. In some aspects, each panel 606*a,b,c,d* can each comprise one or more side flaps. In some aspects, each panel 606*a,b,c,d* can each comprise one panel on one side, such as the right side with respect to the present viewing angle for example and without limitation.

The insulation batt 690 can define a top end 691 and a bottom end 693, with the top end 691 disposed opposite from the bottom end 693. The insulation batt 690 can define an inner side 692 (shown in FIG. 6) and an outer side 792 (shown in FIG. 7). In the present aspect, the insulation batt 690 can comprise an insulation material 696. In some aspects, the insulation material 696 can be a flexible and resilient material.

In the present aspect, the inner side 692 can be a raw side 694, and the outer side 792 can be a finished side 794 (shown in FIG. 7). On the raw side 694, the insulation material 696 can be exposed, and on the finished side 794, the insulation material can be covered, such as by backing sheet 796 (shown in FIG. 7). In some aspects, both the inner side 692 and the outer side 792 can be finished sides 794 wherein the insulation material is covered. In some aspects, the insulation material 696 can be fully encapsulated, such as by one or more backing sheets 796 that can be fully wrapped around the insulation material 696.

Figure 8:
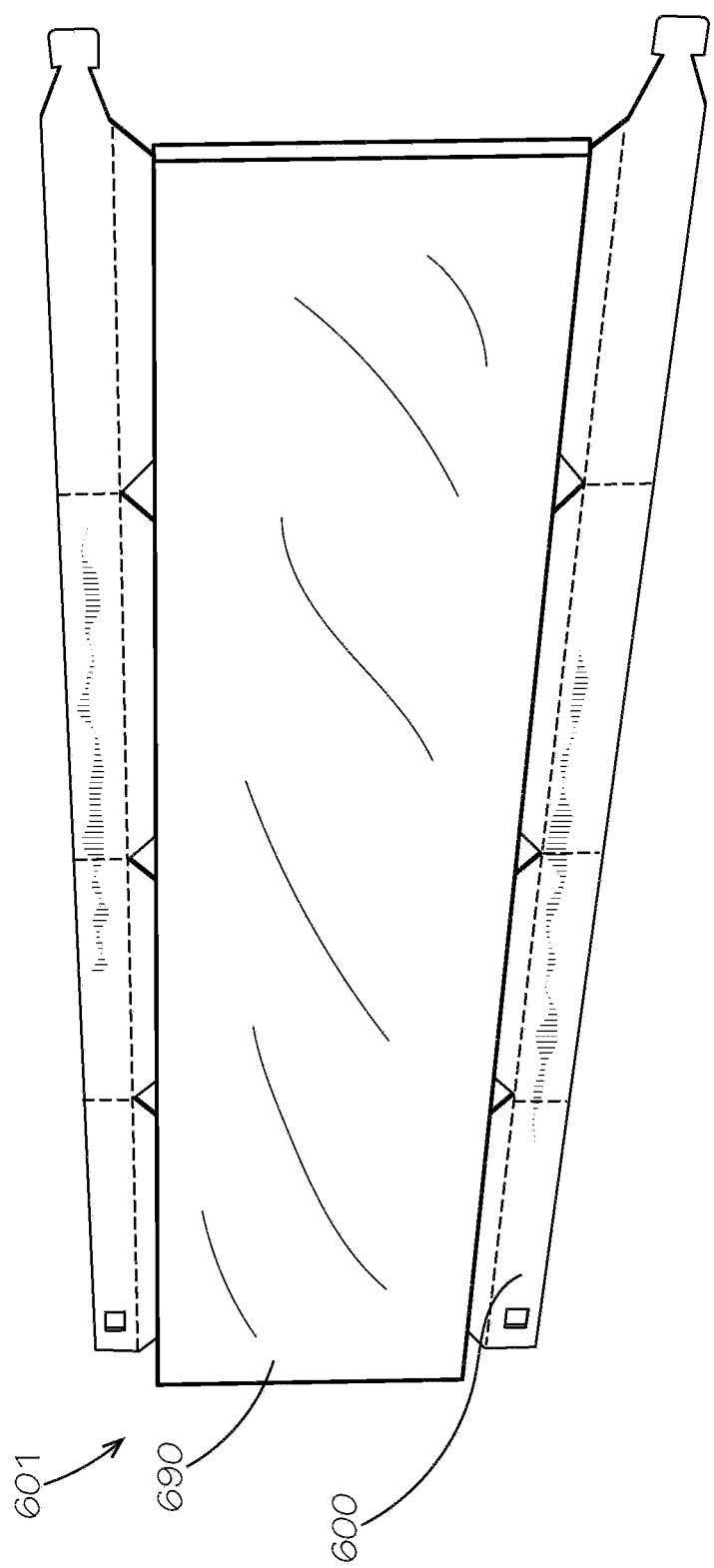
FIG. 8 is a top perspective view of the insulation wrap of FIG. 6 in the unassembled configuration with the insulation wrap placed on an inner portion of the wrap liner blank.
Figure 9:
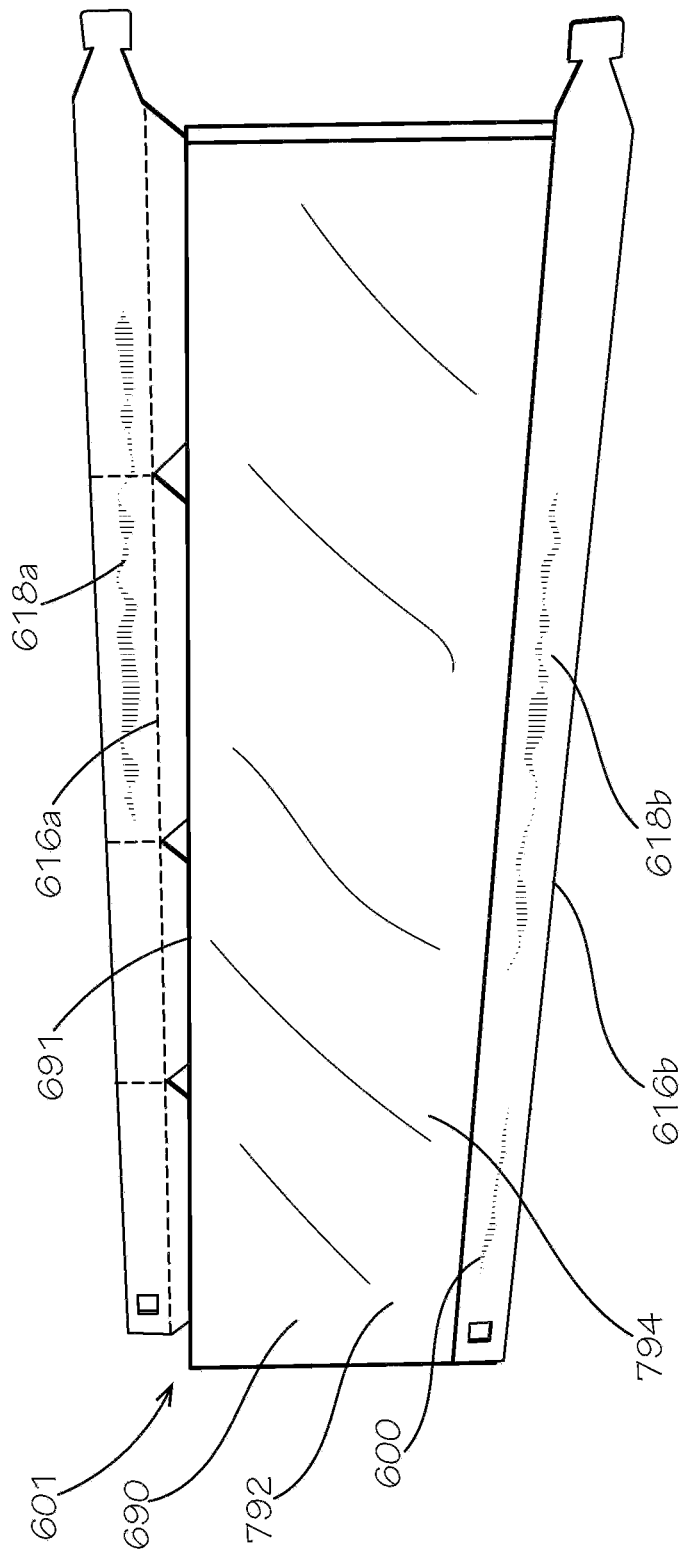
FIG. 9 is a top perspective view of the insulation wrap of FIG. 6 in a partially assembled configuration.

FIG. 8 is a top perspective views of the insulation wrap 601 of FIG. 6 in the unassembled configuration. FIG. 9 is a top perspective view of the insulation wrap 601 of FIG. 6 in a partially assembled configuration. To reconfigure the insulation wrap 601 to the assembled configuration (shown in FIGS. 10 and 11), the insulation batt 690 can be positioned on the inner portion 610 (shown in FIG. 6) of the wrap liner blank 600, as shown in FIG. 8. As shown in FIG. 9 and similarly described in steps 201,203 with respect to FIG. 2, the wrap liner blank 600 can be folded about the inner hinges 612*a,b* (shown in FIG. 6) and the outer hinges 616*a,b* from the unassembled configuration to the assembled configuration, so that the top end 691 and the bottom end 693 (shown in FIG. 6) can be captured in channels respectively defined between the inner portion 610 (shown in FIG. 6) and the outer portions 618*a,b*, respectively, similar to channel 320 shown in FIG. 3. The outer portions 618*a,b* can be coupled to the outer side 792, such as with tape, an adhesive, or any other suitable means.

In aspects wherein the insulation batt 690 defines the raw side 694 and the finished side 794, the raw side 694 can be positioned facing the inner portion 610. In some aspects, the raw side 694 can be positioned in facing engagement with the inner portion 610, and the raw side 694 can be coupled to the inner portion 610, such as with an adhesive for example and without limitation. By securing the raw side 694 to the inner portion 610, dust, loose fibers, and other particles coming from the insulation batt 690 can be minimized through containment between the wrap liner blank 600 and the backing sheet 796. Additionally, the backing sheet 796 can provide dimensional stability to the insulation batt 690 while being easily foldable.

Figure 10:
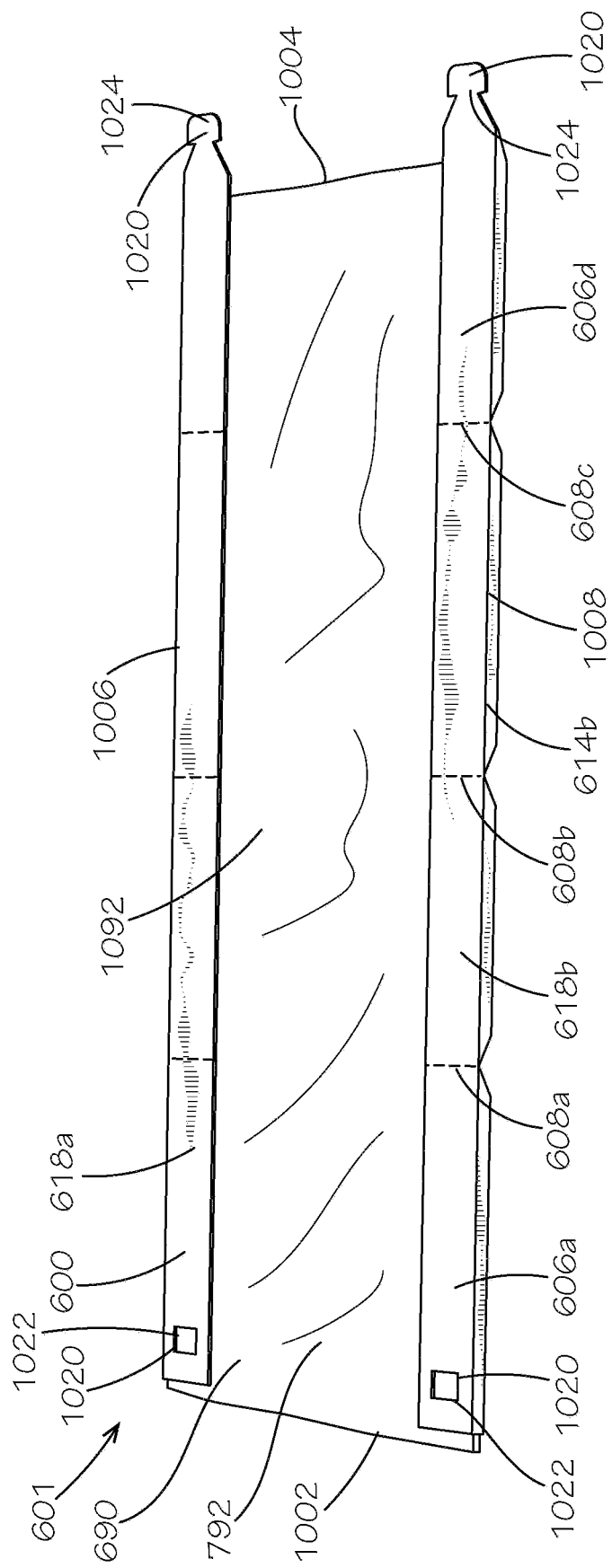
FIG. 10 is a rear perspective view of the insulation wrap of FIG. 6 in an assembled and unfolded configuration.

FIG. 10 is a rear perspective view of the insulation wrap 601 of FIG. 6 in the assembled and unfolded configuration. The outer side 792 of the insulation batt 690 and the outer portions 618*a,b* of the wrap liner blank 600 can define an outer surface 1092 of the insulation wrap 601. The insulation wrap 601 can define a first end 1002 and a second end 1004. The first end 1002 can be defined opposite from the second end 1004. The insulation wrap 601 can define a top end 1006 and a bottom end 1008. The top end 1006 can be defined opposite from the bottom end 1008. The top end 1006 can be defined by first ledge portion 614*a* (shown in FIG. 6), and the bottom end 1008 can be defined by second ledge portion 614*b*.

The outer hinges 608*a,b,c* can be defined by the outer surface 1092 of the insulation wrap 601. The insulation wrap 601 can be configured to fold about the outer hinges 608*a,b,c* into the folded configuration (shown in FIG. 13). By folding about the outer hinges 608*a,b,c*, tensile stresses along the outer surface 1092 of the insulation wrap 601 can be minimized. Minimization of tensile stresses through the outer surface 1092 can be desirable because tensile stress in the outer surface 1092 can cause the insulation wrap 601 to pull away from the outer portions 618*a,b* of the wrap liner blank 600 and/or cause tears in the insulation batt 690 and the backing sheet 796. Tears in the insulation batt 690 and backing sheet 796 can compromise the insulating performance of the insulation batt 690 and lead to excessive production of dust, loose fibers, or other particles from the insulation material 696 (shown in FIG. 6) of the insulation batt 690.

Instead of introducing substantial tensile stresses in the outer surface 1092, mild compressive stresses can be exerted on the inner side 692 (shown in FIG. 6) of the insulation batt 690 during folding, which can be resisted in part by the inner side 692 of the insulation batt 690 being coupled to the inner portion 610 of the wrap liner blank 600. This arrangement controls the thicker, flexible insulation batt 690 to minimize wrinkles and/or buckling along the inner side 692 and to ensure that the insulation batt 690 moves together with the thinner, rigid wrap liner blank 600. The design involving folding of the insulation wrap 601 through the outer hinges 608*a,b,c* resulted from results achieved through multiple experiments in folding composite insulation materials.

In the folded configuration, the first end 1002 can be positioned adjacent to the second end 1004, and the insulation wrap 601 can define a substantially rectangular or square cross-sectional shape when viewed from the top end 1006 or the bottom end 1008. A closure mechanism 1020 can be configured to secure the first end 1002 to the second end 1004 in the folded configuration. In the present aspect, the closure mechanism 1020 can be comprised by the insulation wrap 601. Specifically, the closure mechanism 1020 can be comprised by the wrap liner blank 600. More specifically, the closure mechanism 1020 can be defined by the outer portions 618*a,b*.

In the present aspect, the closure mechanism 1020 can comprise a pair of apertures 1022 defined by panel 606*a* at the first end 1002 and a pair of tabs 1024 defined by panel 606*d* at the second end 1004. The tabs 1024 can each define a barbed shape that is wider than the corresponding apertures 1022.

Figure 11:
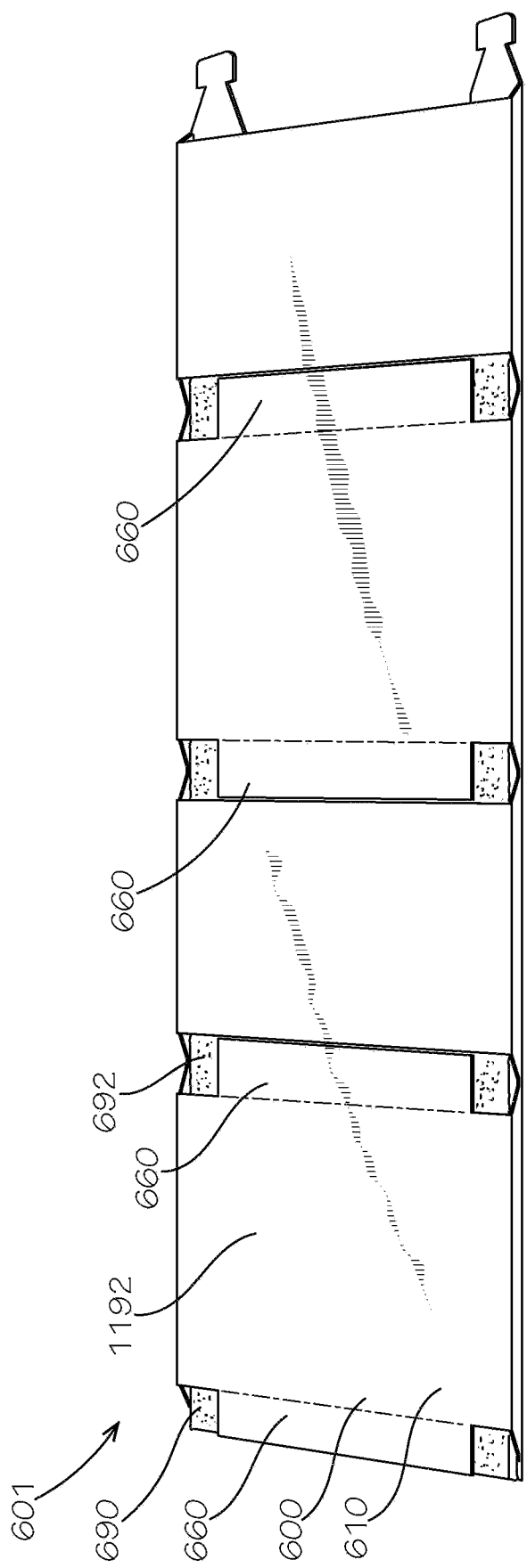
FIG. 11 is a front perspective view of the insulation wrap of FIG. 6 in the assembled and unfolded configuration.

FIG. 11 is a front perspective view of the insulation wrap 601 of FIG. 6 in the assembled and unfolded configuration. The inner portion 610 and the inner side flaps 660 of the wrap liner blank 600 and the inner side 692 of the insulation batt 690 can define an inner surface 1192 of the insulation wrap 601 in the assembled and unfolded configuration. However, as demonstrated by FIG. 13, the insulation batt 690 can be mostly or completely concealed from the inner surface 1192 when the insulation wrap 601 is folded to the folded configuration.

Figure 29:
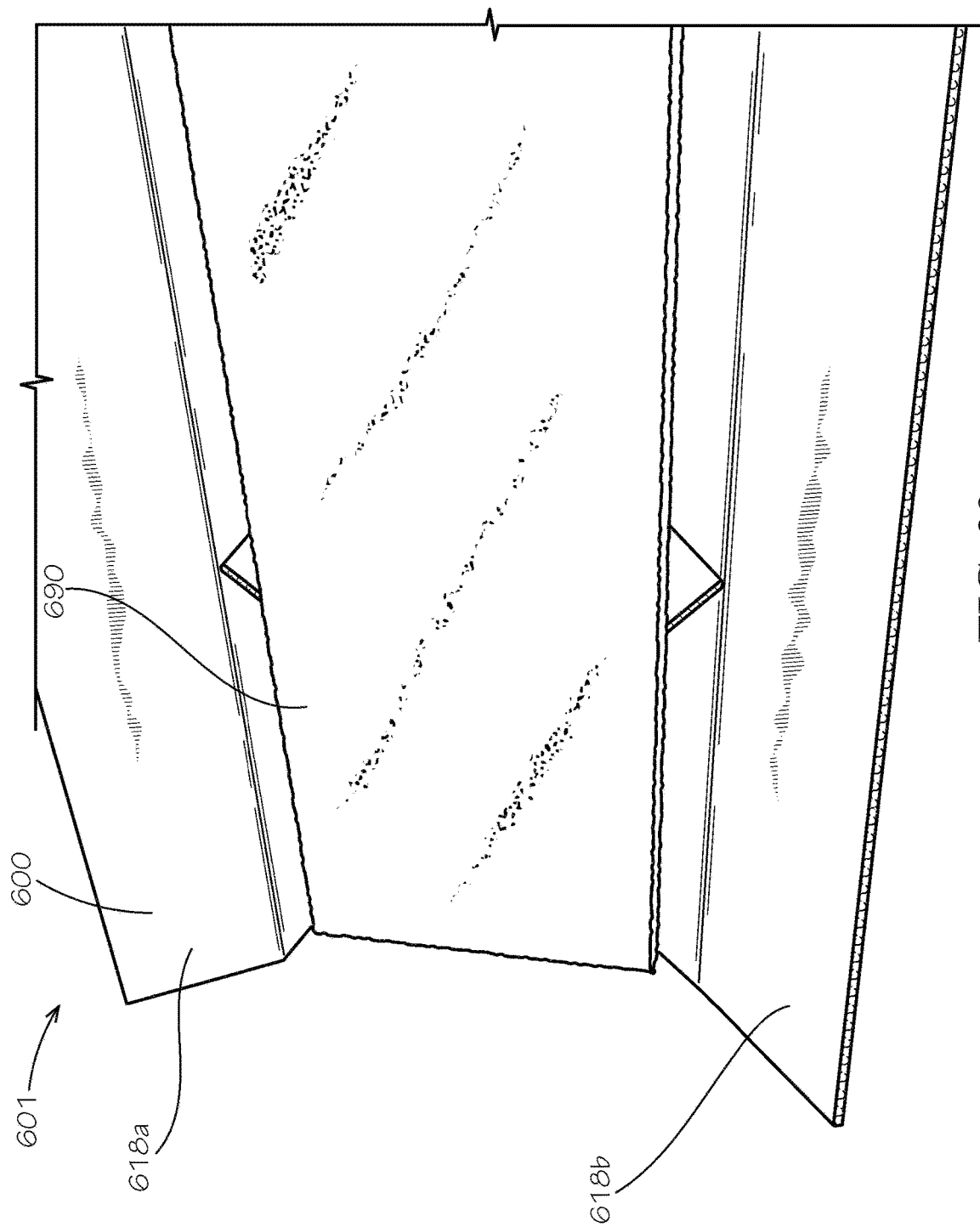
FIG. 29 is a top perspective view of an insulation wrap in accordance with another aspect of the present disclosure comprising the insulation batt of FIG. 6 and another aspect of the wrap liner blank in the unassembled configuration.
Figure 30:
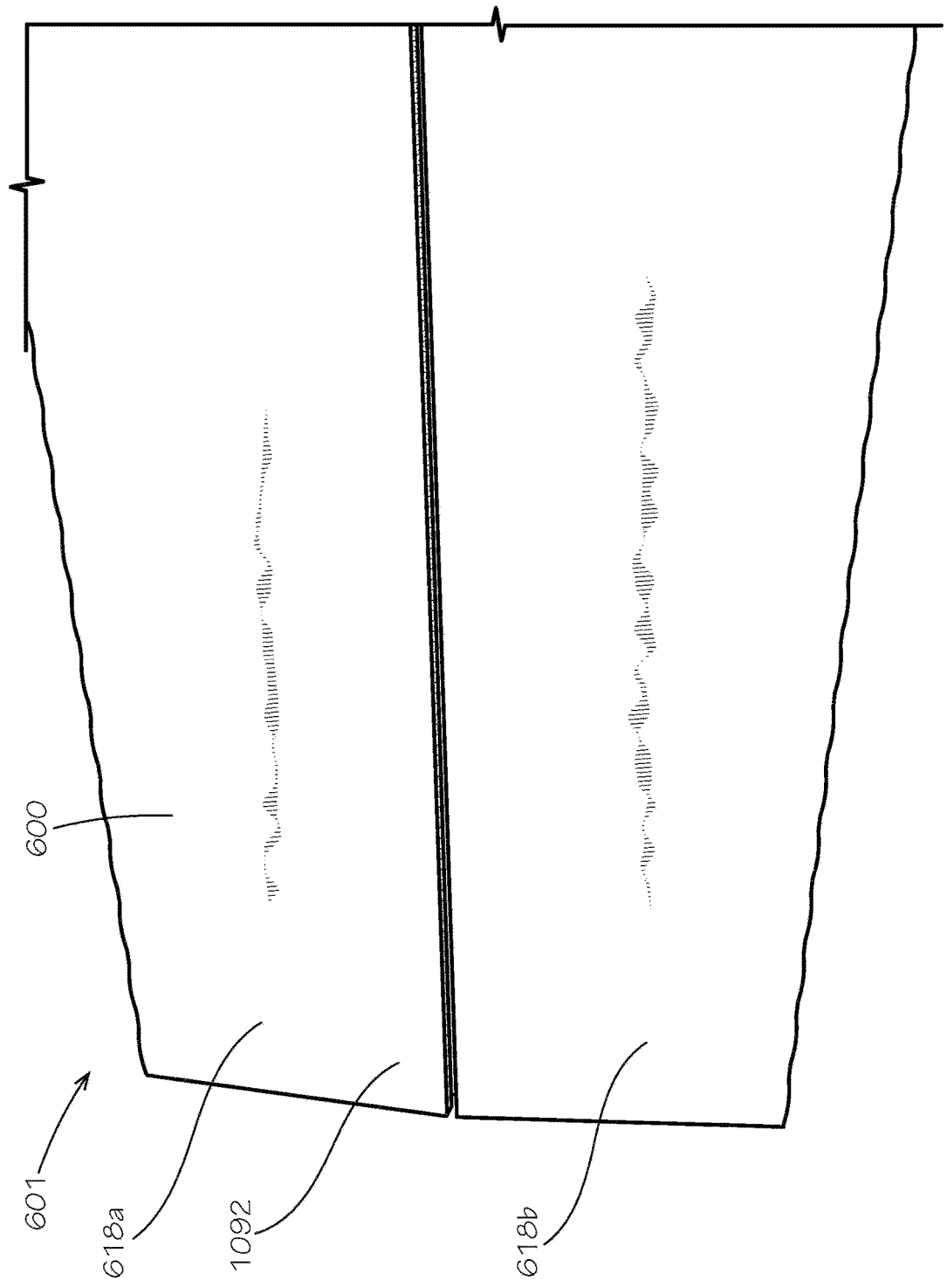
FIG. 30 is a top perspective view of the insulation wrap of FIG. 29 with the wrap liner blank enclosing the outer side in a partially assembled configuration.
Figure 31:
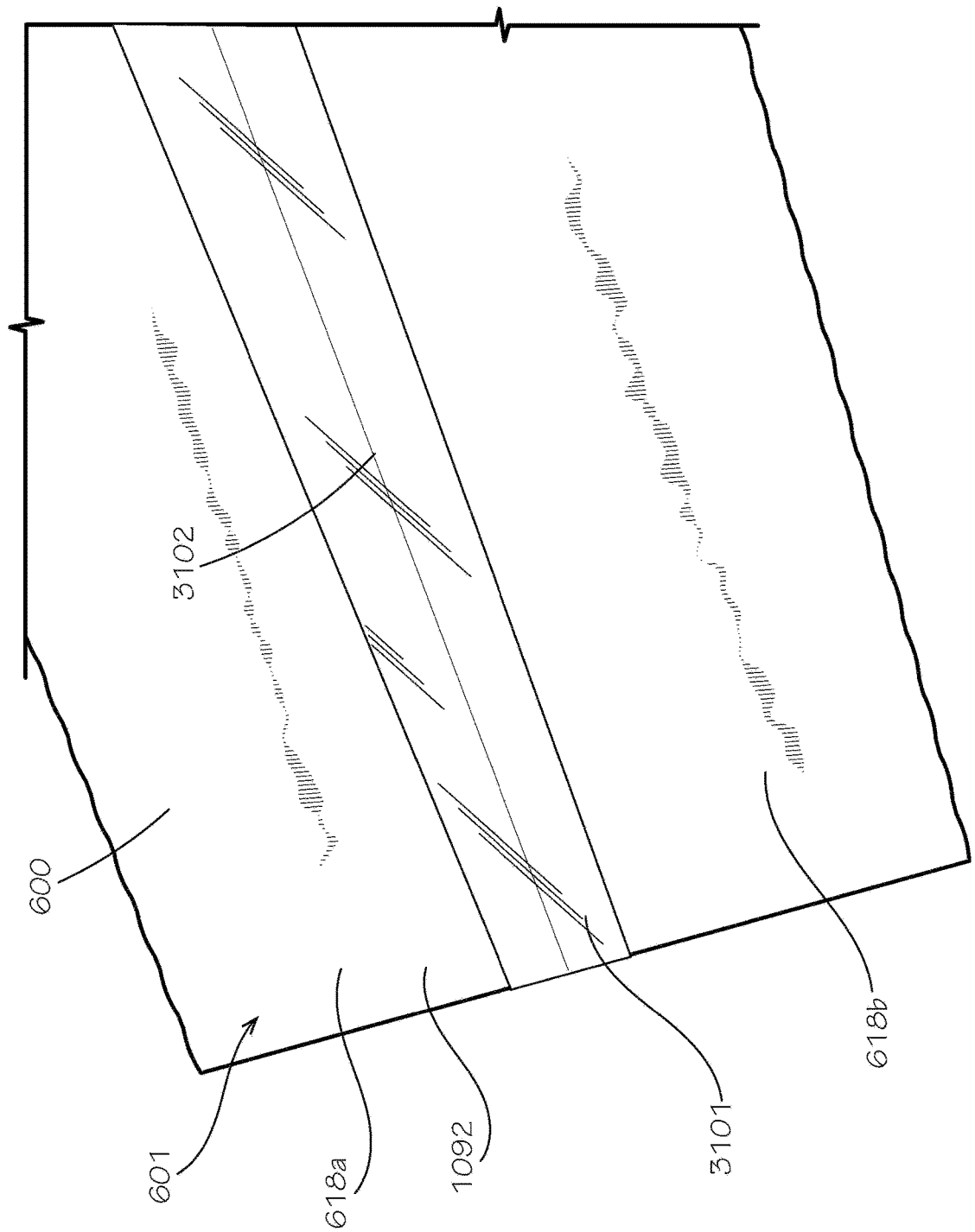
FIG. 31 is top perspective view of the outer side of the insulation wrap of FIG. 29 in the assembled and unfolded configuration.
Figure 32:
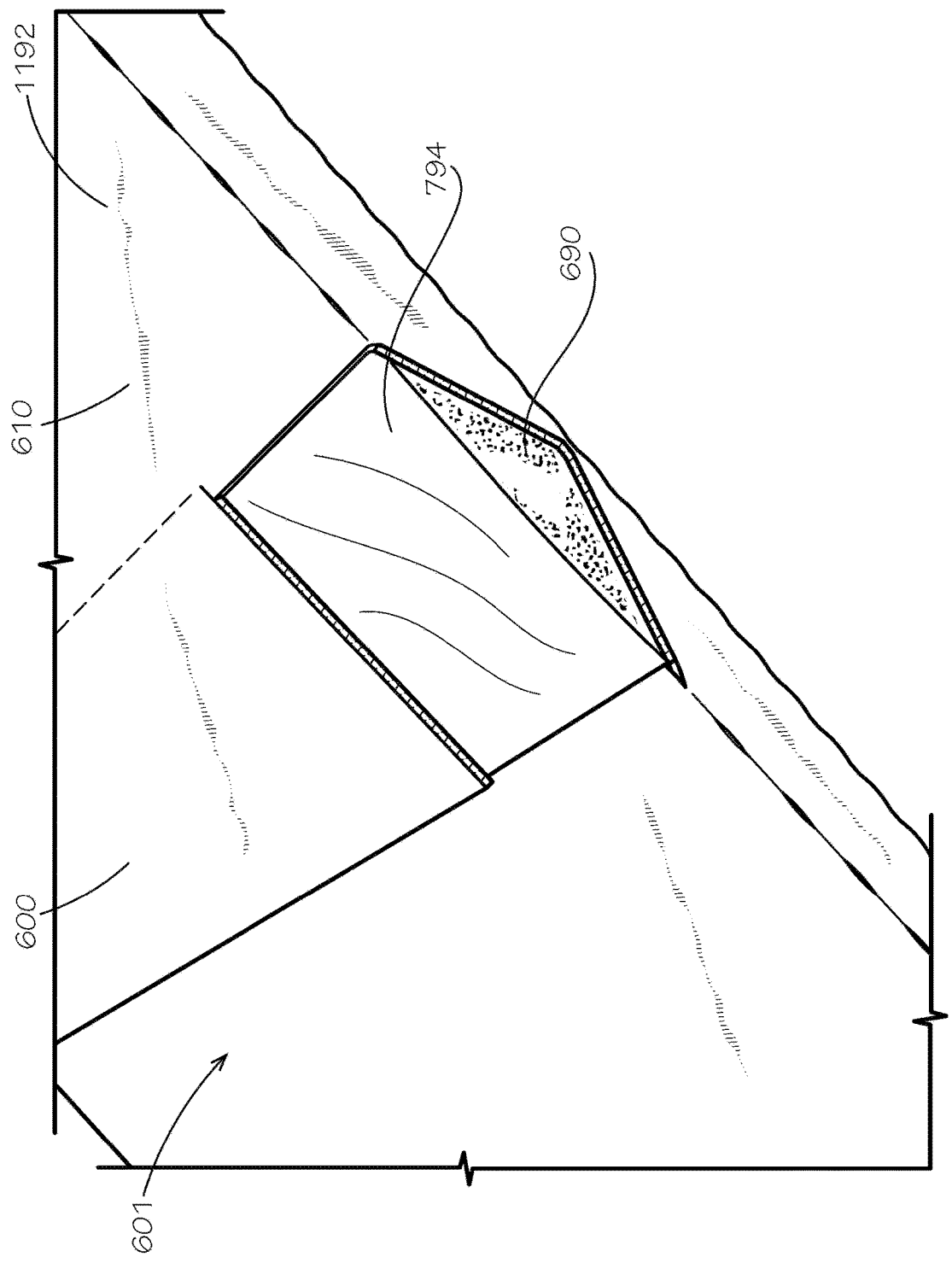
FIG. 32 is a detailed view of the inner surface of the insulation wrap of FIG. 29 in the assembled and unfolded configuration.

FIGS. 29-32 show another aspect of the insulation wrap 601 in accordance with another aspect of the present disclosure. FIG. 29 is a top perspective view of the insulation wrap 601 comprising the insulation batt 690 of FIG. 6 positioned on another aspect of the wrap liner blank 600 in the unassembled configuration. FIG. 30 is a top perspective view of the insulation wrap 601 of FIG. 29 with the wrap liner blank 600 enclosing the insulation batt 690 (not shown) on the outer surface 1092 in a partially assembled configuration. FIG. 31 is a top perspective view of the outer surface 1092 of the insulation wrap 601 of FIG. 29 in the assembled and unfolded configuration. FIG. 32 is a detailed view of the inner surface 1192 of the insulation wrap 601 of FIG. 29 in the assembled and unfolded configuration.

The wrap liner blank 600 of FIG. 29 can be similar to the wrap liner blank 600 of FIG. 6, but with extended outer portions 618a,b that are configured to be coupled together, as shown in FIG. 31. In FIG. 31, the outer portions 618a,b can be coupled together by a tape strip 3101. As shown, the tape strip 3101 can extend down a seam 3102 defined between adjacent edges of the outer portions 618a,b. In other aspect, one or more tape strips 3101 can be coupled to the outer portions 618a,b in a different orientation, such as transverse to the seam 3102 rather than parallel to the seam 3102. In other aspects, a different coupling mechanism, such as an adhesive, mechanical fasteners such as staples, or any other suitable fastener or fastening means can be utilized to couple the outer portions 618a,b together.

In the present aspect, the outer portions 618a,b can fully enclose the insulation batt 690 (shown in FIG. 29) on the outer surface 1092, thereby covering the outer side 792 (shown in FIG. 7) of the insulation batt 690. The outer portions 618a,b may contact one another at the seam 3102, or a gap can be defined at the seam 3102. In some aspects, particularly those where the outer portions 618a,b fully enclose the insulation batt 690 on the outer side 792 (shown in FIG. 7), it may be desirable to reverse the orientation of the insulation batt 690 so that the finished side 794 faces the inner portion 610, as shown in FIG. 32. This arrangement can reduce exposure of the insulation material on the inner portion 610, which can reduce the production of dust, particles, and loose fibers escaping through the inner portion 610, particularly in the assembled and unfolded configuration.

Figure 12:
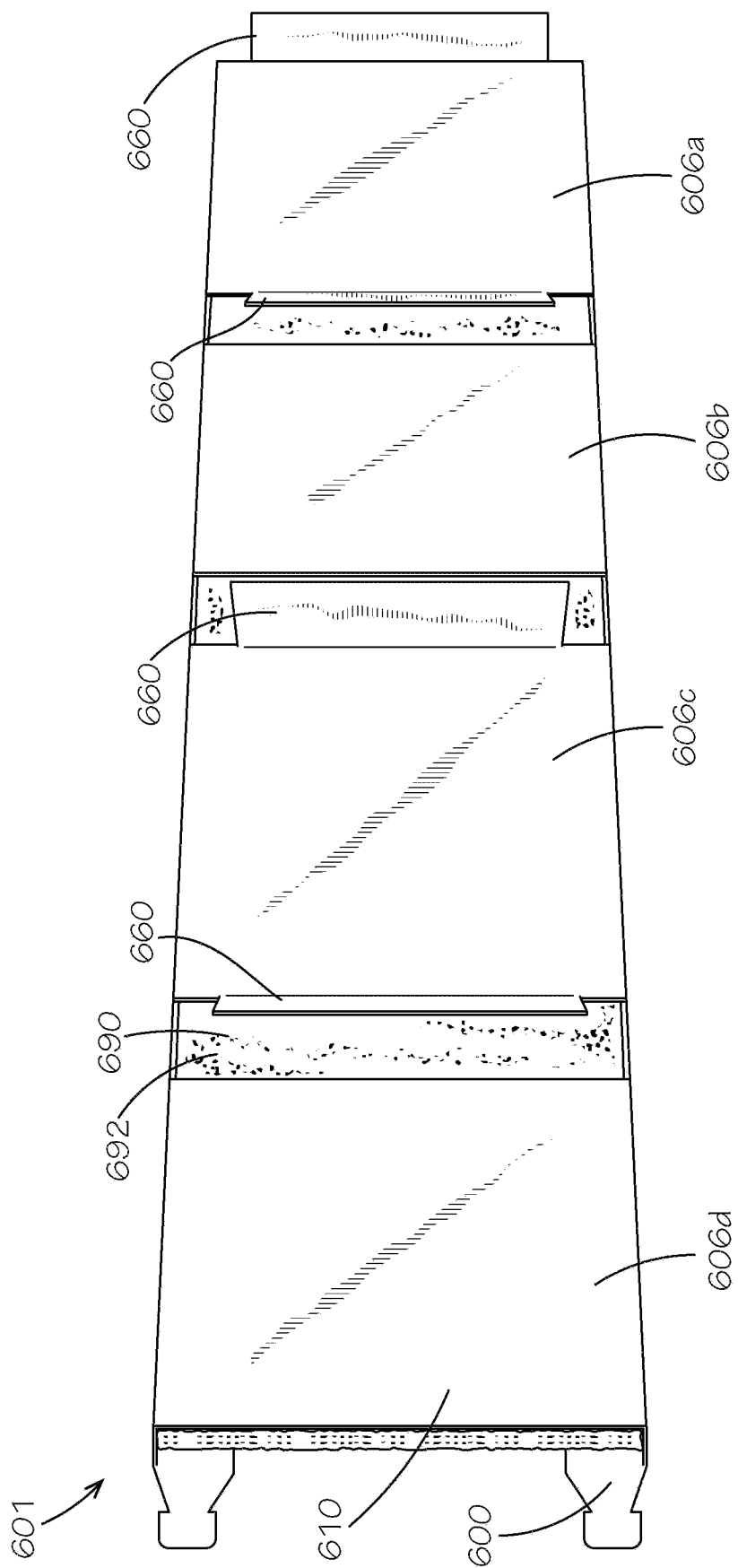
FIG. 12 is a front perspective view of the insulation wrap of FIG. 6 in the assembled and unfolded configuration with inner side flaps of the wrap liner blank folded upwards and away from the insulation batt.

Returning to FIG. 12, prior to folding the insulation wrap 601 about the outer hinges 608a,b,c (shown in FIG. 10), the inner side flaps 660 can be folded upwards and away from the inner side 692 of the insulation batt 690. While not necessary, this step can help prevent interference between the inner side flaps 660 and the inner portions 610 of the panels 606a,b,c,d.

Figure 13:
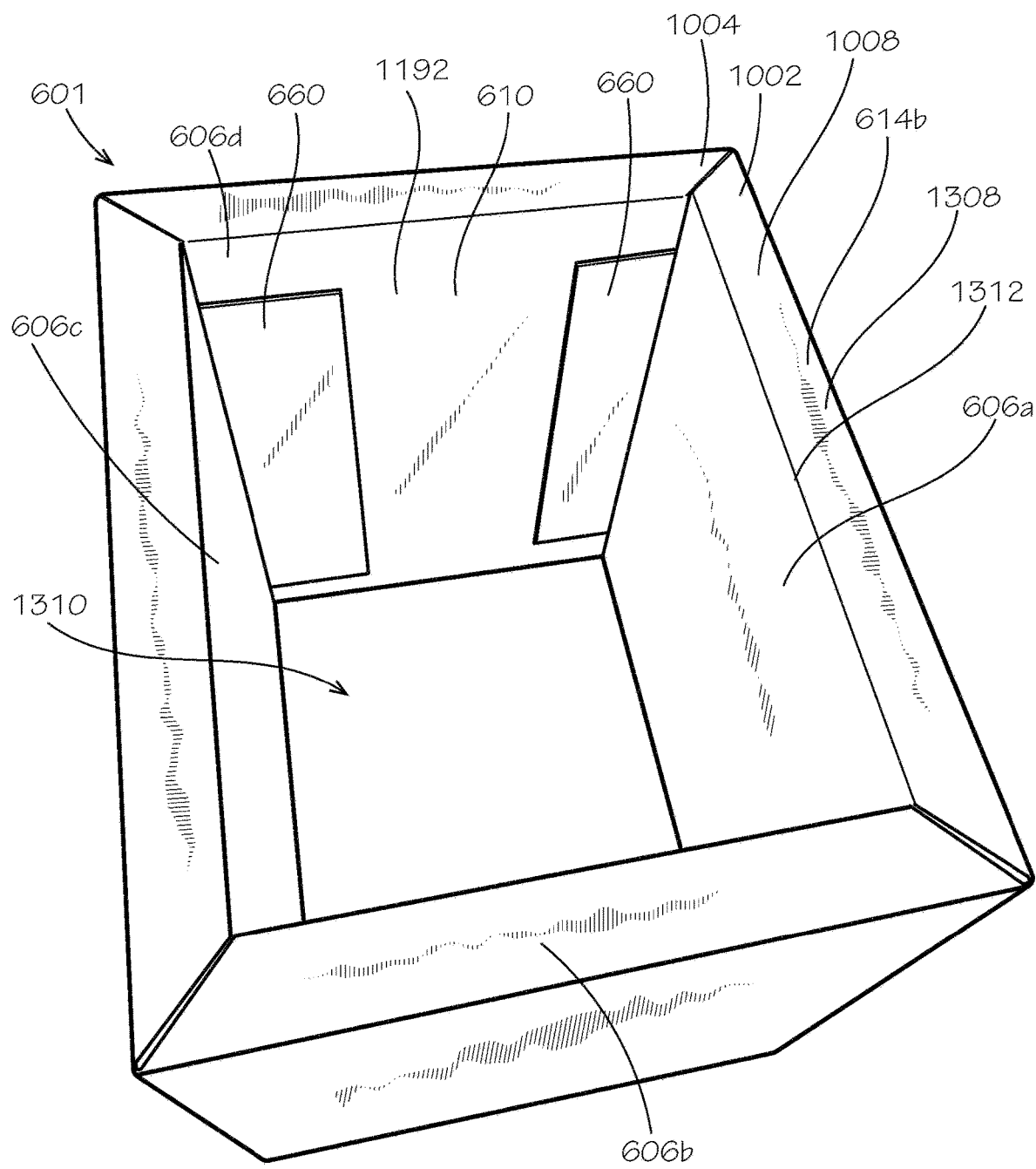
FIG. 13 is a bottom perspective view of the insulation wrap of FIG. 6 in a folded configuration.

FIG. 13 is a bottom perspective view of the insulation wrap 601 of FIG. 6 in the folded configuration. The insulation wrap 601 can define an insulated cavity 1310, which can be at least partially enclosed by the inner surface 1192 of the insulation wrap 601. The second ledge portion 614b can define a bottom ledge 1308 at the bottom end 1008 of the insulation wrap 601, and the bottom ledge 1308 can define a bottom opening 1312 to the insulated cavity 1310. As shown, the inner side flaps 660 can overlap the adjacent inner portion 610 of panels 606a,d. This arrangement can prevent dust, fibers, and other particles from the insulation batt 690 (shown in FIG. 16) from entering the insulated cavity 1310 by sealing seams in the inner surface 1192.

In the present aspect, 45-degree mitered joints can be formed at all of the corners between panels 606a,b,c,d, including where the first end 1002 joins the second end 1004.

Figure 14:
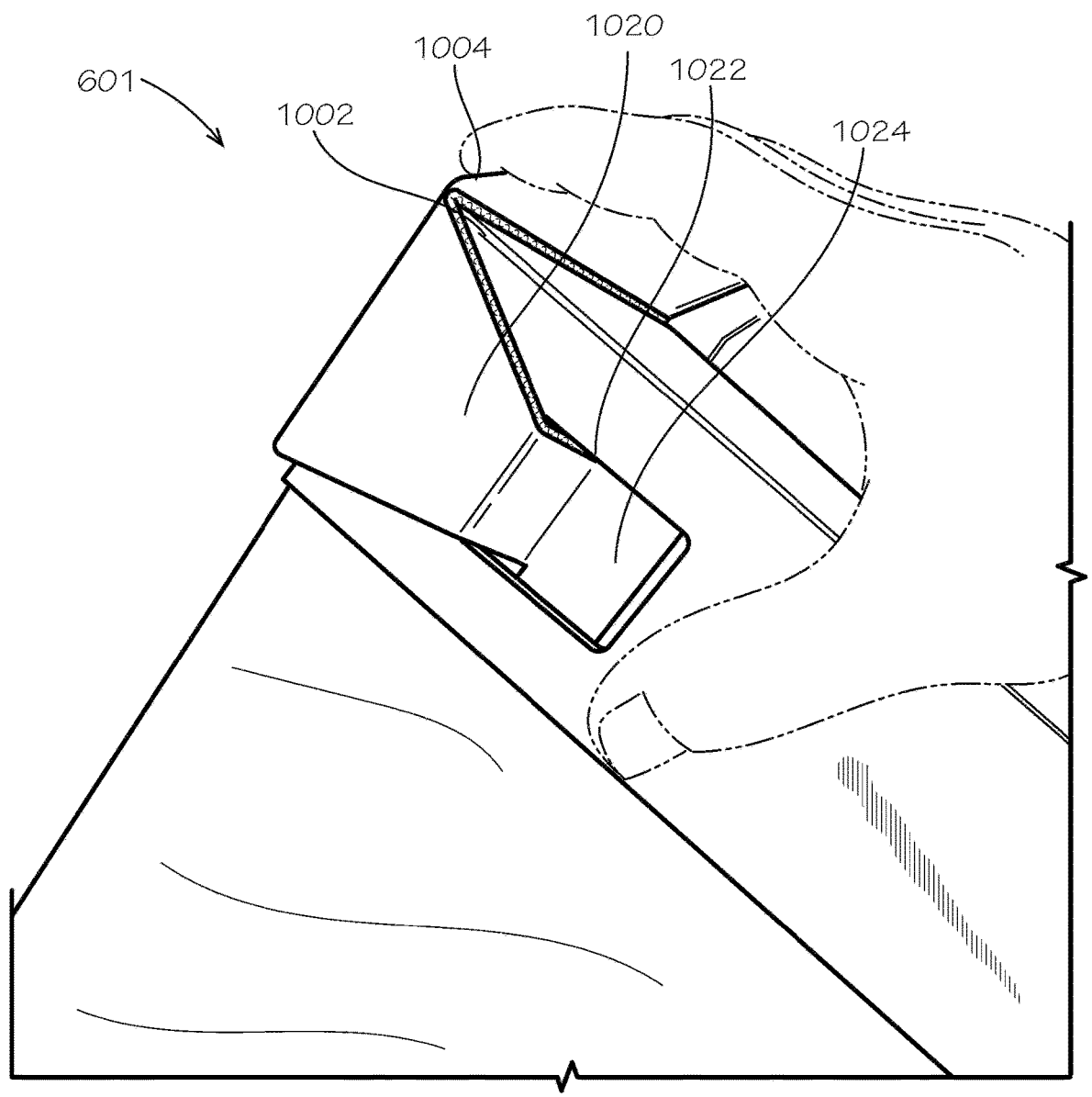
FIG. 14 is a detailed view of a closure mechanism of the insulation wrap of FIG. 6.

FIG. 14 is a detailed view of the closure mechanism 1020 of the insulation wrap 601 of FIG. 6. The tab 1024 can be inserted through the aperture 1022 to secure the first end 1002 to the second end 1004 and to maintain the insulation wrap 601 in the folded configuration. The barbed shape of the tab 1024 can be configured to resist withdrawal of the tab 1024 from the aperture 1022 after the tab 1024 has been inserted through the aperture 1022. The insulation batt 690 (shown in FIG. 6) can be slightly offset from the ends 1002,1004 so that the insulation batt 690 overlaps when the ends 1002,1004 are positioned in contact with one another. In other aspects, the insulation wrap 601 can be configured to form a butt joint where the ends 1002,1004 meet. In such aspects, the first end 1002 can be placed in facing engagement with the inner portion 610 adjacent to the second end 1004, or vice versa.

Figure 15:
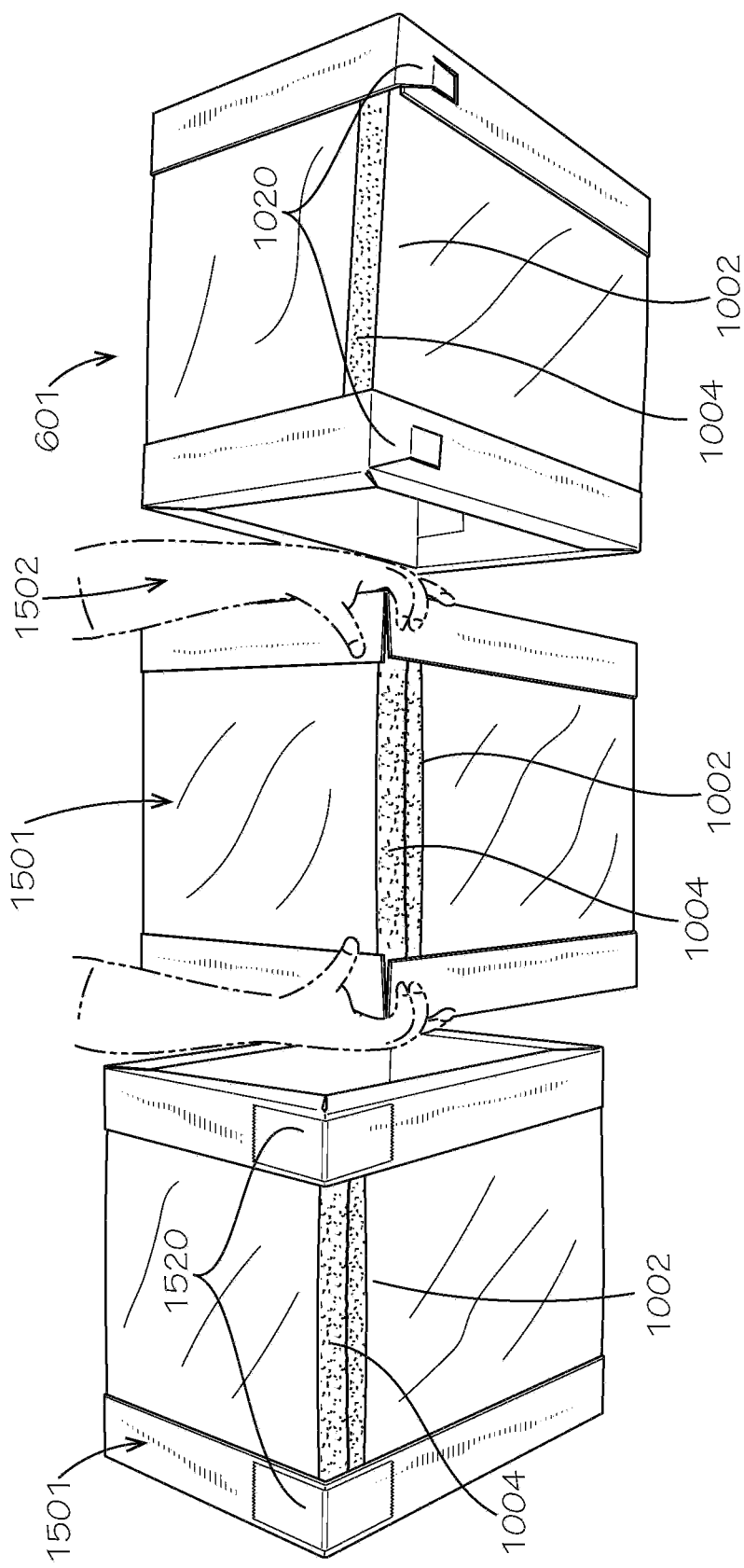
FIG. 15 is a side view of three different aspects of the closure mechanism in accordance with multiple aspects of the present disclosure.

FIG. 15 is side view demonstrating three different aspects of a closure mechanism. On the right, the insulation wrap 601 of FIG. 6 shows another view of closure mechanism 1020 from FIG. 10, which can secure the first end 1002 to the second end 1004. The left and center images show insulation wrap 1501, which can be substantially the same as insulation wrap 601 except that insulation wrap 1501 does not comprise closure mechanism 1020. On the left, a closure mechanism 1520 can demonstrate an aspect of the insulation wrap 1501 where the closure mechanism 1520 can be a separate component from the insulation wrap 1501. For example and without limitation, the closure mechanism 1520 can be tape, staples, twine, wire, straps, or any other suitable mechanism configured to secure the first end 1002 to the second end 1004. In the present aspect, the closure mechanism 1520 can be Kraft paper tape. In the center, the insulation wrap 1501 can depend upon external force to hold the first end 1002 and the second end 1004 together. Here, a worker 1502 is shown holding the insulation wrap 1501 in the folded configuration. Once the insulation wrap 1501 is in the folded configuration, the worker 1502 can then position the insulation wrap 1501 within a cavity of a complimentarily shaped box, which can secure the insulation wrap 1501 in the folded configuration.

Figure 16:
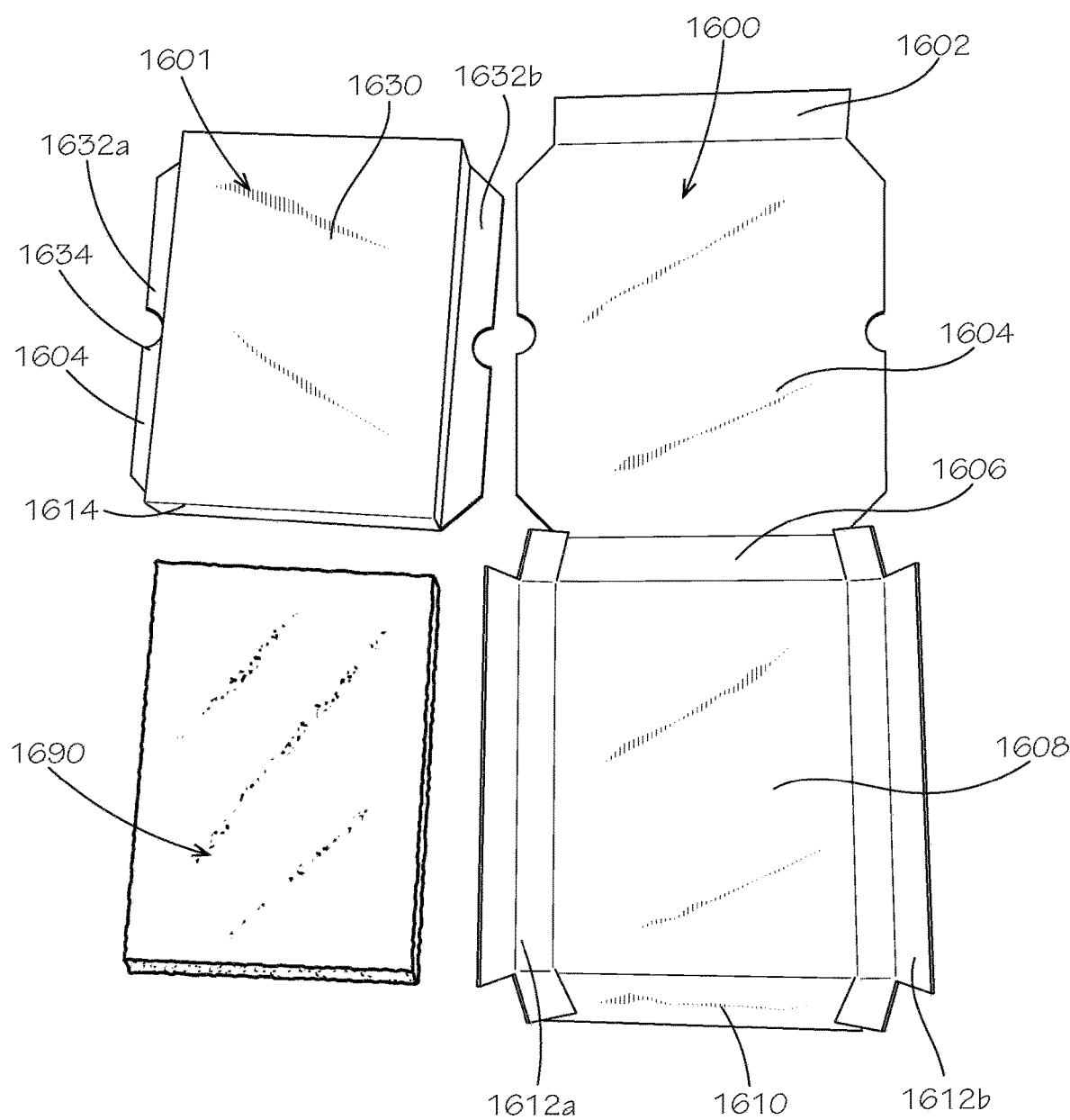
FIG. 16 is a top perspective view of a plug comprising a plug blank and a plug insulation batt in accordance with another aspect of the present disclosure.
Figure 17:
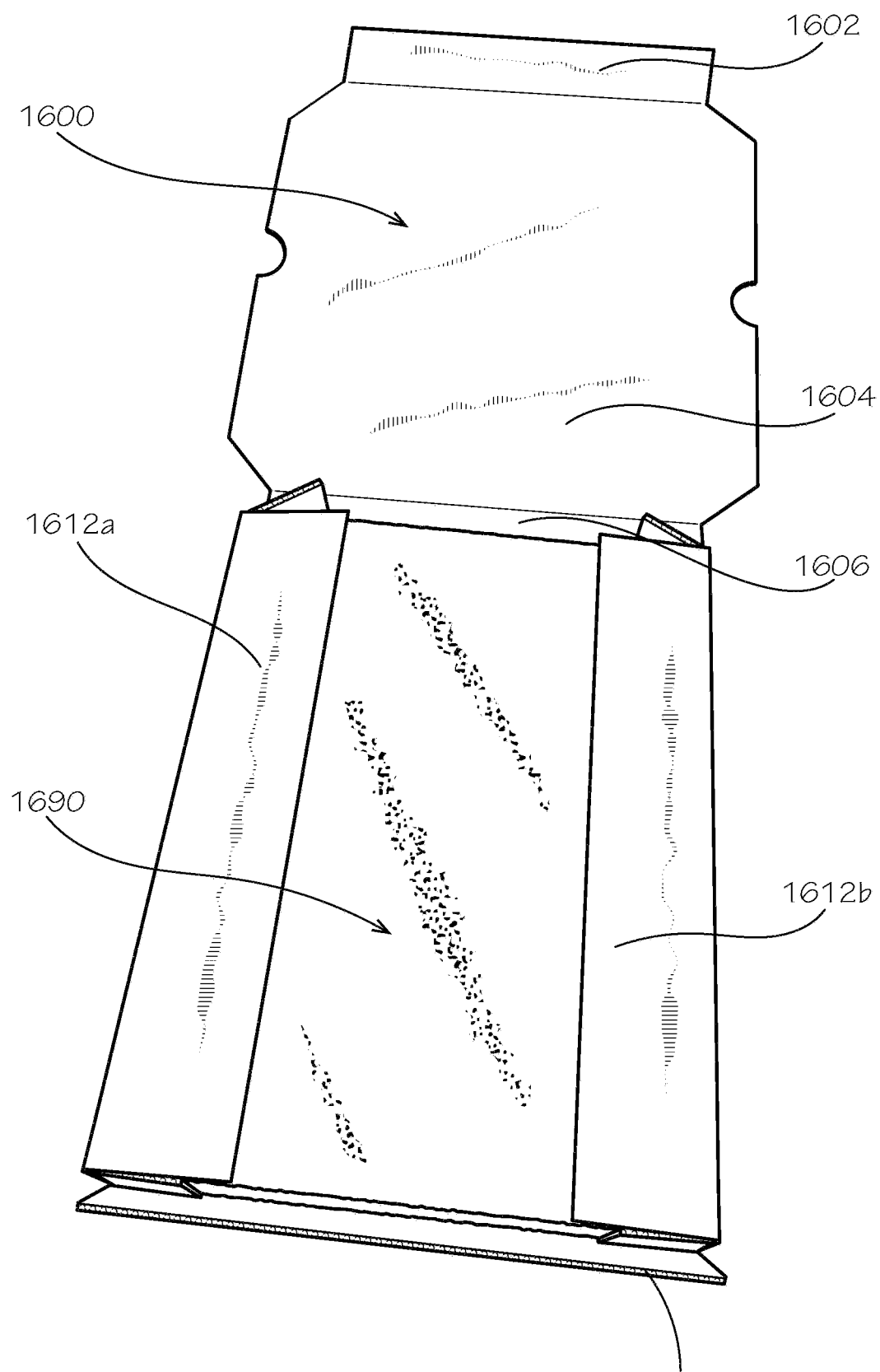
FIG. 17 is a perspective view of the plug of FIG. 16 in a partially assembled configuration.

FIG. 16 is a top perspective view of the plug 1601 comprising a plug blank 1600 and a plug insulation batt 1690 in accordance with another aspect of the present disclosure. As shown in FIG. 17, the plug blank 1600 can be folded around the plug insulation batt 1690 to enclose the plug insulation batt 1690 and form the plug 1601 (shown in FIG. 18).

As shown in FIG. 16, the plug blank 1600 can comprise a first end subpanel 1602, which can be hingedly coupled to an outer panel 1604. A first end panel 1606 can be hingedly coupled to the outer panel 1604 opposite from the first end subpanel 1602. An inner panel 1608 can be hingedly coupled to the first end panel 1606 opposite from the outer panel 1604. A second end subpanel 1610 can be hingedly coupled to the inner panel 1608 opposite from the first end panel 1606. A pair of wing portions 1612a,b can be hingedly coupled to opposite sides of the inner panel 1608 between the first end panel 1606 and the second end subpanel 1610.

Figure 21:
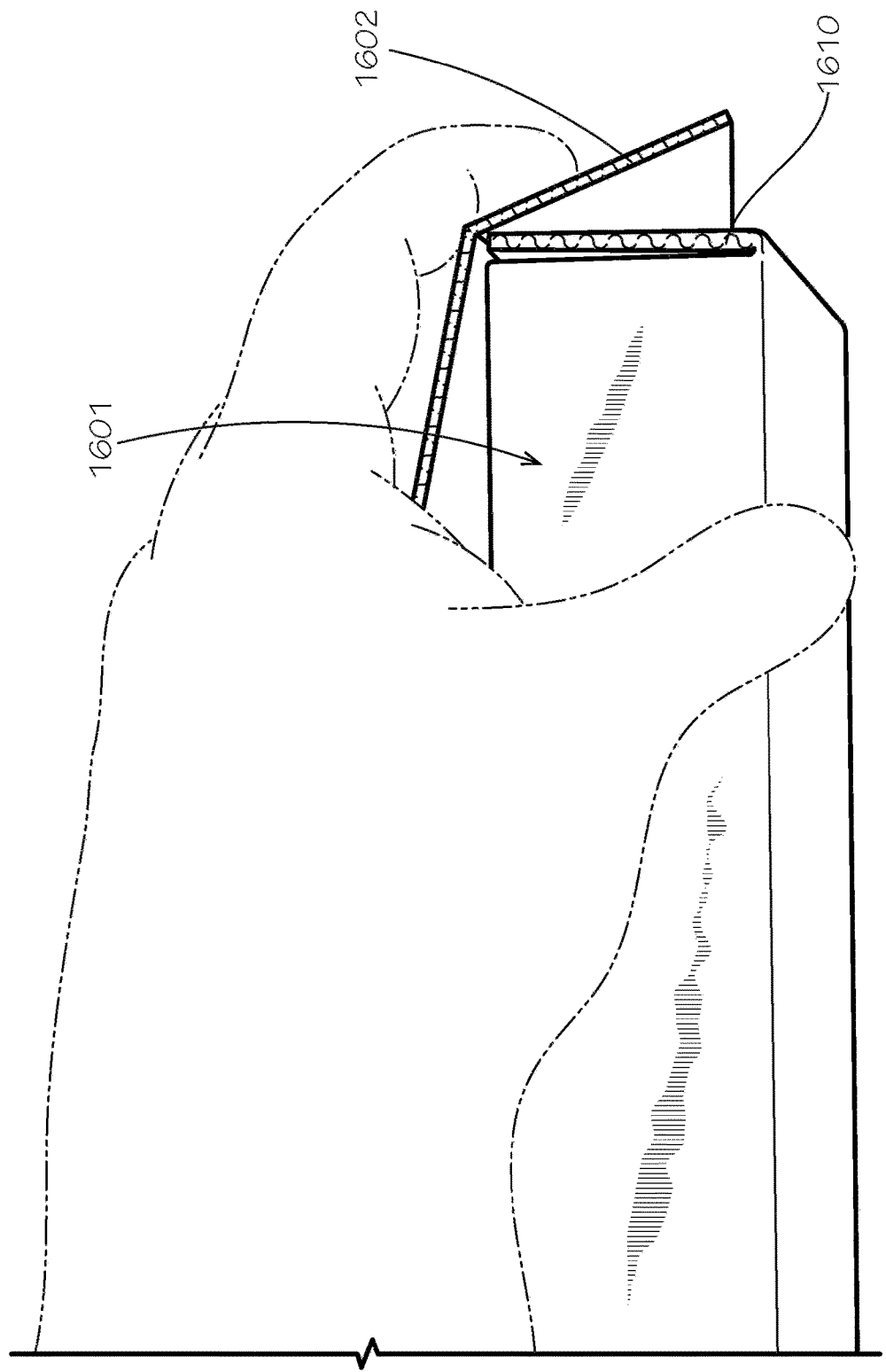
FIG. 21 is a side view of the plug of FIG. 16 demonstrating formation of the second end panel from a first end subpanel and a second end subpanel of the plug blank of FIG. 16.
Figure 22:
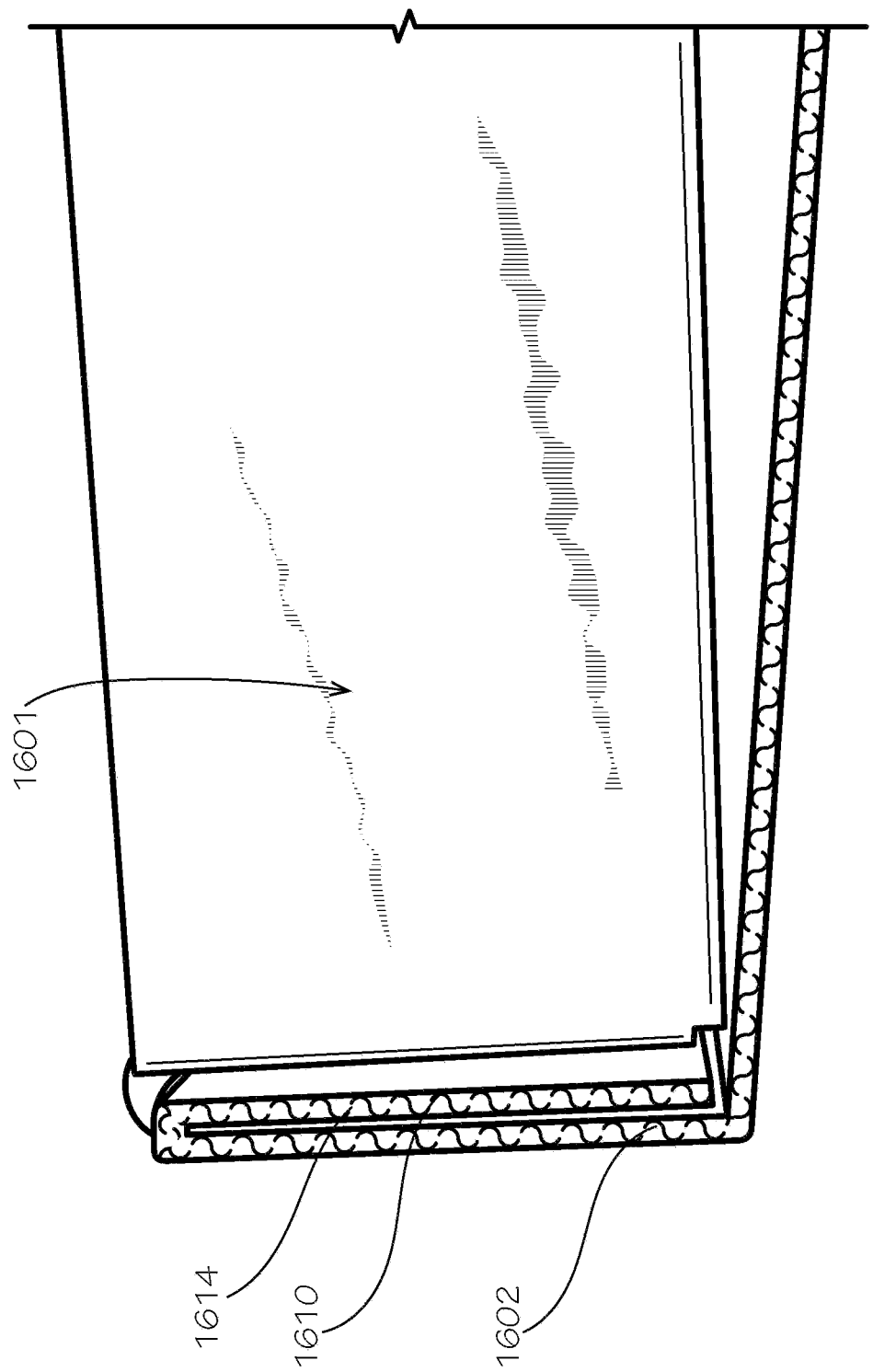
FIG. 22 is a side view of the plug of FIG. 16 demonstrating formation of the second end panel from the first end subpanel and the second end subpanel of the plug blank of FIG. 16.

As shown in FIG. 17, the plug insulation batt 1690 can be positioned on the inner panel 1608. The wing portions 1612a,b can then be wrapped around the plug insulation batt 1690, and the outer panel 1604 can be folded over the plug insulation batt 1690 and wing portions 1612a,b to fully enclose the plug insulation batt 1690. The first end subpanel 1602 can then be coupled to the second end subpanel 1610 to from a second end panel 1614, as shown in FIGS. 21 and 22. The end subpanels 1602,1610 can be secured together with an adhesive, tape, staples, or any other suitable method. With the end subpanels 1602,1610 secured together to form the second end panel 1614, the plug 1601 can be formed.

As shown in FIG. 16, the plug 1601 can comprise the insulated panel portion 1630, which can hold and enclose the plug insulation batt 1690. A pair of wing portions 1632*a,b* of the outer panel 1604 can extend outwards from opposite sides of the insulated panel portion 1630. As demonstrated by wing portion 1632*a*, the wing portions 1632*a,b* can define finger notches 1634 configured to facilitate removal of the plug 1601 when it is placed in a cavity of a box.

Figure 18:
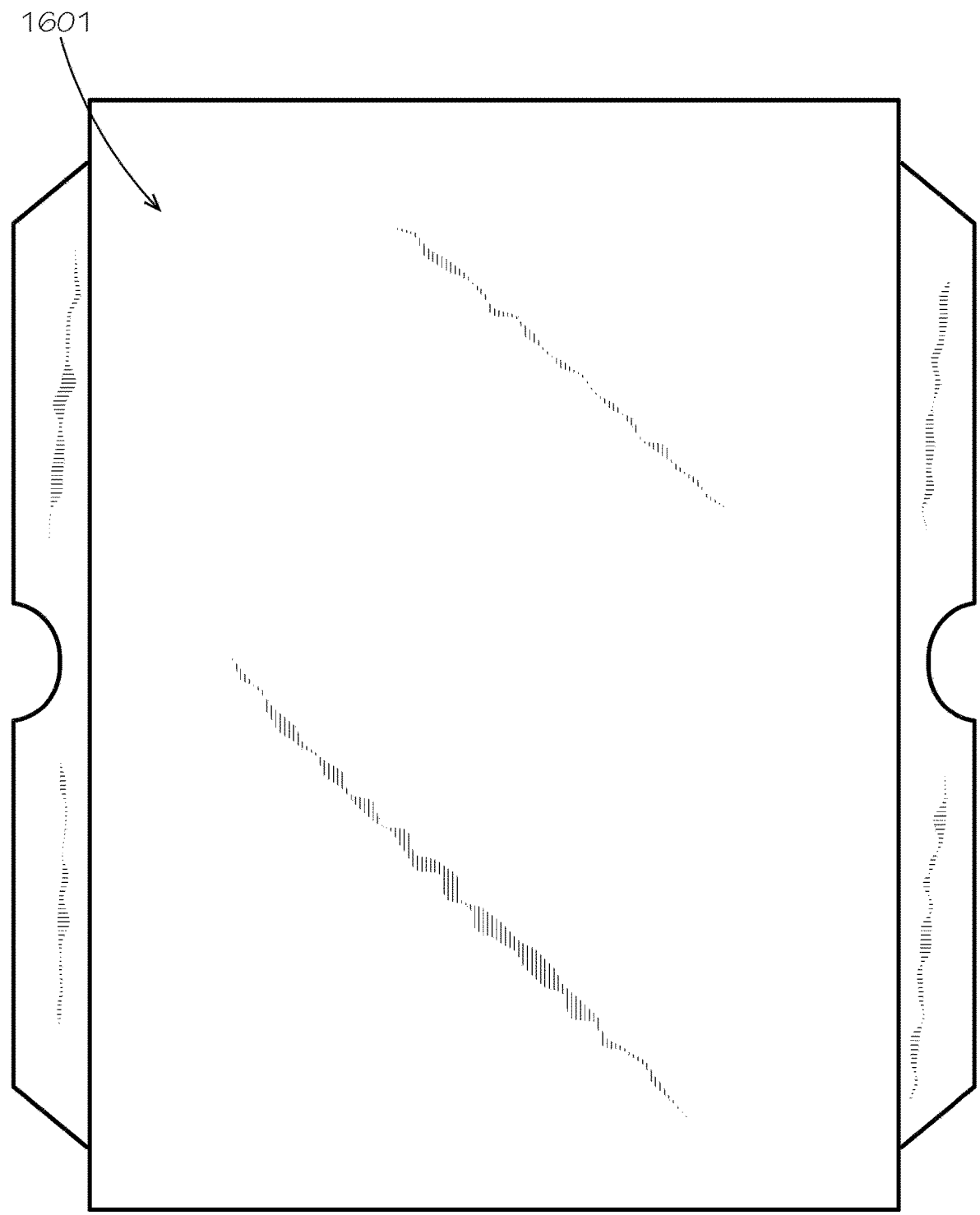
FIG. 18 is a top view of the plug of FIG. 16.
Figure 19:
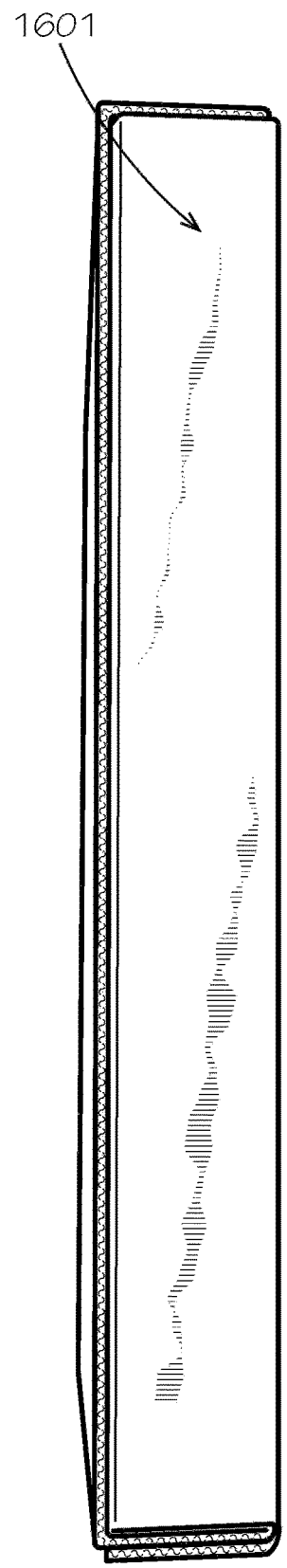
FIG. 19 is a side view of the plug of FIG. 16.
Figure 20:
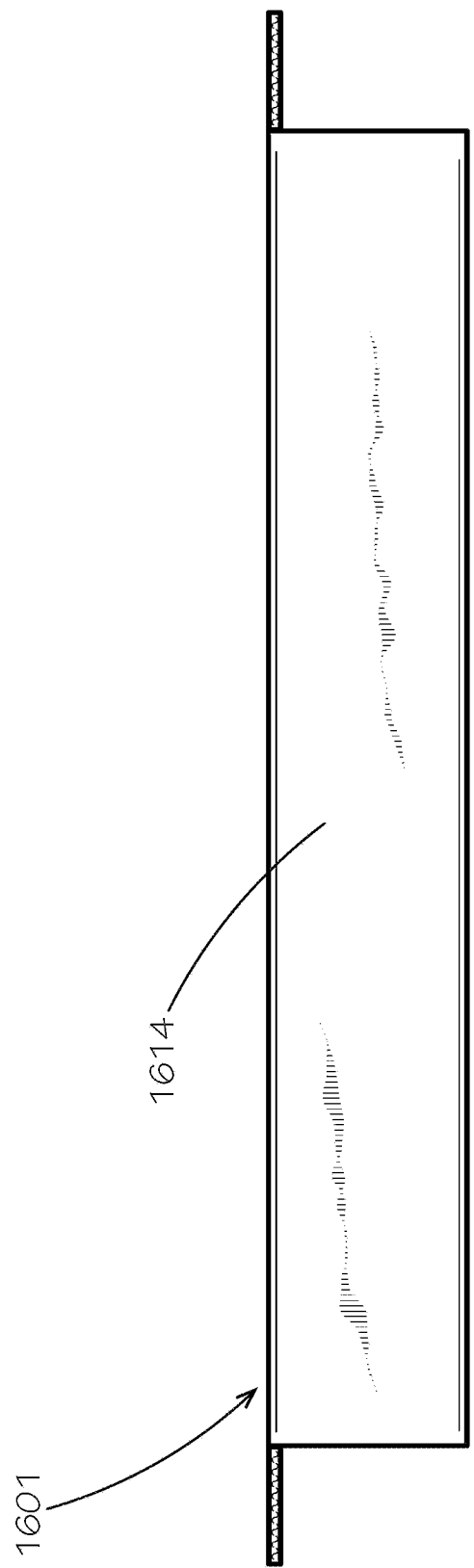
FIG. 20 is an end view of the plug of FIG. 16 showing a second end panel of the plug.

FIG. 18 is a top view of the plug 1601 of FIG. 16. FIG. 19 is a side view of the plug 1601 of FIG. 16. FIG. 20 is an end view of the plug 1601 of FIG. 16, showing the second end panel 1614. FIGS. 21 and 22 are side views of the plug 1601 of FIG. 16 demonstrating the formation of the second end panel 1614 from the end subpanels 1602,1610.

Figure 23:
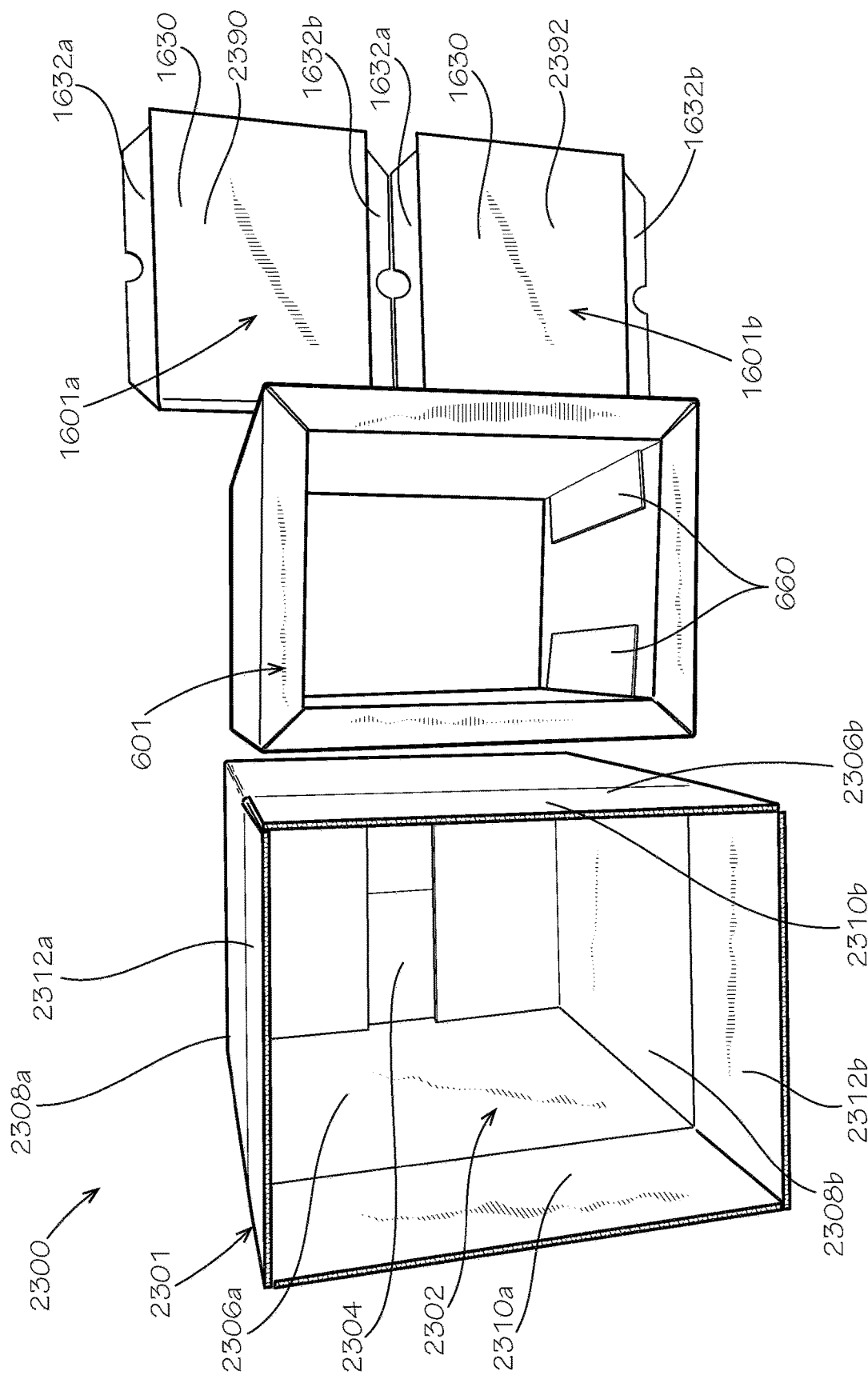
FIG. 23 is an exploded top perspective view of a packaging assembly comprising a box, the insulation wrap of FIG. 6, and two plugs of FIG. 16 in accordance with another aspect of the present disclosure.

FIG. 23 is an exploded top view of a packaging assembly 2300 comprising a box 2301, the insulation wrap 601 of FIG. 6, and two plugs 1601*a,b* of FIG. 16, in accordance with another aspect of the present disclosure. The box 2301 can comprise a bottom panel 2304, a pair of opposing side panels 2306*a,b*, a pair of opposing end panels 2308*a,b*, a pair of top side flaps 2310*a,b*, and a pair of top end flaps 2312*a,b*. In the present aspect, the box 2301 can be a regular slotted carton (RSC). In other aspects, the box 2301 can be a different kind of box.

The box 2301 can define a cavity 2302, which can be sized complimentary to the insulation wrap 601, such that when the insulation wrap 601 is positioned within the cavity 2302, the insulation wrap 601 can be positioned in contact with the side panels 2306*a,b* and the end panels 2308*a,b*. The box 2301 can be sized and have tolerances set to keep the insulation wrap 601 "squared" (wherein right-angles are formed between adjacent panels 606, as shown in FIG. 13), particularly in aspects of the insulation wrap 601 lacking a closure mechanism 1020,1520, as shown in FIG. 15.

The top side flaps 2310*a,b* and the top end flaps 2312*a,b* can be folded to form a top panel (not shown) that encloses the cavity 2302 when the box is in a closed configuration (not shown). The insulation wrap 601 can be roughly equal to a height of the side panels 2306*a,b* and end panels 2308*a,b*, and the insulation wrap 601 can increase a stacking strength of the box 2301 when the box 2301 is in the closed configuration by providing additional support between the bottom panel 2304 and the top panel to resist collapse from a load exerted on the top panel.

Figure 24:
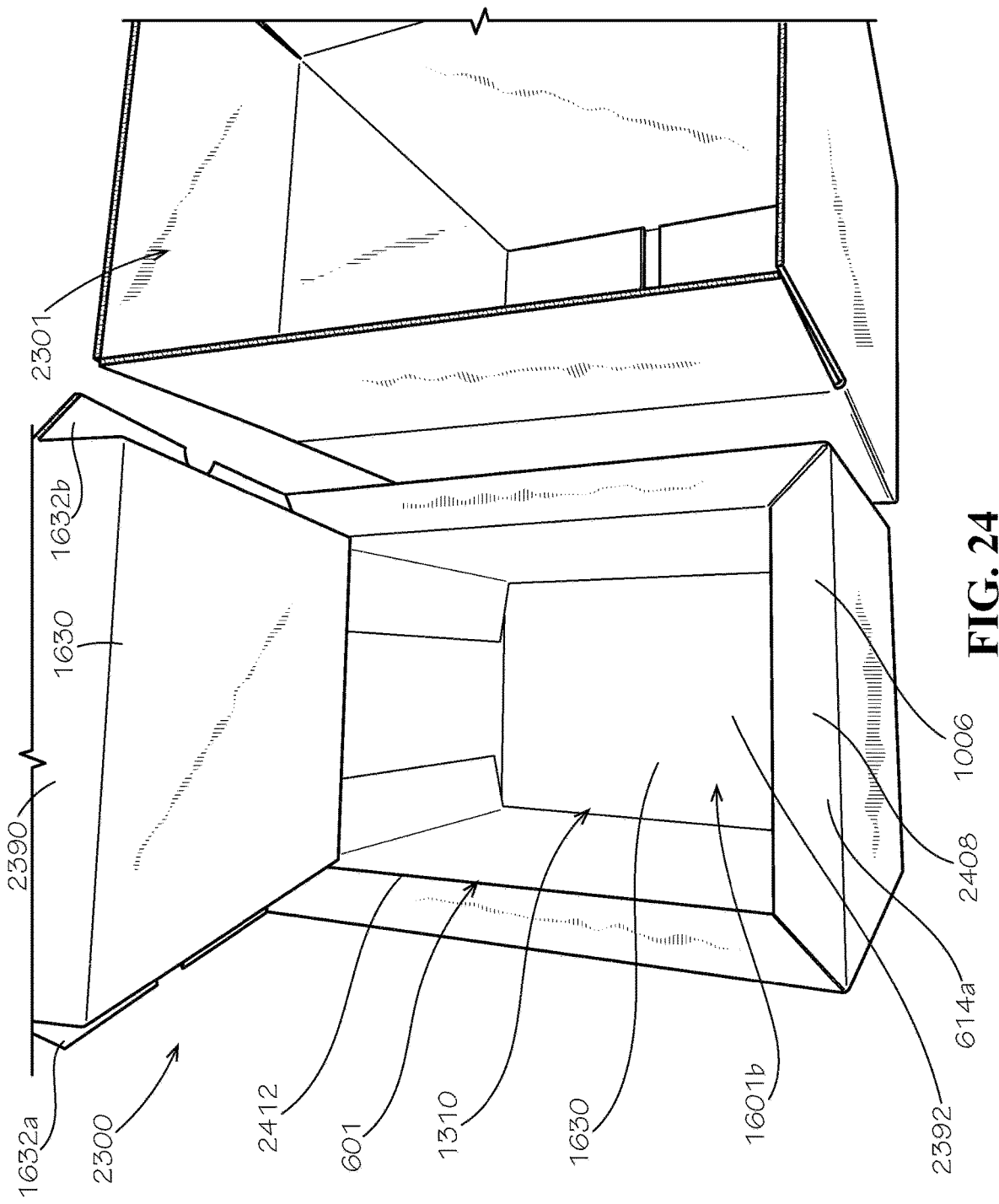
FIG. 24 is a top perspective view of the packaging assembly of FIG. 23 with the plugs partially enclosing an insulated cavity defined within the insulation wrap.

Plug 1601*a* can be a top plug 2390, and plug 1601*b* can be a bottom plug 2392. As shown in FIG. 24, the bottom plug 2392 can be positioned with the wing portions 1632*a,b* in facing engagement with the bottom ledge 1308 (shown in FIG. 13) and the insulated panel portion 1630 insert into the insulated cavity 1310 through the bottom opening 1312 (shown in FIG. 13) of the insulation wrap 601. Accordingly, the bottom plug 2392 can enclose the insulated cavity 1310 at the bottom end 1008 (shown in FIG. 10) of the insulation wrap 601.

Because the insulation batt 1690 (shown in FIG. 16) of the bottom plug 2392 is enclosed by the plug blank 1600 (shown in FIG. 16) of the bottom plug 2392, the insulation batt 1690 (shown in FIG. 16) can be protected from compression by the plug blank 1600. For example and without limitation, if heavy items are placed within the insulated cavity 1310 atop the bottom plug 2392, a rigid nature of the plug blank 1600 can support the items without compressing the insulation batt 1690. Compression of insulation material often reduces the thermal insulation performance of the insulation material. By preventing the compression of the insulation batt 1690, the insulation performance of the bottom plug 2392 can be maintained.

As shown, the insulation batts 690,1690 can be completely concealed. This arrangement can prevent any dust, loose fibers, or other particles from the insulation batts 690,1690 from accumulating in the insulated cavity 1310. It can also provide an aesthetically pleasing presentation when opened by a receiving individual.

Figure 25:
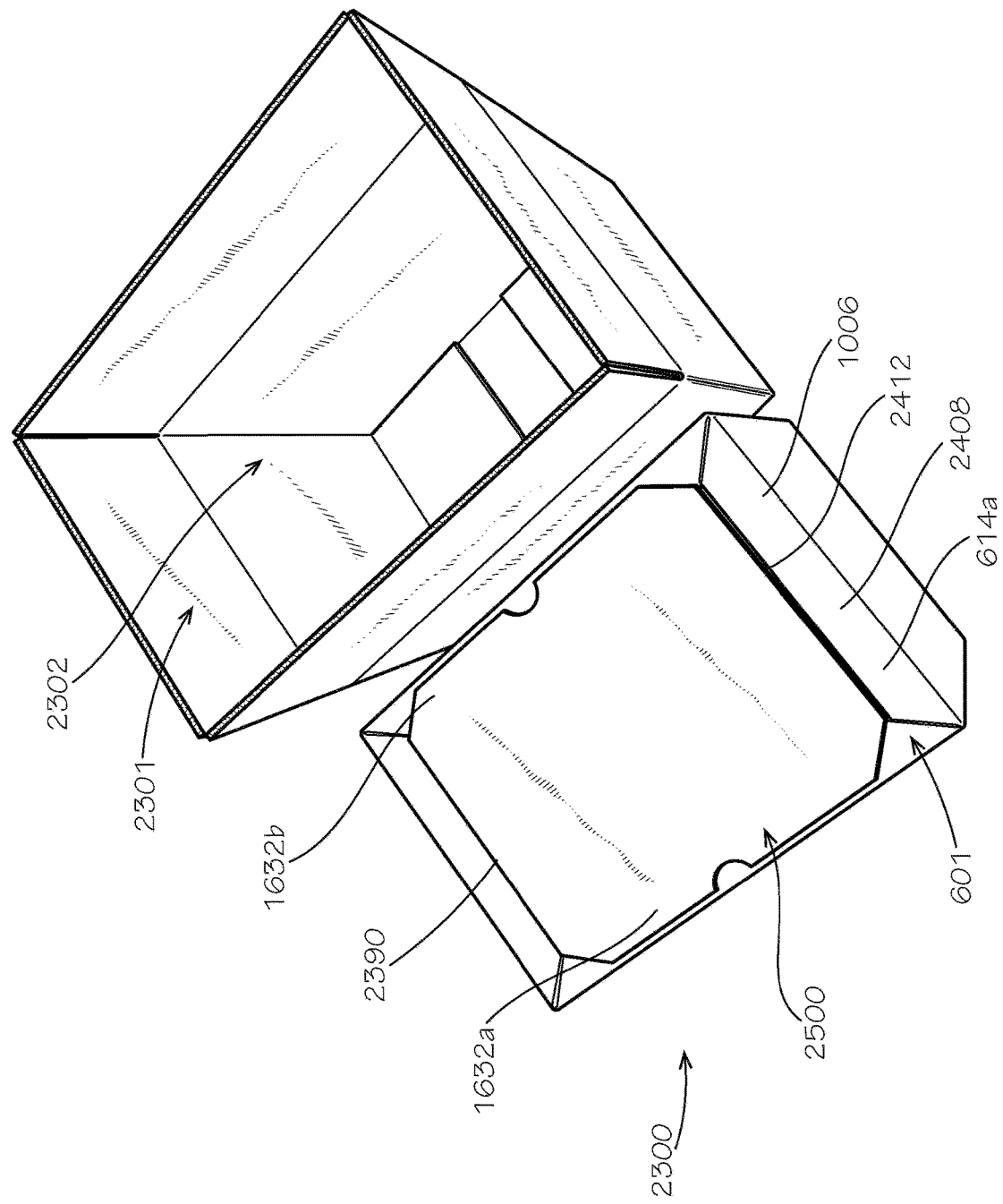
FIG. 25 is a top perspective view of the packaging assembly of FIG. 23 with the plugs fully inserted into the insulation liner and enclosing the insulated cavity to from an insulated core.

The first ledge portion 614*a* can define a top ledge 2408 at the top end 1006 of the insulation wrap 601. The top ledge 2408 can define a top opening 2412 to the insulated cavity 1310. As shown in FIGS. 24 and 25, the top plug 2390 can be positioned so that the insulated panel portion 1630 can be inserted into the insulated cavity 1310 through the top opening 2412, and the wing portions 1632*a,b* can be positioned in facing engagement with the top ledge 2408 to enclose the insulated cavity 1310 at the top end 1006 of the insulation wrap 601. The inner side flaps 660 (shown in FIG. 23) do not extend all the way to the top ledge 2408 and the bottom ledge 1308 (shown in FIG. 13) to provide clearance for the insulated panel portions 1630 (shown in FIG. 24) and avoid interference which could result in a weaker seal between the plugs 2390,2392 and the insulation wrap 601.

The top plug 2390, the bottom plug 2392 (shown in FIG. 24), and the insulation wrap 601 can define an insulated core 2500, as shown in FIG. 25. After assembly, the insulated core 2500 can then be placed in the cavity 2302 of the box 2301, and the box 2301 can be closed. In some aspects, the insulated core 2500 can be secured together, such as by fixing the plugs 2390,2392 in place with tape or any other suitable method, before placing the insulated core 2500 in the cavity 2302. In some aspects, frictional engagement between the insulated panel portions 1630 of the plugs 2390,2392 and the respective openings 1312,2412 can couple the plugs 2390,2392 to the insulation wrap 601 and form seals there between.

Figure 26:
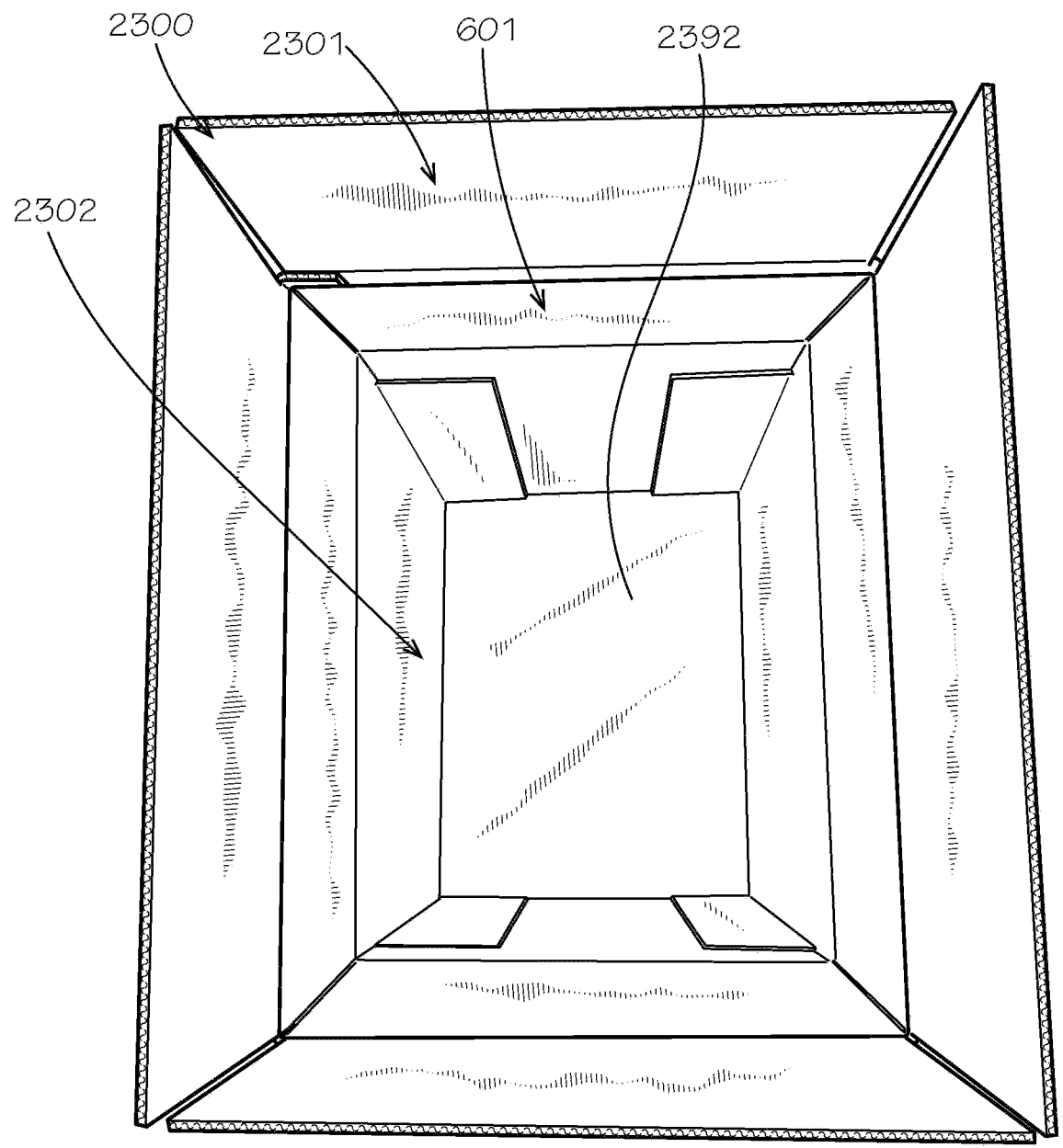
FIG. 26 is a top perspective view of the packaging assembly of FIG. 23 with one plug and the insulation liner of FIG. 6 inserted into a cavity of the box.

Rather than assembling the insulated core 2500 outside of the cavity 2302, the plugs 2390,2392 and insulation wrap 601 can be placed inside the cavity 2302 of the box 2301 to assemble the insulated core 2500 within the cavity 2302, as shown in FIG. 26. For example, the bottom plug 2392 can first be placed in the cavity 2302, then the insulation wrap 601 can be placed in the cavity 2302, and finally the top plug 2390 can be placed in the cavity 2302 to assemble the insulated core 2500. In some aspects, the plugs 2390,2392 can be sized to self-center within the cavity 2302, such as by comprising wing portions that engage both the end panels 2308*a,b* (shown in FIG. 23) and the side panels 2306*a,b* (shown in FIG. 23) to facilitate alignment between the plugs 2390,2392 and the insulation wrap 601. In some aspects, the bottom plug 2392 and the insulation wrap 601 can be coupled together and then inserted into the cavity 2302, and the top plug 2390 can be inserted in a separate step to assemble the insulated core 2500 within the cavity 2302. In some aspects, the bottom plug 2392 can be positioned within the cavity 2302, and the top plug 2390 and insulation wrap 601 can be coupled together and then inserted into the cavity 2302 to in a separate step to assemble the insulated core 2500 within the cavity 2302.

Figure 27:
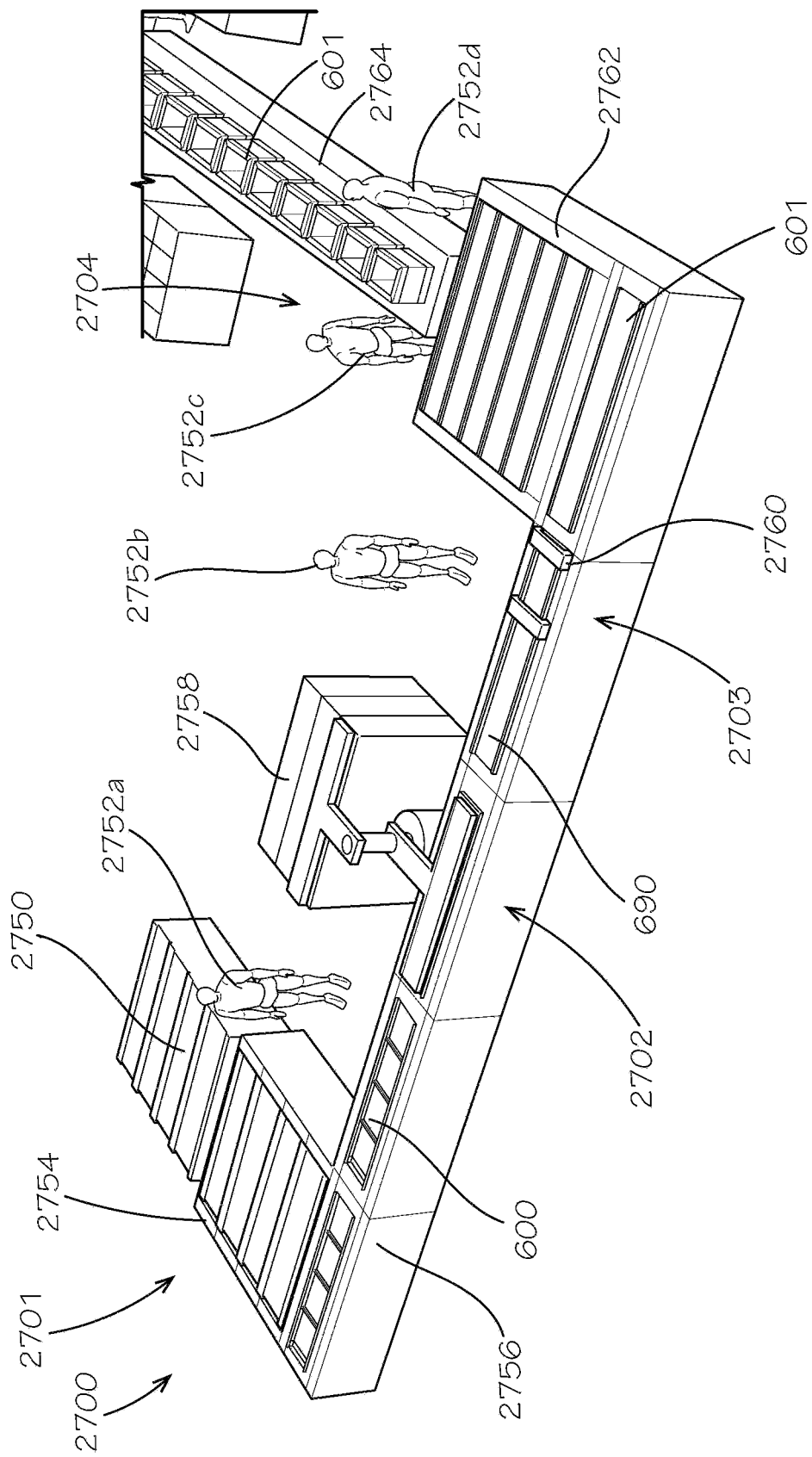
FIG. 27 is a perspective view of an assembly line for assembling and folding the insulation wraps of FIG. 6 in accordance with another aspect of the present disclosure.

FIG. 27 is a perspective view of an assembly line 2700 for assembling and folding the insulation wraps 601 of FIG. 6 in accordance with another aspect of the present disclosure. In a first step 2701, a worker 2752*a* can take wrap liner blanks 600 from a pallet 2750 and queue the wrap liner blanks 600 on a first work table 2754. From the first work table 2754, the wrap liner blanks 600 can be individually fed onto a first conveyor belt 2756.

In a second step 2702, the first conveyor belt 2756 can guide the wrap liner blanks 600 through an insulation station 2758 wherein insulation batts 690 can be positioned atop the wrap liner blanks 600. In the present aspect, this step can be performed by a machine at insulation station 2758, such as a pick-and-place robotic machine that picks up an insulation batt 690 and places it on each wrap liner blank 600. In other aspects, a worker 2752*b* can perform this step.

In step 2703, the insulation batt 690 and wrap liner blank 600 can pass through an assembly station 2760 wherein the wrap liner blanks 600 can be wrapped around the insulation batts 690 to form insulation wraps 601 in the assembled and unfolded configuration, as similarly described with respect to FIGS. 9 and 10 above. In the present aspect, assembly station 2760 can be a fold-and-glue station that folds the wrap liner blanks 600 and couples them to the insulation batts 690 with an adhesive. The unfolded insulation wraps 601 can then move from the first conveyor belt 2756 to a second work table 2762.

In step 2704, the insulation wraps 601 can be folded to the folded configuration and be placed on a second conveyor belt 2764. This step can be completed by one or more workers, such as workers 2752*c,d*, or by a machine (not shown). The steps 2701,2702,2703,2704 should not be viewed as limiting. Any step shown may be manually performed or automated, for example and without limitation.

Additionally, rather than folding the insulation wraps 601 in step 2704, the assembled insulation wraps 601 in the unfolded configuration can be palletized and shipped, such as to a customer, where the insulation wraps 601 can be folded on-site at the customer's location and used to contain and ship products. In some aspects, the insulation wraps 601 can be compressed before being palletized. By shipping the insulation wraps 601 in the unfolded configuration, the volume of the insulation wraps 601 can be minimized, thereby removing dead space and avoiding "shipping air" to the customer. Palletized liners 601 in the unfolded configuration also take less space in the customer's warehouse.

Figure 28:
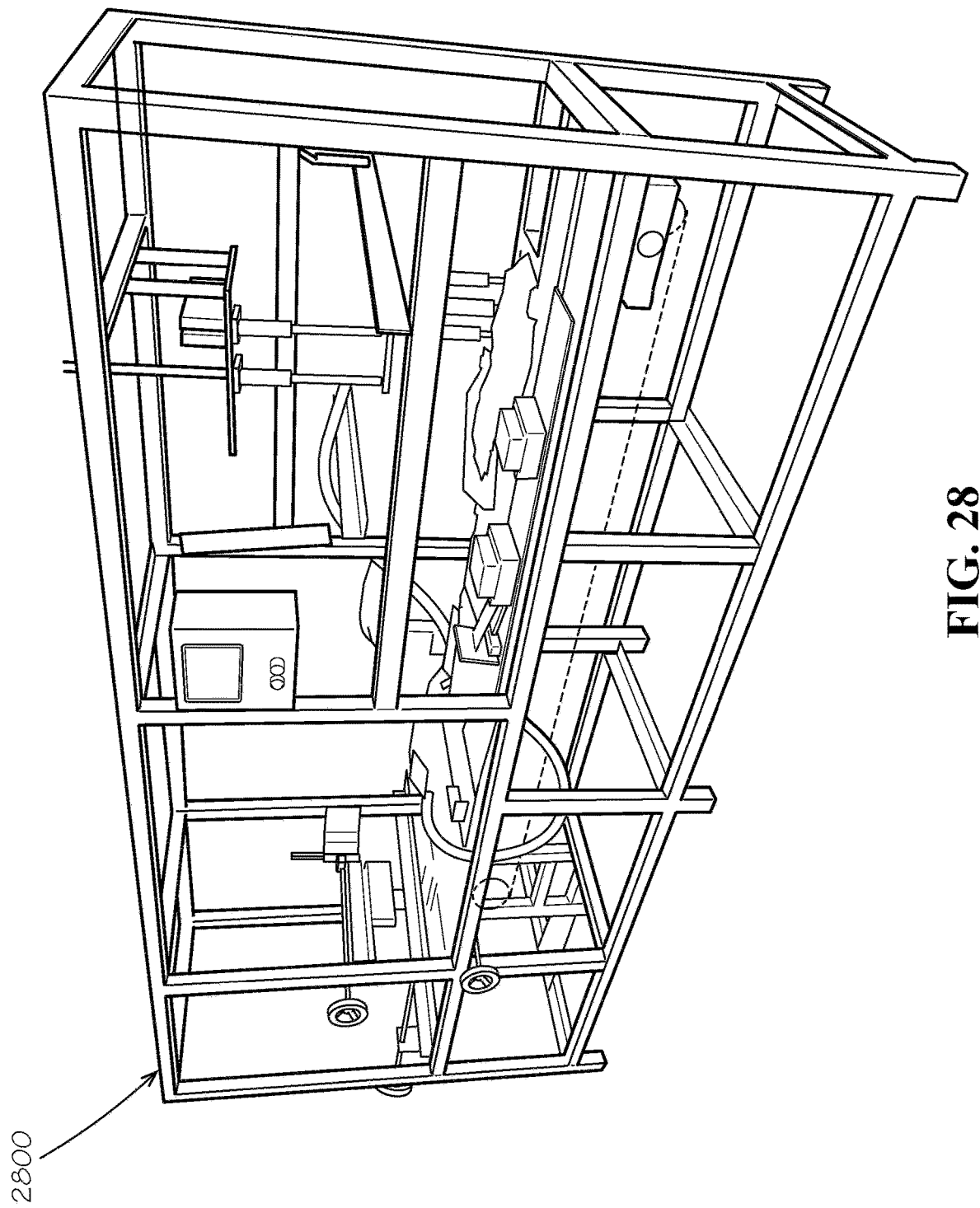
FIG. 28 is a perspective view of a machine for assembling the plugs of FIG. 16 in accordance with another aspect of the present disclosure.

FIG. 28 is a perspective view of a machine 2800 for assembling the plugs 1601 of FIG. 16, as shown and described with respect to FIGS. 16, 17, 21, and 22. In the present aspect, the 1600 can be specifically designed to facilitate automated assembly of the plugs 1601.

Figure 33:
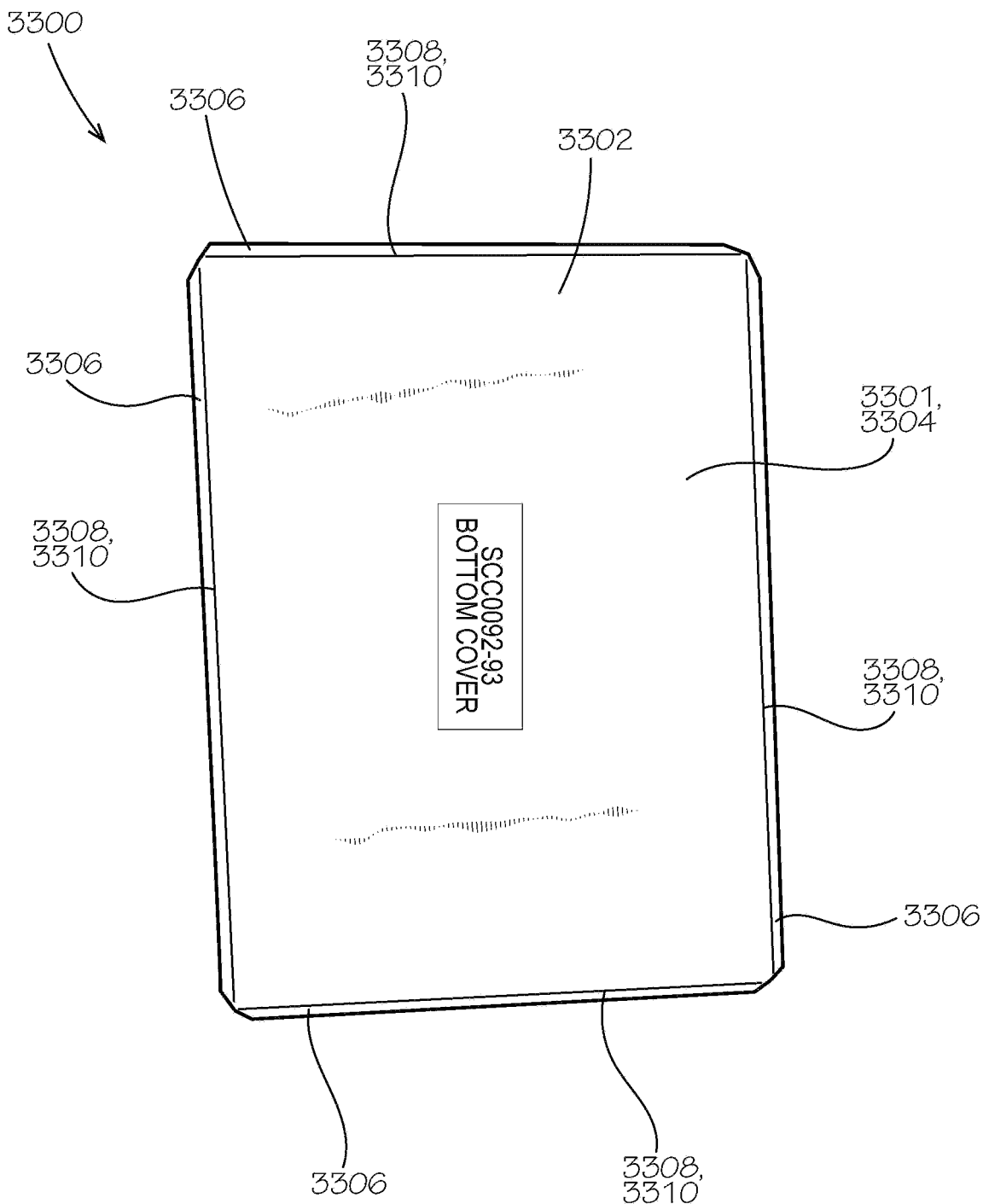
FIG. 33 is a top view of another aspect of a plug in accordance with another aspect of the present disclosure.
Figure 34:
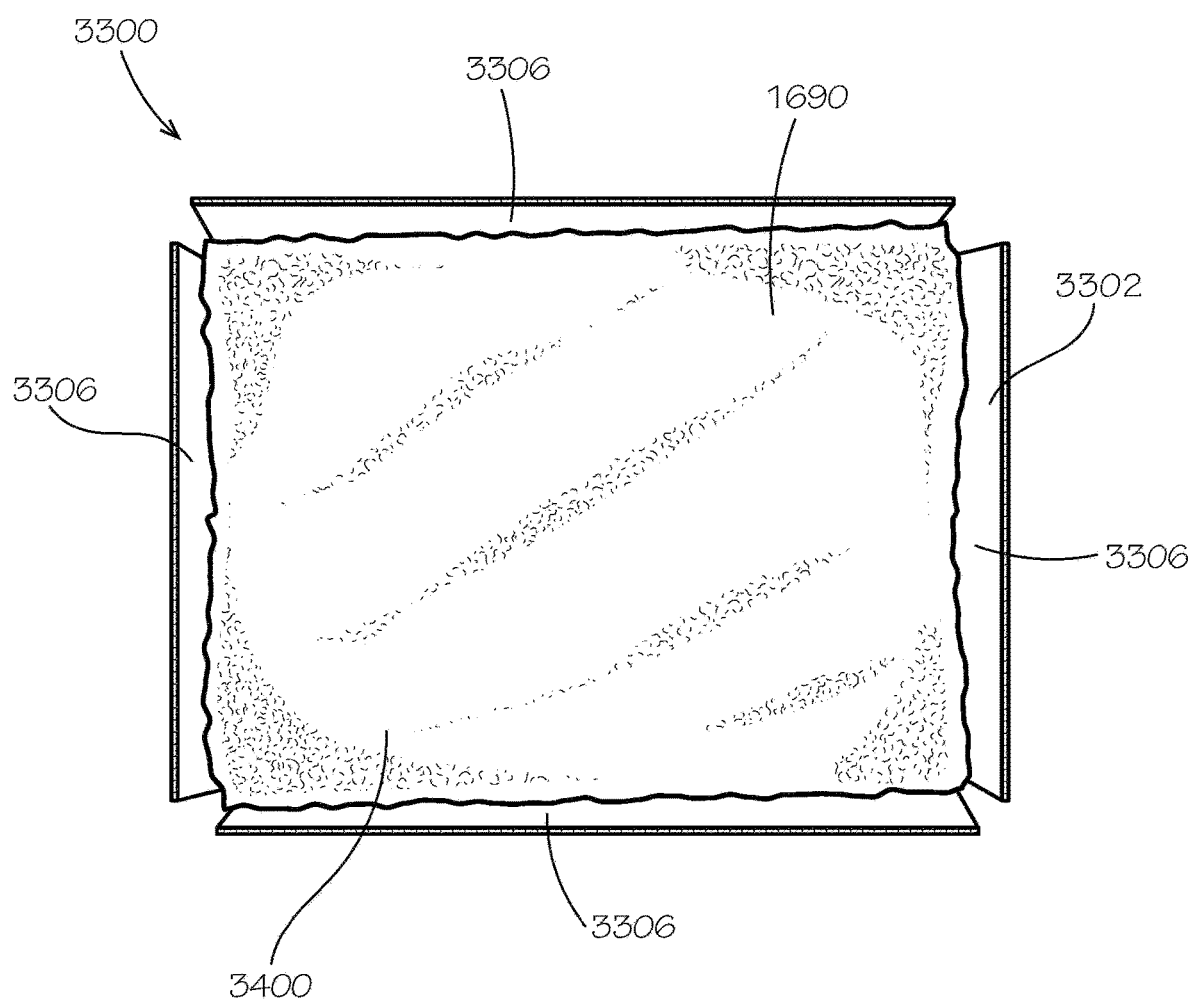
FIG. 34 is a bottom perspective view of the plug of FIG. 33.
Figure 35:
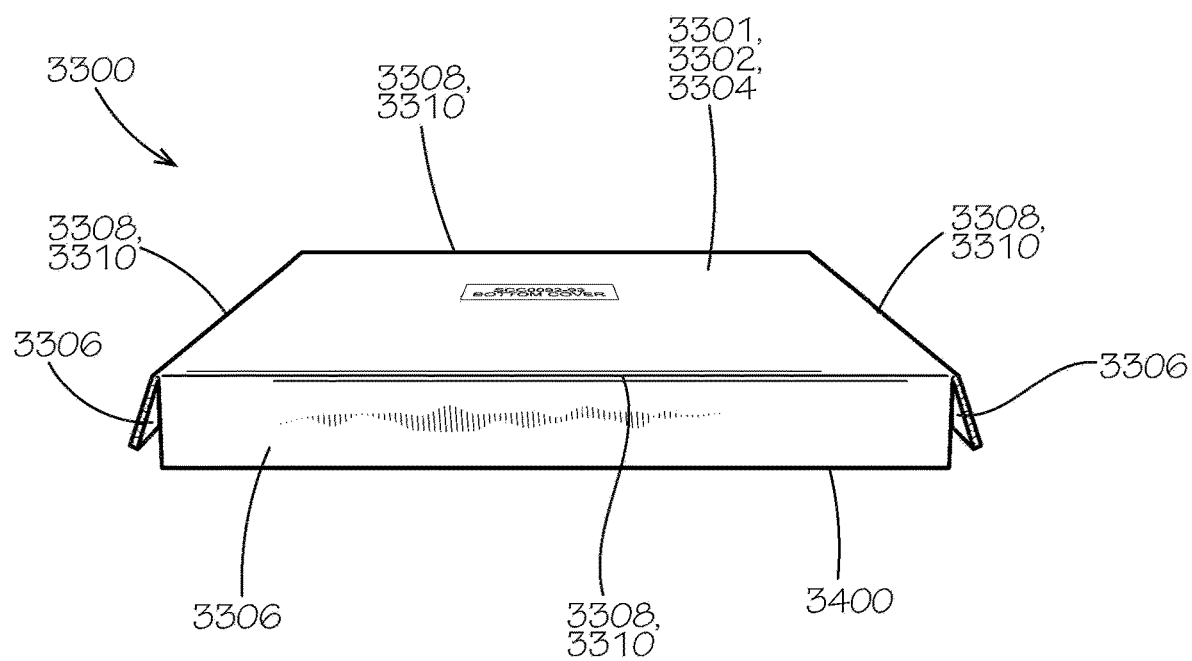
FIG. 35 is a side perspective view of the plug of FIG. 33.

FIGS. 33-35 show various views of another aspect of a plug 3300 in accordance with another aspect of the present disclosure. The plug 3300 can comprise another aspect of a plug blank 3302 (shown in FIGS. 33-35 and 41) and the insulation batt 1690 (shown in FIG. 34) of FIG. 16. As shown in FIG. 33, the plug blank 3302 can comprise a center panel 3304 and a plurality of side panels 3306. The center panel 3304 can define a top side 3301 of the plug 3300. Each of the side panels 3306 can be hingedly coupled to a different edge 3308 of the center panel 3304 by a different hinge 3310.

The insulation batt 1690 (shown in FIG. 34) can be positioned in facing engagement with the center panel 3304 (shown in FIGS. 33 and 35). As shown in FIG. 34, the side panels 3306 can fold around the insulation batt 1690. The center panel 3304 and the side panels 3306 can partially enclose the insulation batt 1690. In the present aspect, the insulation batt 1690 may only be exposed on a bottom side 3400 of the plug 3300, so that the insulation batt 1690 and the side panels 3306 can define the bottom side 3400.

Figure 36:
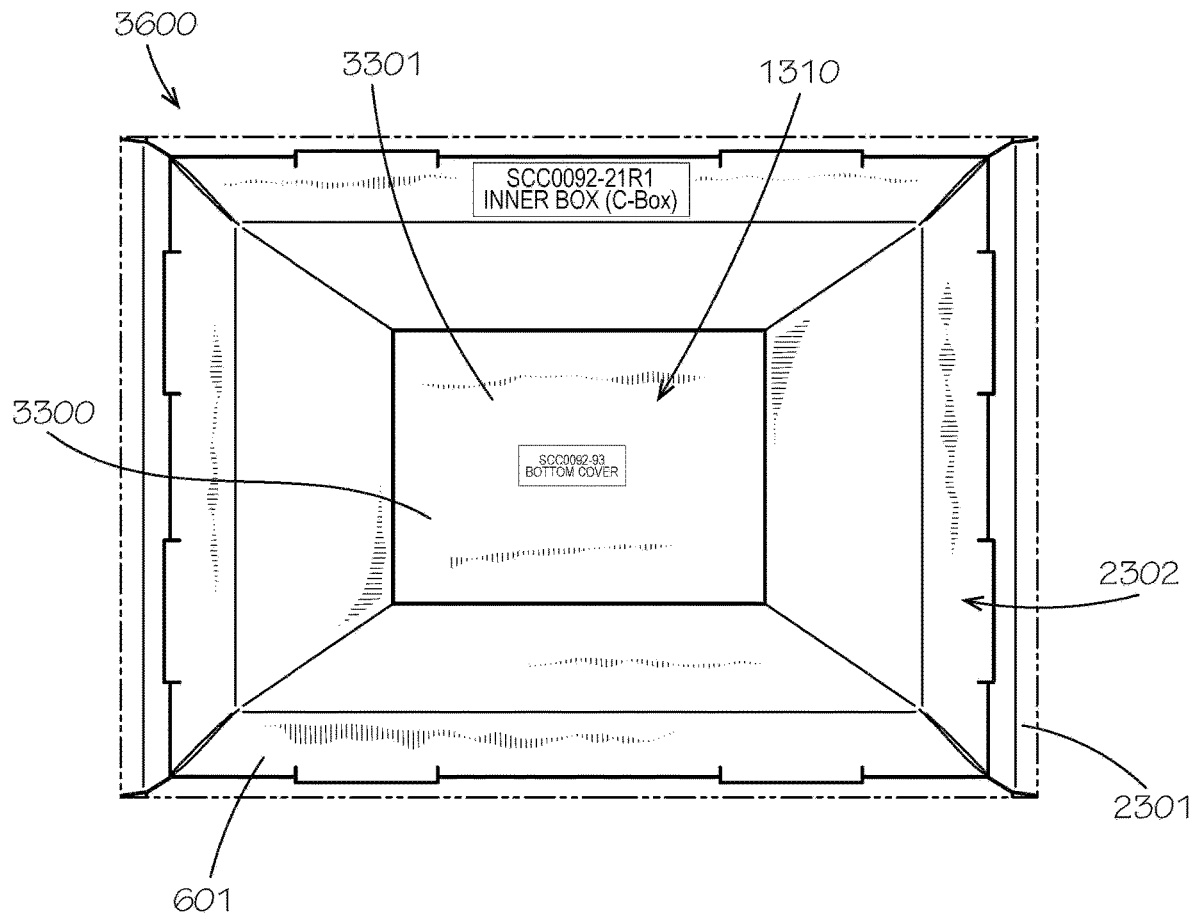
FIG. 36 is a top perspective view of another aspect of a packaging assembly with the plug of FIG. 33 and the insulation liner of FIG. 6 inserted into the cavity of the box of FIG. 23.

FIG. 36 is a top perspective view of another aspect of a packaging assembly 3600 with the plug 3300 of FIG. 33 and the insulation liner 601 of FIG. 6 inserted into the cavity 2302 of the box 2301 of FIG. 23. The plug 3300 can be positioned within the insulated cavity 1310, with the top side 3301 facing into the insulated cavity 1310. With the side panels 3306 (shown in FIGS. 33-35) folded around the insulation batt 1690 (shown in FIG. 34), the side panels 3306 can provide structural support to the plug 3300 to prevent the insulation batt 1690 from being compressed when a load is placed atop the plug 3300.

Figure 37:
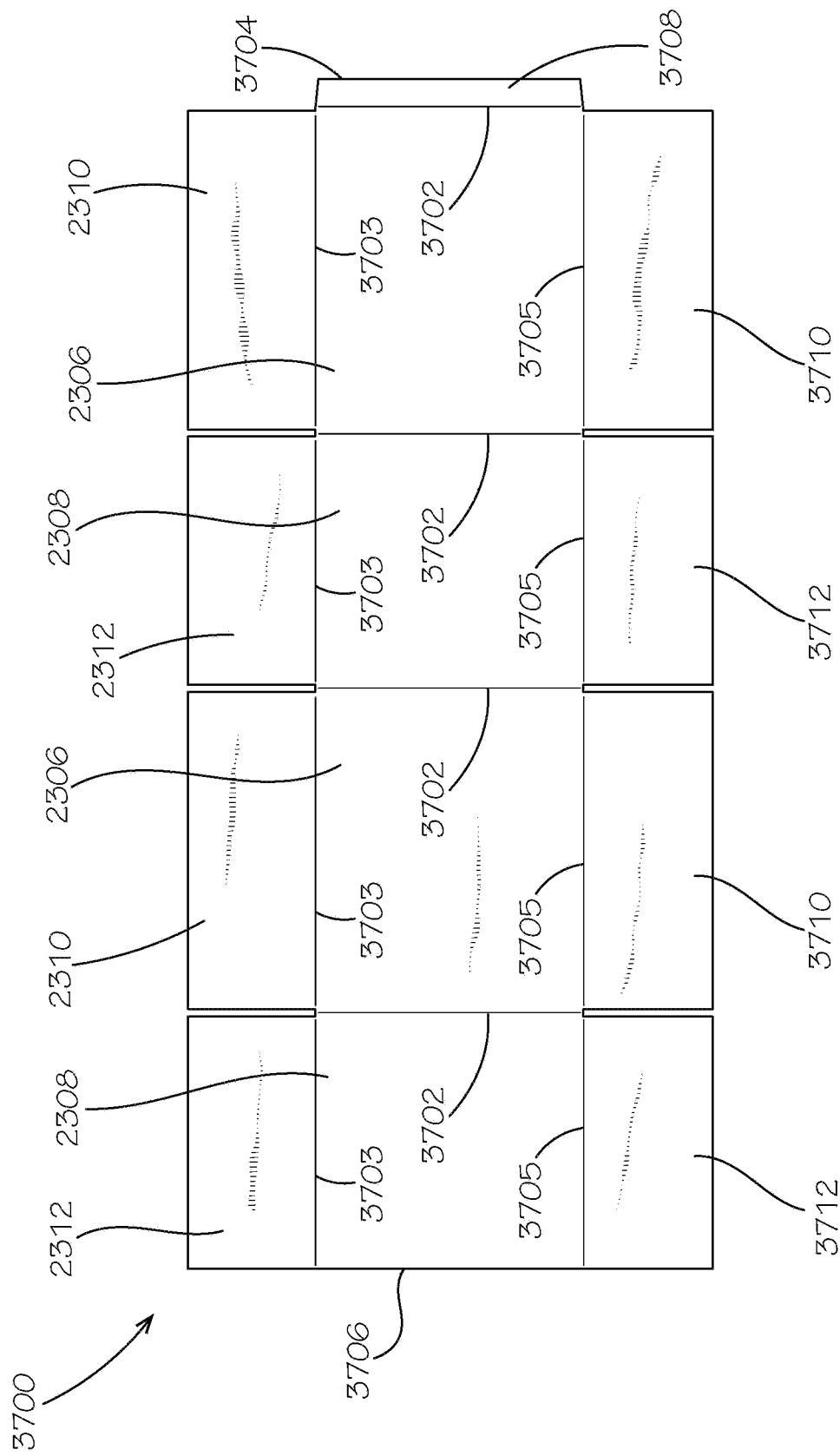
FIG. 37 is a top plan view of a box blank of the box of FIG. 23 in accordance with another aspect of the present disclosure.

FIG. 37 is a top plan view of a box blank 3700 of the box 2301 of FIG. 23. The side panels 2306 and the end panels 2308 can be coupled together by corner hinges 3702. An end tab 3708 can also be coupled to one of the side or end panels 2306,2308 by one of the corner hinges 3702. The end tab 3708 can define a first end 3704 of the box blank 3700, and the box blank 3700 can define a second end 3706 opposite from the first end 3704. The top side flaps 2310 and top end flaps 2312 can be coupled to the respective side or end panels 2306,2308 by top hinges 3703.

The bottom panel 2304 (shown in FIG. 23) can be defined by a pair of bottom side flaps 3710 and bottom end flaps 3712. The bottom side flaps 3710 can be coupled to the side panels 2306 by bottom hinges 3705, and the bottom end flaps 3712 can be coupled to the end panels 2308 by bottom hinges 3705.

Figure 38:
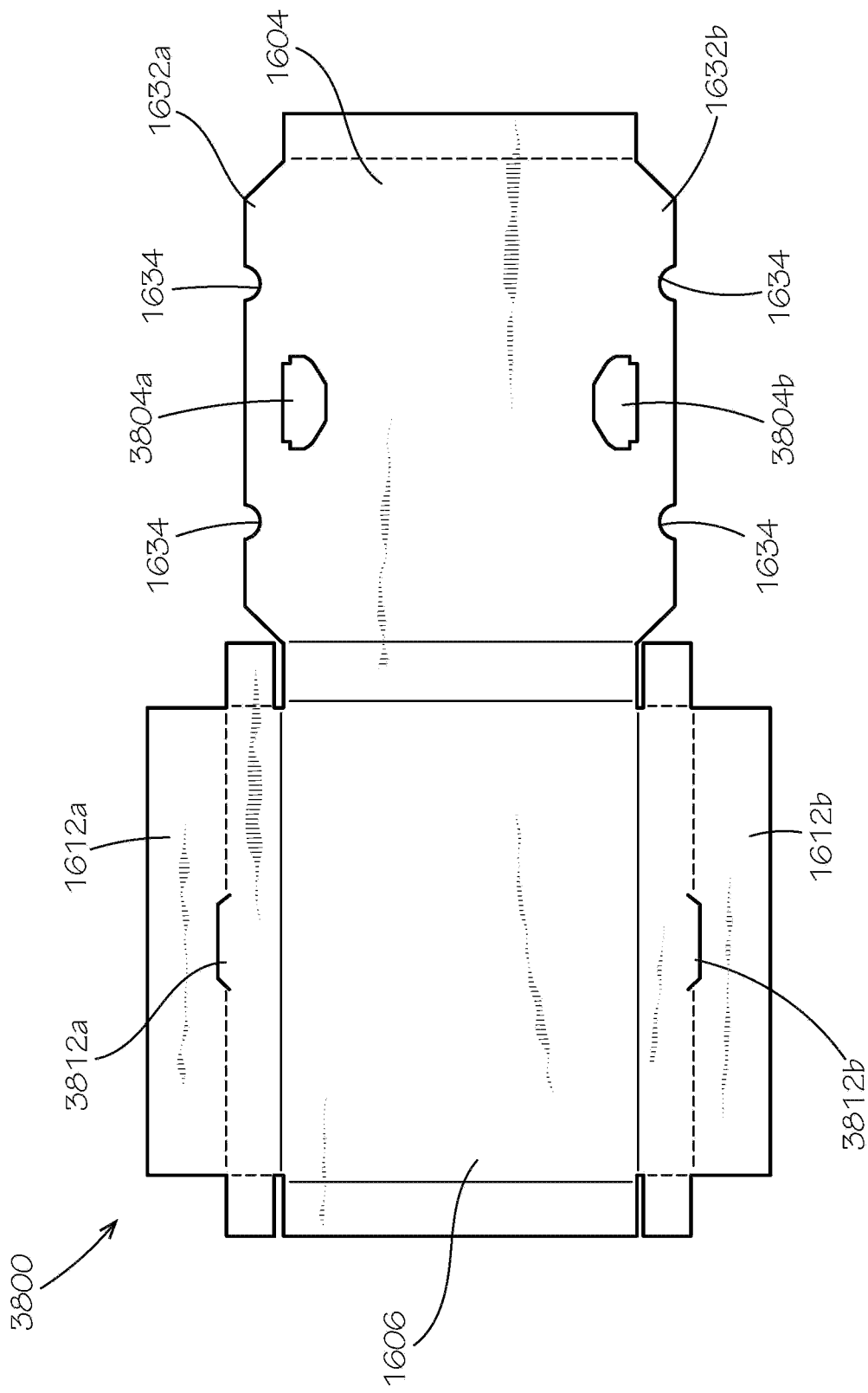
FIG. 38 is a top plan view of another aspect of a plug blank in accordance with another aspect of the present disclosure.

FIG. 38 is a top plan view of a plug blank 3800 in accordance with another aspect of the present disclosure. The outer panel 1604 can define a pair of folding tabs 3804*a,b*. The folding tabs 3804*a,b* can be cutout from the outer panel 1604. The folding tabs 3804*a,b* can be positioned inward from the wing portions 1632*a,b* of the outer panel 1604. In the aspect shown, each wing portion 1632*a,b* can define a pair of finger notches 1634. In some aspects, each wing portion 1632*a,b* can define greater or fewer than two finger notches 1634.

The wing portions 1612*a,b* coupled to the inner panel 1606 can define a pair of wing slots 3812*a,b*. When the plug blank 3800 is folded to form a plug, such as a plug similar in some ways to the plug 1601 of FIG. 16, the wing slots 3812*a,b* can receive the folding tabs 3804*a,b* to couple the outer panel 1604 to the wing portions 1612*a,b* and the inner panel 1606. In such aspects, the wing portions 1612*a,b* may or may not be coupled to the outer panel 1604 with a secondary means, such as an adhesive for example and without limitation.

Figure 39:
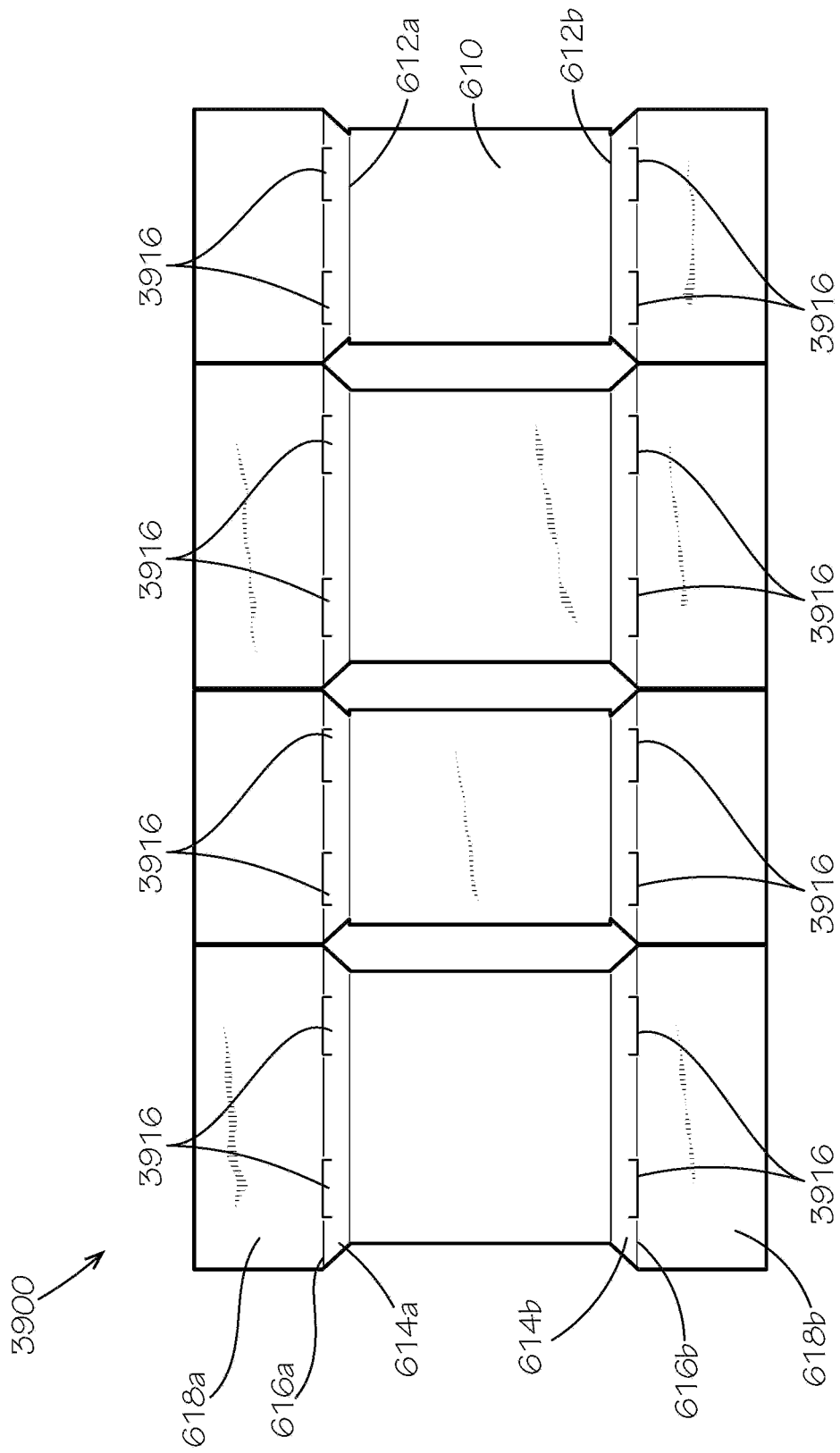
FIG. 39 is a top plan view of another aspect of the wrap liner blank in accordance with another aspect of the present disclosure.

FIG. 39 is a top plan view of another aspect of a wrap liner blank 3900 in accordance with another aspect of the present disclosure. The wrap liner blank 3900 can share some features in common with the wrap liner blank 600 of FIG. 6. In the aspect shown, the outer portions 618*a,b* can be extended so that when the wrap liner blank 3900 is folded about the inner hinges 612*a,b* and the ledge hinges 616*a,b*, the outer portions 618*a,b* can touch or nearly touch one another. For example and without limitation, the outer portions 618*a,b* can come within 1" or less of contacting one another when the inner portion 610 and the outer portions 618*a,b* are folded perpendicular to the ledge portions 614*a,b*. In some aspects, the outer portions 618*a,b* can partially or fully overlap one another.

In the present aspect, the ledge hinges 616*a,b* can define a plurality of relief cuts 3916, which can facilitate folding of the outer portions 618*a,b* relative to the ledge portions 614*a,b* about the ledge hinges 616*a,b*. In some aspects, the inner hinges 612*a,b* can define a plurality of relief cuts in addition to or in place of the relief cuts 3916.

Figure 40:
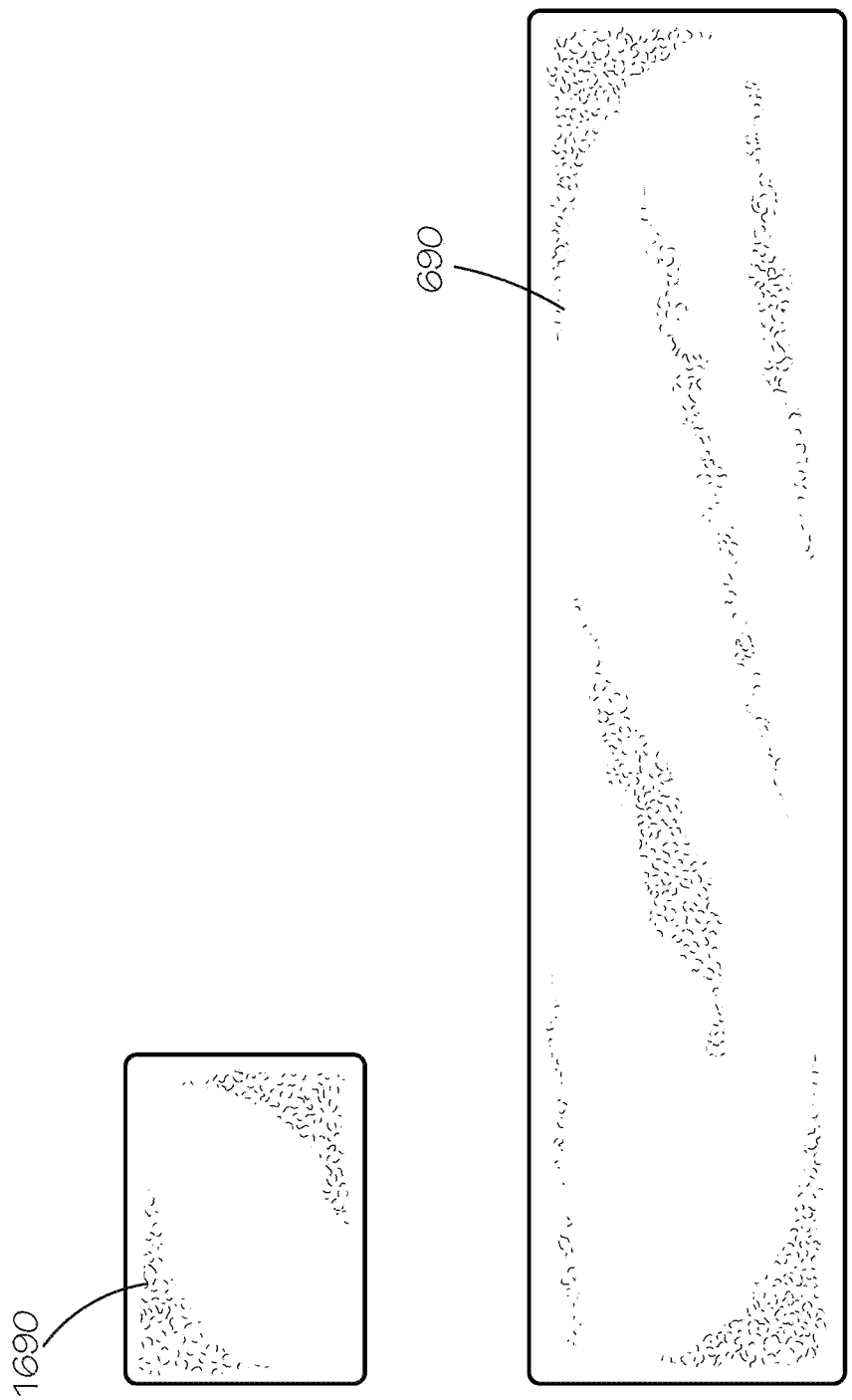
FIG. 40 is a top plan view of the insulation batt of FIG. 6 and the insulation batt of FIG. 16.
Figure 41:
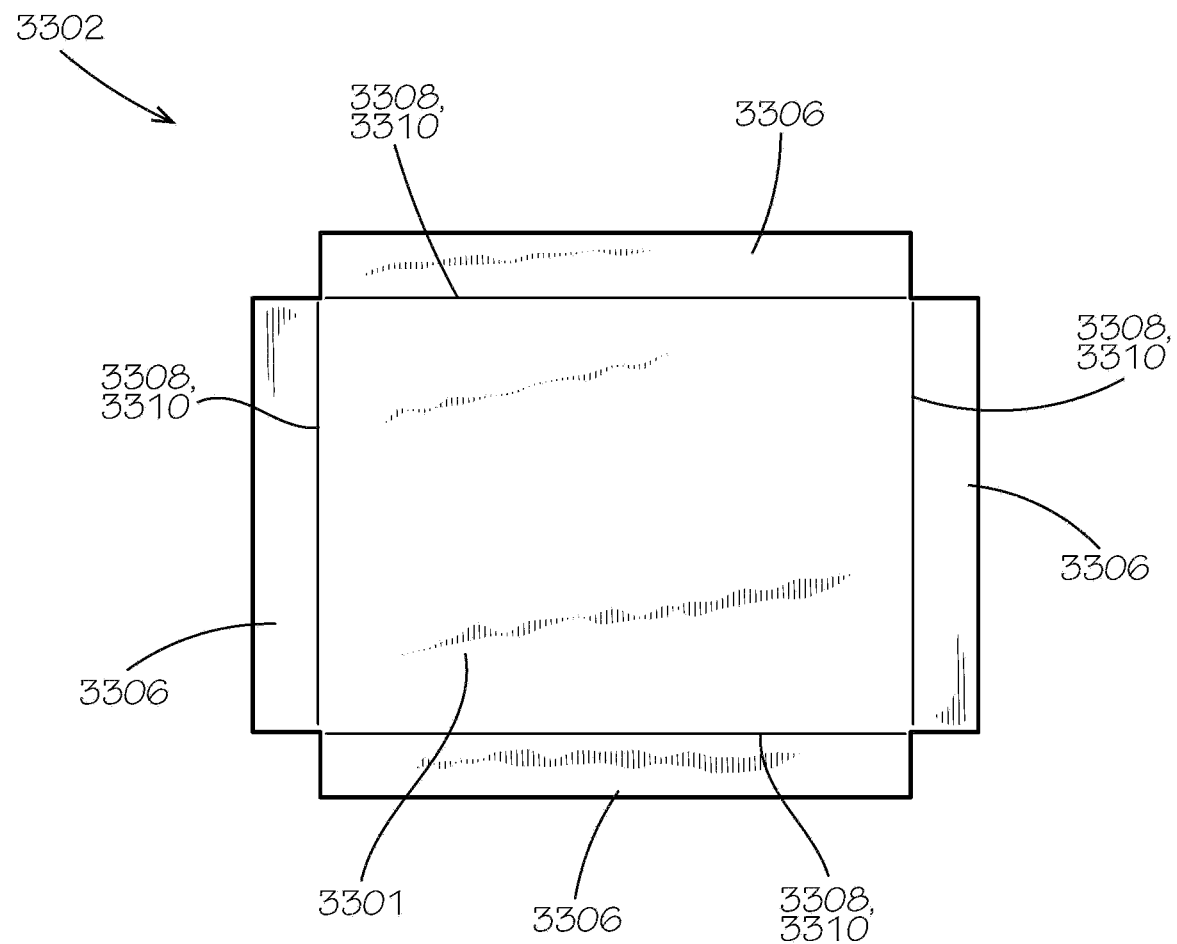
FIG. 41 is a top plan view of another aspect of a plug blank in accordance with another aspect of the present disclosure.

FIG. 40 is a top plan view of the insulation batt 690 of FIG. 6 and the insulation batt 1690 of FIG. 16. The insulation batt 690 can be between 0.25" and 2" thick. Preferably, the insulation batt 690 can be 0.75" to 0.825" thick. The insulation batt 690 can have a weight of about 700 grams per square meter ("GSM"), depending on thickness. The insulation batt 1690 can be between 1" and 3" in thickness. Preferably, the insulation batt 1690 can be between 1.5" and 1.65" in thickness. The insulation batt 1690 can have a weight of about 1400 GSM, depending on thickness.

In the present aspect, the blanks 600,1600 and/or the box 2301 can comprise corrugated cardboard. In other aspects, the blanks 1600,1600 and/or the box 2301 can comprise a different material, such as posterboard, corrugated plastic, polymer sheet material, or any other suitable material. In the present aspect, the blanks 600,1600 and/or the box 2301 can be die cut.

The backing sheet 796 can comprise Kraft paper. In other aspects, the backing sheet 796 can comprise a different material, such as a polymer film, corrugated cardboard, posterboard, corrugated plastic, or polymer sheet material, for example and without limitation.

In the present aspect, the insulation batts 690,1690 can comprise paper or other paper fiber materials; however, in other aspects, the insulation batts can comprise cotton, foam, rubber, plastics, fiberglass, mineral wool, or any other flexible insulation material. In the present application, the insulation batts 690,1690 can be repulpable. In the present aspect, the packaging assembly 2300 can be 100% recyclable. In the present aspect, the packaging assembly 2300 can be single-stream recyclable wherein all materials comprised by the packaging assembly 2300 can be recycled by a single processing train without requiring separation of any materials or components of the packaging assembly 2300. In the present aspect, the packaging assembly 2300 can be compostable. In the present aspect, the packaging assembly 2300 can be repulpable. In the present aspect, the packaging assembly 2300 and all components thereof can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL which is hereby incorporated in its entirety. In the present aspect, the packaging assembly 2300 and all components thereof can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437,365, filed Dec. 21, 2016, which are each incorporated by reference in their entirety herein.

The packaging assembly 2300 can be used in applications in which a user or mail carrier transports perishable or temperature-sensitive goods. For example and without limitation, the packaging assembly 2300 can be used to transport pharmaceuticals or groceries. The packaging assembly 2300 can improve upon a common cardboard box by providing insulation to prevent spoilage or deterioration of the contents.

In order to ship temperature-sensitive goods, common cardboard boxes are often packed with insulating materials made of plastics or foams which are not accepted by many recycling facilities or curb-side recycling programs in which a waste management service collects recyclables at a user's home. Consequently, shipping temperature-sensitive goods often produces non-recyclable waste which is deposited in landfills. The insulation materials often decompose very slowly, sometimes over the course of several centuries. In some instances, non-recyclable and non-biodegradable insulating materials can enter the oceans where the insulation materials can remain for years and harm marine life. In some aspects, the packaging assembly 2300 can reduce waste and pollution by comprising materials which are recyclable or biodegradable. In aspects in which the packaging assembly 2300 is curb-side or single-stream recyclable, the user may be more likely to recycle the insulated packaging assembly 2300 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of assembling a packaging assembly comprising an insulation wrap and a box, the method comprising:

folding a first panel of an insulation wrap relative to a second panel of the insulation wrap about an outer hinge of the insulation wrap, the insulation wrap comprising an insulation batt and a wrap liner blank, the insulation batt at least partially captured in a first channel and a second channel, the first channel defined between a first outer portion of the wrap liner blank and an inner portion of the wrap liner blank, the first outer portion hingedly coupled to a first ledge portion of the wrap liner blank, the first ledge portion hingedly coupled to the inner portion, the second channel defined between a second outer portion of the wrap liner blank and the inner portion, the second outer portion hingedly coupled to a second ledge portion of the wrap liner blank, the second ledge portion hingedly coupled to the inner portion opposite from the first ledge portion, the first outer portion and the second outer portion at least partially defining an outer surface of the insulation wrap, the inner portion at least partially defining an inner surface of the insulation wrap; and inserting the insulation wrap into a cavity defined by a box, the outer surface positioned at least partially in facing engagement with the box, the inner surface at least partially defining an insulated cavity.

2. The method of claim 1, further comprising positioning the second ledge portion at least partially in facing contact with a bottom panel of the box.

3. The method of claim 1, wherein the wrap liner blank defines a clearance notch separating a portion of the inner portion defined by the first panel from a portion of the inner portion defined by the second panel.

4. The method of claim 1, wherein the packaging assembly further comprises a plug, wherein the plug comprises a plug insulation batt at least partially enclosed between an inner panel and an outer panel of the plug, and wherein the method further comprises:

inserting the inner panel and at least a portion of the plug insulation batt into the insulated cavity; and positioning a portion of the outer panel in facing engagement with the second ledge portion.

5. The method of claim 4, wherein positioned the portion of the outer panel in facing engagement with the second ledge portion comprises positioning the portion of the outer panel between the second ledge portion and a bottom panel of the box.

\* \* \* \* \*